US011216451B2

(12) United States Patent
Obeidat

(10) Patent No.: US 11,216,451 B2
(45) Date of Patent: Jan. 4, 2022

(54) DYNAMIC DASHBOARD WITH GUIDED DISCOVERY

(71) Applicant: Oracle International Corporation, Redwood Shores, CA (US)

(72) Inventor: Muhannad Turki Obeidat, Amman (JO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 553 days.

(21) Appl. No.: 15/991,119

(22) Filed: May 29, 2018

(65) Prior Publication Data

US 2019/0102425 A1 Apr. 4, 2019

Related U.S. Application Data

(60) Provisional application No. 62/565,671, filed on Sep. 29, 2017.

(51) Int. Cl.
*G06F 16/242* (2019.01)
*G06F 16/248* (2019.01)
*G06F 16/25* (2019.01)

(52) U.S. Cl.
CPC ........ *G06F 16/2428* (2019.01); *G06F 16/248* (2019.01); *G06F 16/252* (2019.01)

(58) Field of Classification Search
USPC ....................................................... 707/758
See application file for complete search history.

(56) References Cited

U.S. PATENT DOCUMENTS 8,010,581 B2 8/2011 Bechtel et al.
8,296,284 B2 10/2012 Bierner
8,983,936 B2 3/2015 Fisher et al.
(Continued)

FOREIGN PATENT DOCUMENTS

CN 104966172 A 10/2015

OTHER PUBLICATIONS

Arthur Unknown, An Oracle White Paper, "Oracle Endeca Information Discovery: A Technical Overview", Jan. 2014, pp. 1-28.
(Continued)

*Primary Examiner* — Muluemebet Gurmu
(74) *Attorney, Agent, or Firm* — Potomac Law Group, PLLC

(57) ABSTRACT

Embodiments include methods and systems for configuring a dashboard with a plurality of components. Data sets populated by a plurality of data attributes and associated data attribute values can be received, where the dashboard is configured to display data from the data sets. A plurality of components can be provided on the dashboard including a guided discovery component that displays suggested filters for the dashboard according to one or more of the received data sets. A selection of a filter for the dashboard can be received at one of the components and the components can be dynamically filtered based on the received filter. The suggested filters displayed by the guided discovery component can also be dynamically adjusted based on the received filter, where one or more suggested filters are dynamically hidden and one or more suggested filters are dynamically displayed based on the received filter.

20 Claims, 45 Drawing Sheets

(56) References Cited

U.S. PATENT DOCUMENTS

| | | | |
|---|---|---|---|
| 9,092,528 B1* | 7/2015 | Haahr et al. | G06F 17/30 |
| 9,576,263 B2 | 2/2017 | Beck et al. | |
| 2004/0243613 A1 | 12/2004 | Pourheidari | |
| 2006/0095858 A1* | 5/2006 | Hao | G06F 16/26 |
| | | | 715/764 |
| 2007/0101297 A1* | 5/2007 | Forstall | G06F 9/451 |
| | | | 715/841 |
| 2009/0193006 A1* | 7/2009 | Herrnstadt | G06F 17/30 |
| | | | 707/999.005 |
| 2017/0090879 A1* | 3/2017 | Veltri | G06Q 30/0201 |

OTHER PUBLICATIONS

Arthur Unknown, Oracle® Endeca Information Discovery Studio User's Guide • Version 2.3.0, Jun. 2012, Revision A, 5 pages.

Arthur Unknown, Oracle® Endeca Information Discovery, Getting Started Guide; Version 3.1.0 Rev. B, Dec. 2013, 45 pages.

Arthur Unknown, SAP Lumira, Data Discovery & Visualisation, BI & Business Analytics, "Self-service data visualisation for everyone", Dec. 5, 2017, pp. 1-6.

Arthur Unknown, SAP Lumira, server edition, Data Discovery & Visualisation, "Rusted data visualization experience for a single team or the entire organisation platform", Dec. 5, 2017, pp. 1-4.

Joseph True, "Data, Discover and Display—the new Watson Analytics User Experience", May 25, 2016, 15 pages.

* cited by examiner

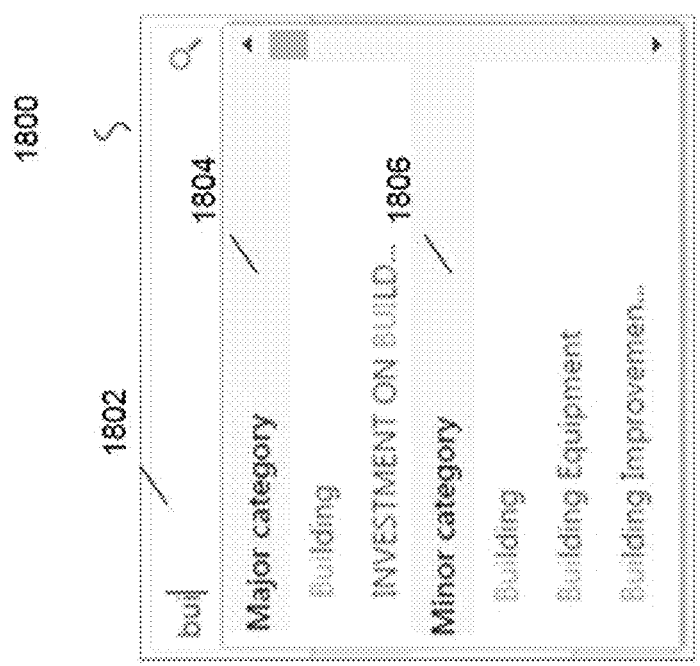
Fig. 18

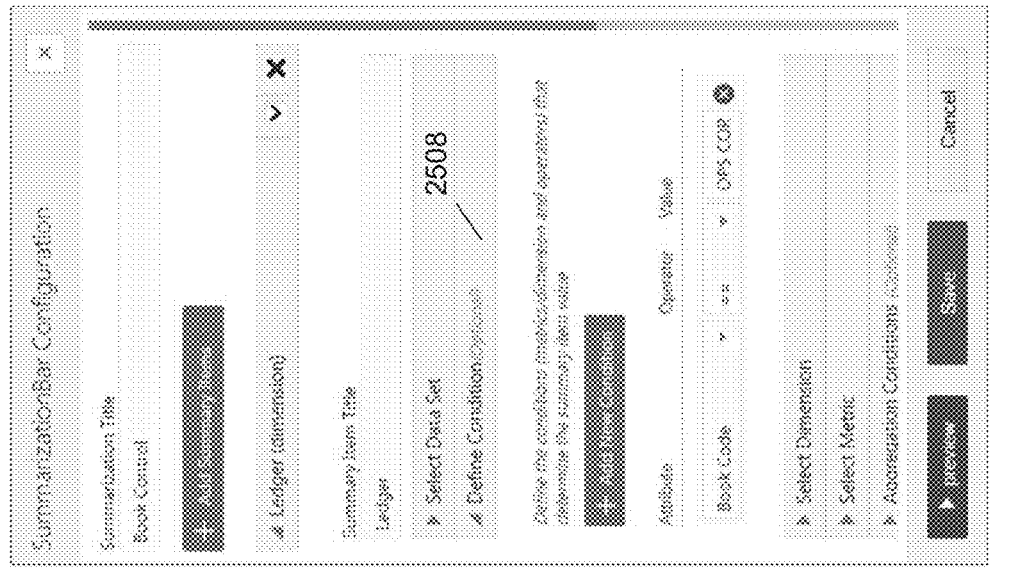
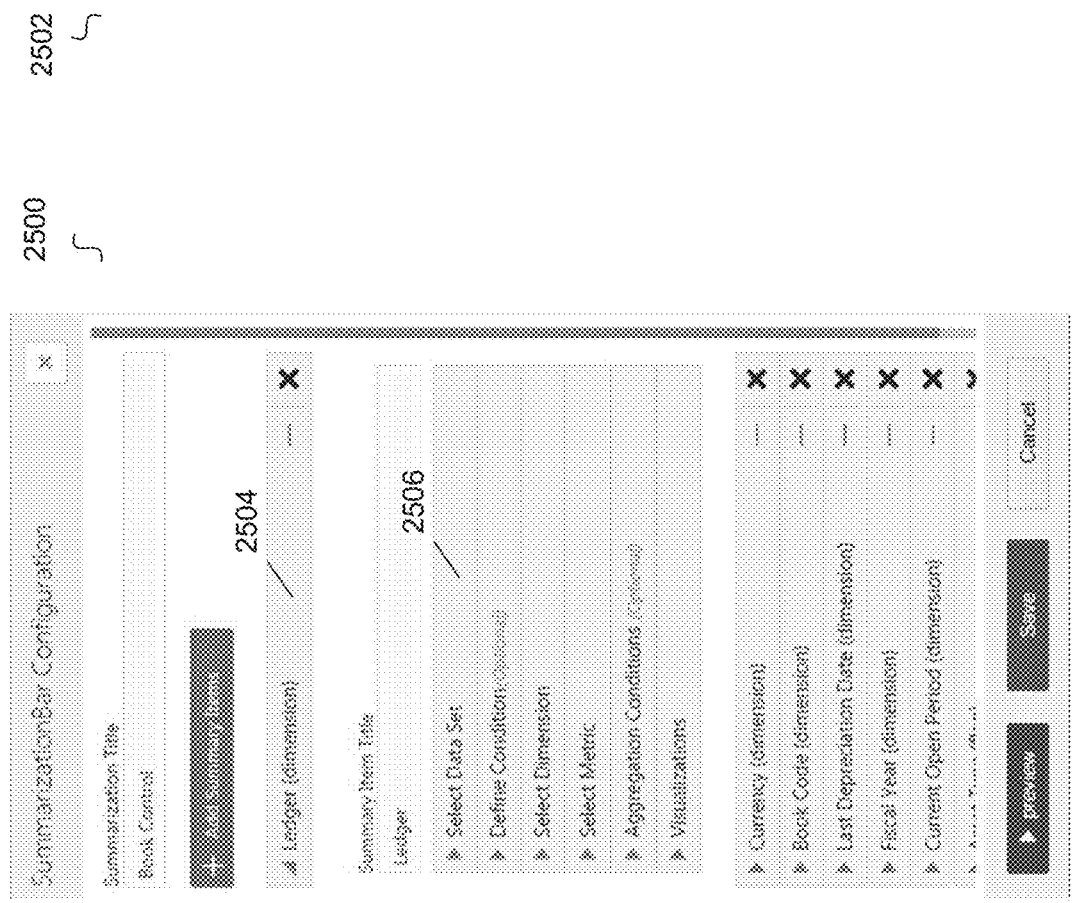
Fig. 25

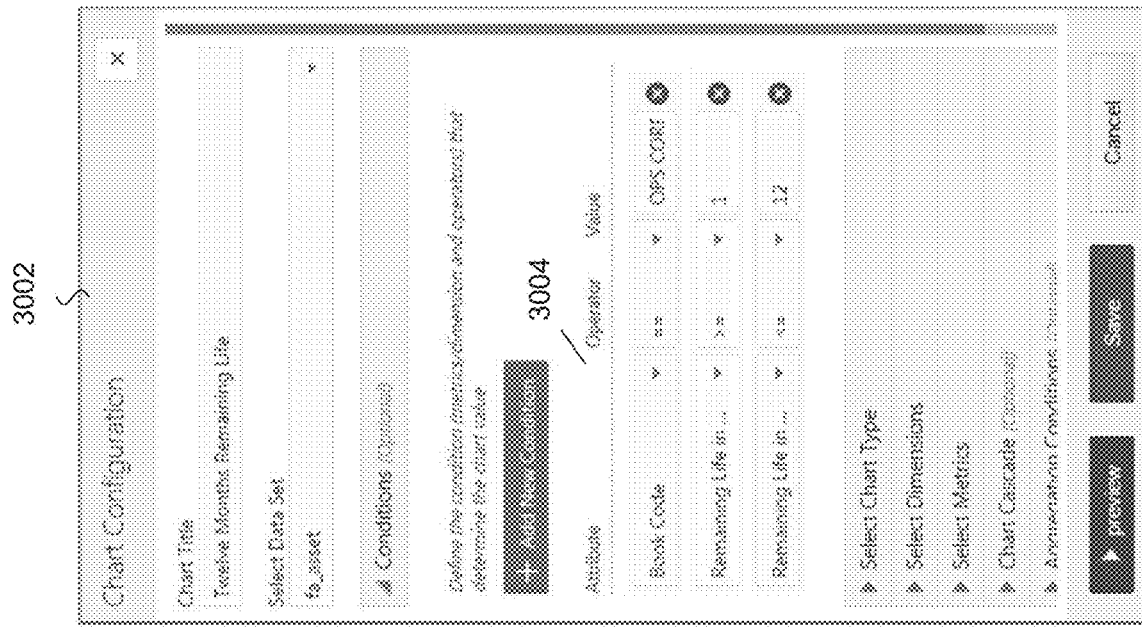
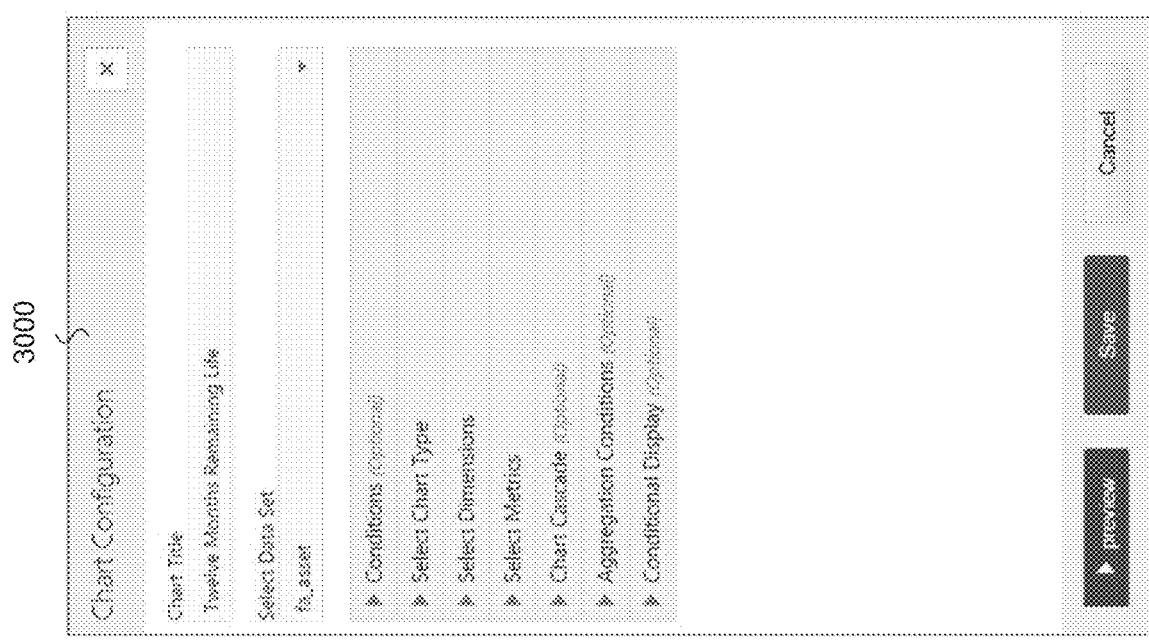
Fig. 30

Fig. 32

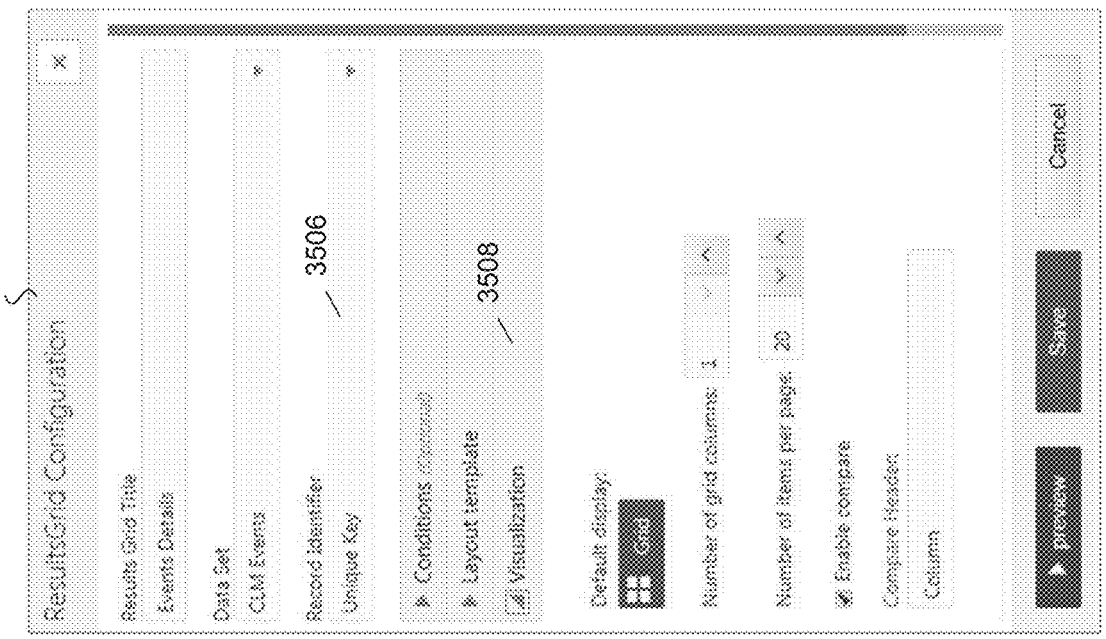
Fig. 35

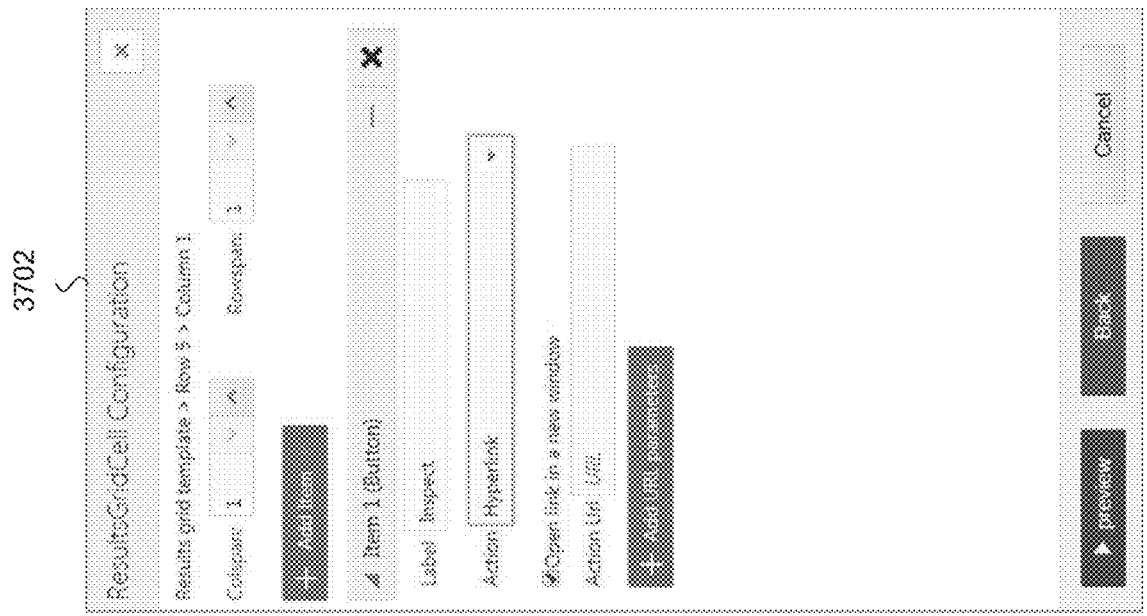
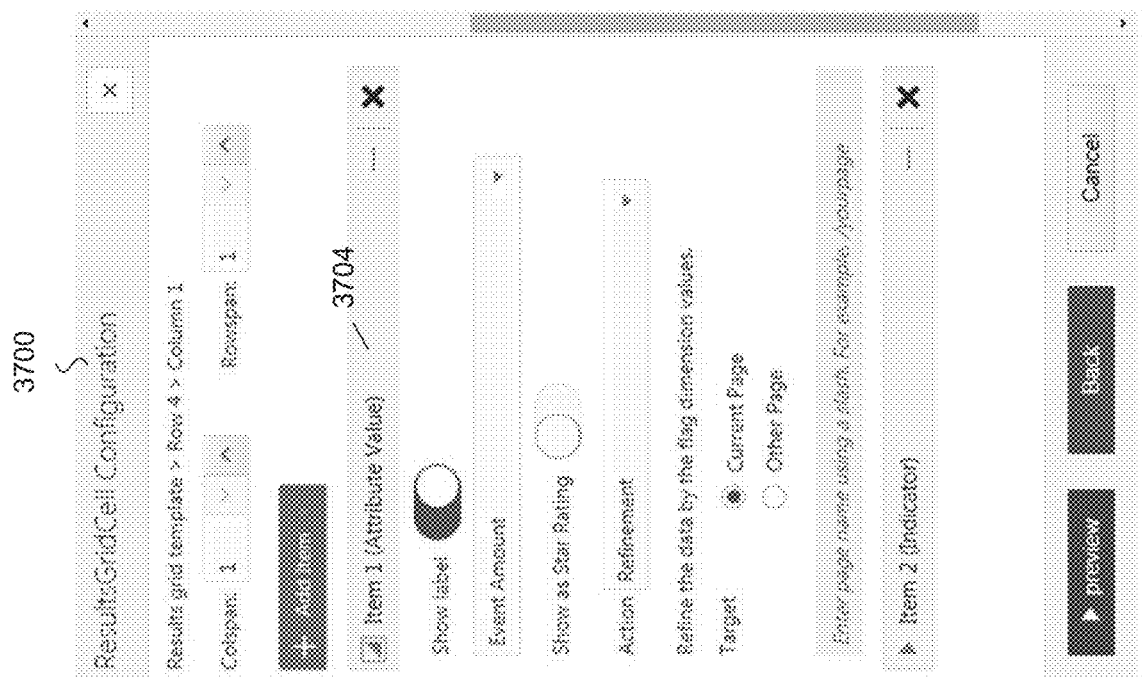
Fig. 37

DYNAMIC DASHBOARD WITH GUIDED DISCOVERY

CROSS REFERENCE TO RELATED APPLICATION

This application claims priority of U.S. Provisional Patent Application Ser. No. 62/565,671, filed Sep. 29, 2017, the disclosure of which is hereby incorporated by reference.

FIELD

The embodiments of the present disclosure generally relate to configuring a dashboard with guided discovery.

BACKGROUND

Information has become a driver for organizational activity in modern business. Data generation has grown by leaps and bounds, and informational overload can often lead to negative results, such as inaction or misinformed action. In addition, different types of information or analytics may be relevant to different organizations, or different components of a single organization. Because of the abundance of data available, the analysis, structure, and form of the data has become an important consideration when storing and presenting data.

SUMMARY

The embodiments of the present disclosure are generally directed to systems and methods for configuring a dashboard with guided discovery that substantially improve upon the related art.

Data sets populated by a plurality of data attributes and associated data attribute values can be received, where the dashboard is configured to display data from the data sets. A plurality of components can be provided on the dashboard including a guided discovery component that displays suggested filters for the dashboard according to one or more of the received data sets. A selection of a filter for the dashboard can be received at one of the components and the components can be dynamically filtered based on the received filter. The suggested filters displayed by the guided discovery component can also be dynamically adjusted based on the received filter, where one or more suggested filters are dynamically hidden and one or more suggested filters are dynamically displayed based on the received filter.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 18 illustrates a graphical user interface of a search bar component according to an example embodiment.

FIGS. 24 and 25 illustrate graphical user interfaces of a summarization bar component according to an example embodiment.

FIGS. 28-31 illustrate graphical user interfaces of a bar or chart component according to an example embodiment.

Figure 32:
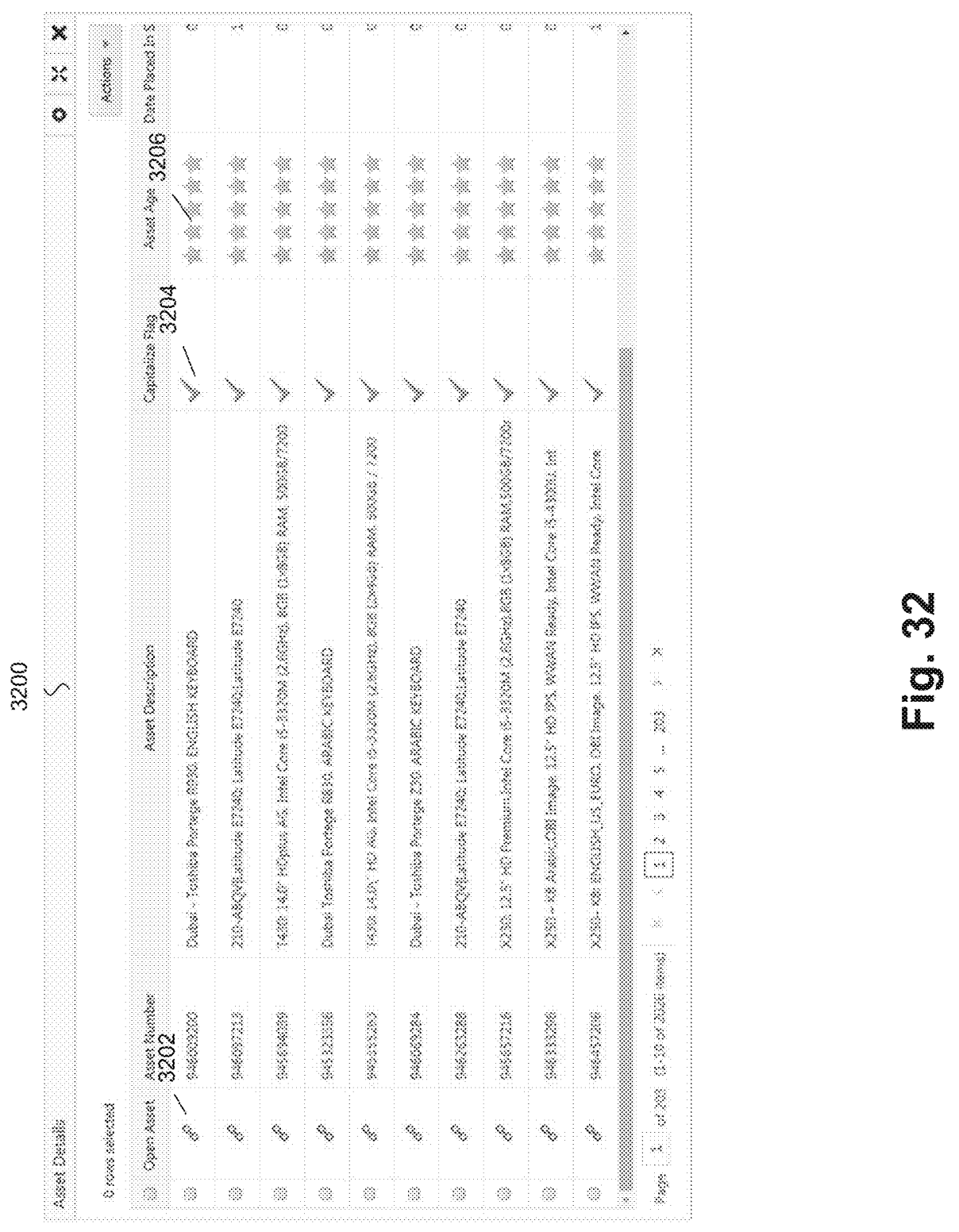

FIGS. 32 and 33 illustrate graphical user interfaces of a results table component according to an example embodiment.

FIGS. 34-37 illustrate graphical user interfaces of a grid component according to an example embodiment.

DETAILED DESCRIPTION

Presenting data that can be easily digested, is tailored to specific entities, and can be manipulated or analyzed in a manner to achieve actionable results is a challenging task for software applications. Embodiments provide a dynamic enterprise dashboard that presents information in an easily comprehendible yet flexible manner to allow data to be tailored to entities' specific circumstances. For example, embodiments include an enterprise dashboard provided as a web application to a plurality of clients. Data sets may be loaded into the dashboard framework in a simplified manner, for example using an environment natural to the existing data management or database software. The loaded data may also be manipulated, such as by enabling new or different analytics between data attributes/values to leverage the display and analytical functions of the dashboard.

Embodiments include a dashboard with a plurality of user interface components, such as a search component, a guided discovery component, a summarization bar component, a tag cloud component, a graph or chart component, a results table component, and a grid component. The one or more components can be dynamically laid out across the dashboard, for instance using drag and drop functionality. In addition, a plurality of the components can be configured declaratively to intuitively display data and interact with a user of the dashboard.

Figure 1:
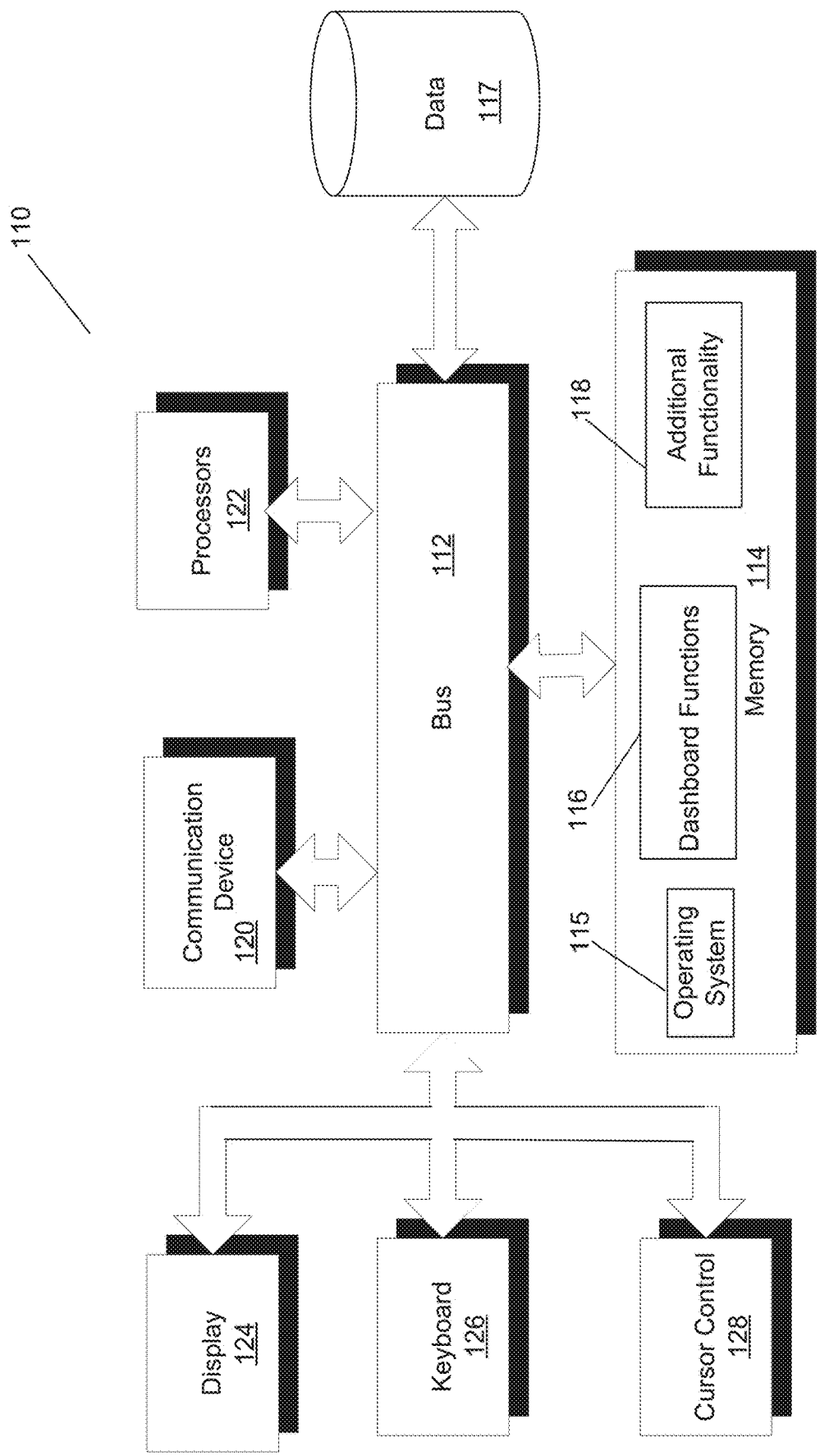
FIG. 1 illustrates a system for configuring a dashboard with guided discovery according to an example embodiment.

FIG. 1 is a block diagram of a computer server/system 110 in accordance with embodiments. As shown in FIG. 1, system 110 may include a bus device 112 and/or other communication mechanism(s) configured to communicate information between the various components of system 110, such as processor 122 and memory 114. In addition, communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth®, Wi-Fi, and/or cellular communications. Alternatively, communication device 120 may be configured to provide wired network connection(s), such as an Ethernet connection.

Processor 122 may include one or more general or specific purpose processors to perform computation and control functions of system 110. Processor 122 may include a single integrated circuit, such as a micro-processing device, or may include multiple integrated circuit devices and/or circuit boards working in cooperation to accomplish the functions of processor 122. In addition, processor 122 may execute computer programs, such as operating system 115, dashboard functions component 116, and other applications 118, stored within memory 114.

System 110 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for system 110. The modules can include an operating system 115, dashboard functions component 116, as well as other applications modules 118. Operating system 115 provides operating system functionality for system 110. Dashboard functions 116 may provide functionality for managing and/or displaying data according to various embodiments, or may further provide any other functionality of this disclosure. In some instances, dashboard functions component 116 may be implemented as an in-memory configuration.

Non-transitory memory 114 may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with system 110.

In some embodiments, system 110 can be part of a larger system. Therefore, system 110 can include one or more additional functional modules 118 to include the additional functionality. Other applications modules 118 may include the various modules of the engagement engine ("EE") embedded in Oracle® Cloud. A database 117 is coupled to bus 112 to provide centralized storage for modules 116 and 118 and to store, for example, wireless device activity, and in some embodiments, user profiles, transactions history, etc. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 110 may be implemented as a distributed system. For example, memory 114 and processor 122 may be distributed across multiple different computers that collectively represent system 110. In one embodiment, system 110 may be part of a device (e.g., smartphone, tablet, computer, etc.).

In an embodiment, system 110 may be separate from the device, and may remotely provide the described functionality for the device. Further, one or more components of system 110 may not be included. For example, for functionality as a user or consumer device, system 110 may be a smartphone or other wireless device that includes a processor, memory, and a display, does not include one or more of the other components shown in FIG. 1, and includes additional components not shown in FIG. 1.

Figure 2:
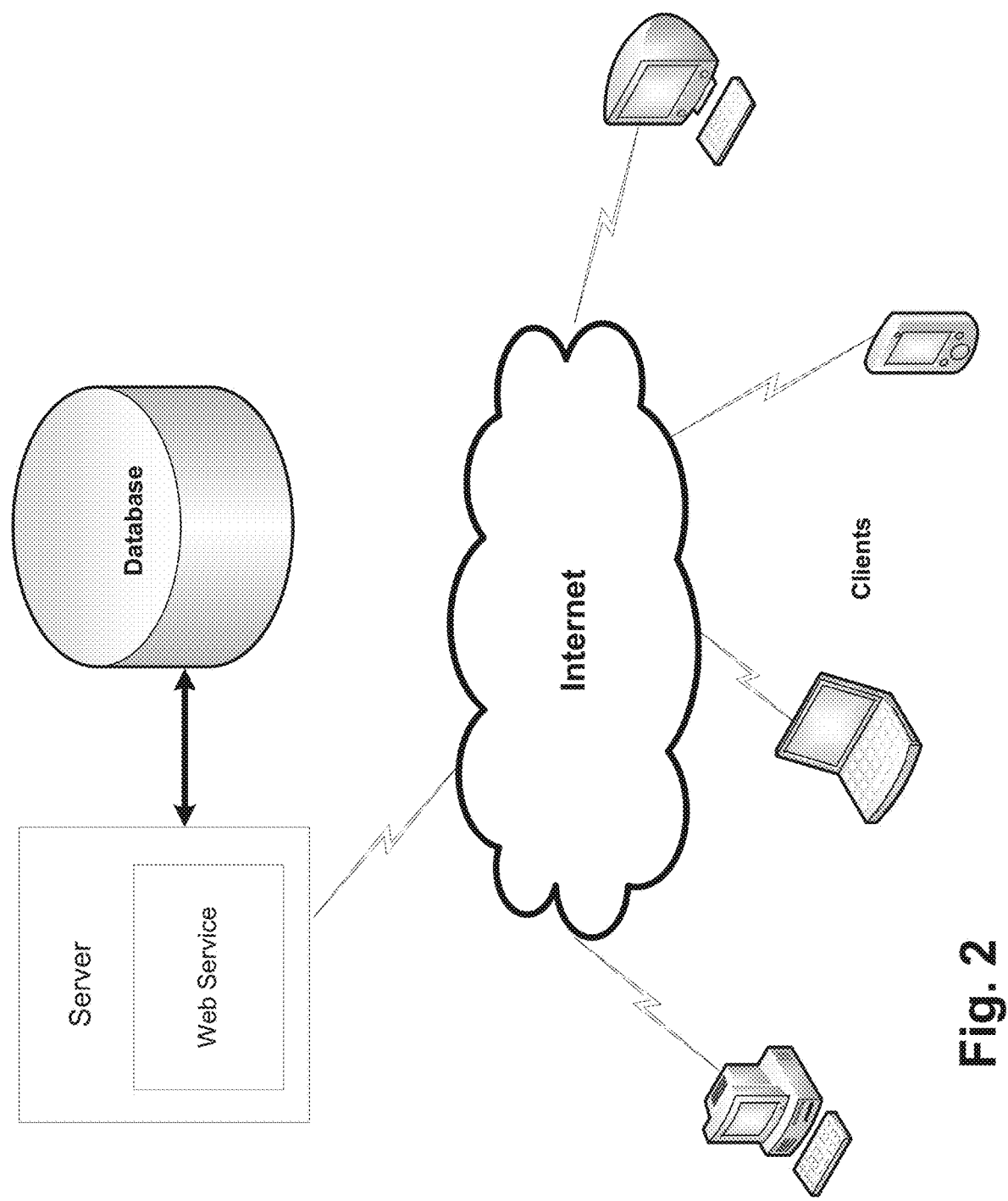
FIG. 2 illustrates a block diagram that illustrates a plurality of clients that access a web service that is implemented on a server for configuring a dashboard with guided discovery according to an example embodiment.

FIG. 2 is a block diagram that illustrates a plurality of clients that access a web service that is implemented on a server, such as a WebLogic Server from Oracle® in an embodiment. In other embodiments, other implementations of a web service can be used. The server can be in communication with a database in order to perform web services for the illustrated clients. In an embodiment, the web service can provide the functionality described herein, such as providing a dynamic dashboard that displays data interactively.

Embodiments provide a data exploration software that provides users insights into selected data sets and enables users to explore desired information in an efficient and flexible manner. For example, embodiments allow users to discover information across a number of relevant business areas (e.g., business dimensions) in an enterprise configuration, and further provides analytical functionality for this explored information. In some example implementations, embodiments can include Oracle® E-Business Suite ("EBS") applications, and the functionality of the disclosed dashboard can function alongside or be integrated with such applications.

Figure 17:
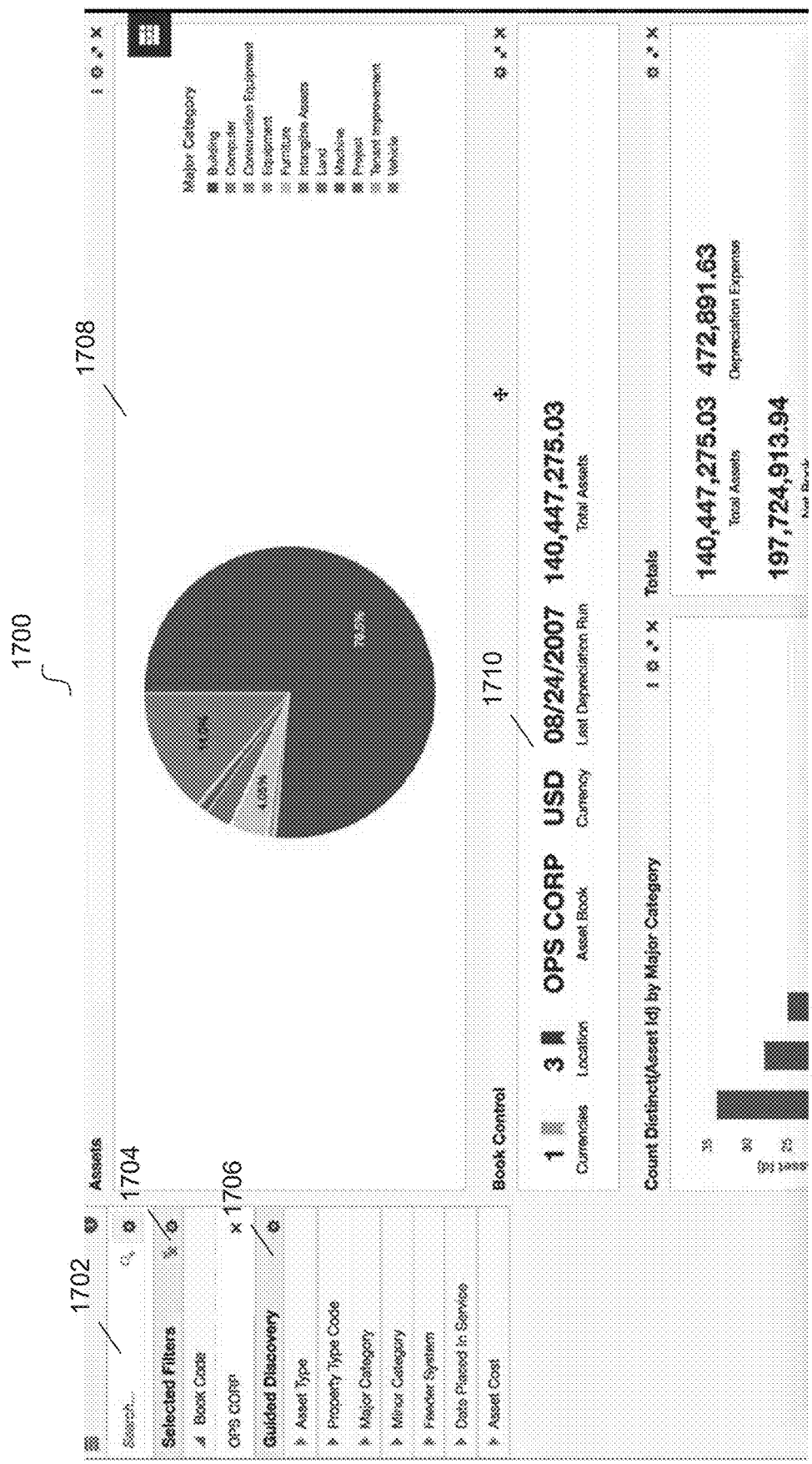
FIG. 17 illustrates a graphical user interface of a dashboard with a plurality of components according to an example embodiment.

In some embodiments, users are provided access to the dashboard once they are logged into a source system according to their user privilege. For example, an EBS Admin User (e.g., sysadmin) will have the administrator privilege to perform administrator tasks for the dashboard upon login. Embodiments of the dashboard include one or more pages with a set of components (e.g., visualization components). For example, FIG. 17 illustrates an example dashboard page according to various embodiments. Example pages contain visualization components designed to perform one or more functions such as filtering data displayed on a page/dashboard, displaying visual representations of data, displaying lists of records or record attributes, and/or highlighting specific values.

In some embodiments, data represented by various components can be contained in a data set. A data set can represent a subset of a data model in which records are partitioned into named data sets according to unique key assignments. Unique keys can be used to identify records in data sets as follows: one attribute that is unique and single assigned can identify each data set as an identifier. In some embodiments, the data set identifier can also serve as the record identifier. In an example, a record identifier can be case-sensitive when used with other collection operations or in queries. A data set can be assigned to an application as an owned data set, and can be used also as a reference data set when configuring components.

In some embodiments, metadata that defines attribute characteristics can be included. Example metadata can include name and type, display name, language, configuration parameters (e.g., whether an attribute is searchable), navigability settings (e.g., whether to show record counts for available refinements, whether to enable multi-select, and/or how to sort refinements). In some embodiments, metadata properties can be at the attribute level, for example:

| Property | Default Value | Description |
| --- | --- | --- |
| ATTRIBUTE_KEY | | The key of the attribute as in the DB view. |
| ATTR_SOURCE_DATATYPE | | The attribute data type as in the DB view |
| DISPLAY_NAME | | The name of the attribute in an easy-to-understand format. User can modify the display name of an attribute. No restrictions on these changes exist. |
| CUSTOM_DISPLAY_NAME | | |
| ATTR_PROFILE_CODE | | The profile of the attribute. |
| DIM_ENABLE_REFINEMENTS_FLAG | Y | Specifies whether attributes are enabled to be used as refinements. If set to Y, the attribute is refineable If set to N, the attribute is not refineable |
| SHOW_IN_GUIDED_DISCOVERY_FLAG | N | Whether to show the attributes in the guided discovery. If set to Y, the attributes are shown. If set to N, the attributes are not shown. |
| COLLAPSED_BY_DEFAULT | Y | |
| RANKING_TYPE_CODE | lexical | The order in which to display refinements in the navigation menu. The allowed values are: lexical sorts refinements alphabetically or by number. record-count sorts refinements in descending order, by the number of |

-continued

| Property | Default Value | Description |
| --- | --- | --- |
| SELECT_TYPE_CODE | multi-select-or | records available for each refinement. Configures the multi-select feature for an attribute, and can be override with the following values (single, multi-or, multi-and) |
| SHOW_RECORD_COUNTS_FLAG | N | Whether to show record counts for a refinement. If set to Y, the record counts are shown. If set to N, the record counts are not shown. |
| TEXT_SEARCHABLE_FLAG | Y | If set to Y, then the attribute is enabled for record search. If set to N, the attribute does not support record search |

In some embodiments, attribute profile has several properties that controls the attribute characteristic, for example:

| Property | Description |
| --- | --- |
| ATTR_DATA_TYPE | |
| VALUE_SEARCHABLE_FLAG | If set to Y, the value of the attribute can be used in queries to retrieve matching documents (the attribute is enabled for value search). Note that attributes of type string can be enabled for value search. |
| UNIQUE_FLAG | If set to Y, no two records can have the same value for the attribute. If set to N, multiple records can have the same value for this attribute. |
| SINGLE_ASSIGN_FLAG | If set to Y, each record can have at most one value for an attribute assignment (i.e., the attribute is single assign). If set to N, each record may have more than one value for an attribute assignment (i.e., the attribute is multi-assign). |
| REQUIRED_FLAG | In some embodiments, system rejects attempts to add a document which does not have a value for this field |
| DOC_VALUES_FLAG | If set to Y, the value of the attribute can be used for sorting, faceting, highlighting or Function Queries. |
| STORED_FLAG | If set to Y, the actual value of the field can be retrieved by queries. |

In some embodiments, a calculated attribute can be included in the data model. For example, calculated attributes can be calculated automatically by a service layer at run time, thus rendering them convenient for usability and performance. In an example, a new calculated attribute called order_delay can be created that calculates the difference between a current date and a promised date attribute. In some embodiments, calculated attributes can be defined per data set. For some components, calculated attributes can be available on the attribute list when configuring the component. Calculated attributes can have a key, a translatable display name, and/or a custom display name. In some embodiments, calculation is based on existing attributes in a selected data set, for instance based on mathematical functions and operations such as:

| Aggregation function | |
| --- | --- |
| Function | Description |
| SUM | Computes the sum of attribute values |
| AVG | Computes the arithmetic mean value for an attribute |
| MAX | Finds the maximum value for an attribute |
| MIN | Finds the minimum value for an attribute |
| COUNT | Counts the number of records |
| COUNTDISTINCT | Counts the number of unique |

| Calendar/Date function | |
|---|---|
| Function | Purpose |
| SYSDATE | Constants representing current date during query in GMT and server time zone, respectively. |
| DAY | |
| MONTH | |
| YEAR | |

| Supported operators | |
|---|---|
| Operator | Description |
| addition | The addition operator (+) |
| subtraction | The subtraction operator (−) |
| multiplication | The multiplication operator (*) |
| division | The division operator (/) |

In some embodiments, date based calculated attributes can result in in negative or null values: some_functional_date—sysdate can return 0, + values or − values; some_functional_date—sysdate or the other way around, can result in null if the some_functional_date is null. Embodiments can manage negative or null values by suppressing the display of such values for functional use cases. Embodiments can also consider negative and null values as the same for sorting purposes. Other embodiments can display negative or null values, consider their values differently, or can implement any other suitable management of negative or null values.

In some embodiments, buckets can be implemented that indicate ranges (e.g., intervals) for certain data values. For example, each bucket can be a closed-open interval of a number of ranges. In an example, a bucket can have ranges, each range assigned to a size between 10 and 20, where the 10 is included in the interval and 20 is excluded. Embodiments can return the bucket sequence and display name into which the value of this expression would fall after being evaluated. A bucket sequence number can control display order of the bucket on a chart.

In some embodiments, dynamic attributes can be implemented to provide enhanced functionality. A source system (e.g., EBS) can enable a user to record additional information using either User Define Attributes ("UDA") or Descriptive Flex Files ("DFF"). Dynamic attributes allow users to specify additional attributes, such as an "Item Manufacture" attribute that is derived from loaded data rather the being read directly from a data store (e.g., via a query). Embodiments include implementation specific attributes on top of original or seeded attributes (e.g., loaded through a metadata load phase in extraction, transformation, load process). Dynamic attributes can be used by search and guided discovery components based on data.

In some embodiments, Oracle® Procedural Language/Structured Query Language ("PL/SQL") procedure be used to retrieve/generate dynamic attributes. Properties for dynamic attributes, such as those created through metadata loading or PL/SQL procedure can include:

| Property | Default Value |
|---|---|
| ATTRIBUTE_PROFILE | Based on attribute data type |
| DIM_ENABLE_REFINEMENTS_FLAG | Y |
| SHOW_IN_GUIDED_DISCOVERY_FLAG | Y |
| COLLAPSED_BY_DEFAULT | Y |
| RANKING_TYPE_CODE | lexical |
| SELECT_TYPE_CODE | Multi-or-select |
| SHOW_RECORD_COUNTS_FLAG | N |
| TEXT_SEARCHABLE_FLAG | Y |
| SNIPPET_SIZE | 0 |

In some embodiments, the functionality of a dashboard can be configured, such as by a user or administrator. For example, a user can define a data design and applications can be designed to build one or more applications and configure data specifications to reflect different business use cases. For example, a user can create/update data sets, manage data load and security rules, define attributes metadata properties and identifiers, and define how to associate multiple data sets to enhance user experience and data discovery insights. Embodiments also provide functionality to create applications and pages with multiple page components and manage export and import of dashboard entities generated from these processes.

In some embodiments, applications can represent a configuration (e.g., according to a use case) for an implementation of a dashboard. For example, new applications can be created for business divisions and the definitions for the applications can be edited to provide a custom configuration. Applications can be differentiated by display name, distinct application short name, URL, owned data sets, and the like.

In an example, a user can search an existing applications list and decide whether to define new application corresponding to their business application. In some embodiments, applications have their own enabled data sets, and records within these data sets can be ingested and updated by an application's data load submission request through data set load rules. In some implementations, owned data set definitions can included in an import/export utility.

Figure 3:
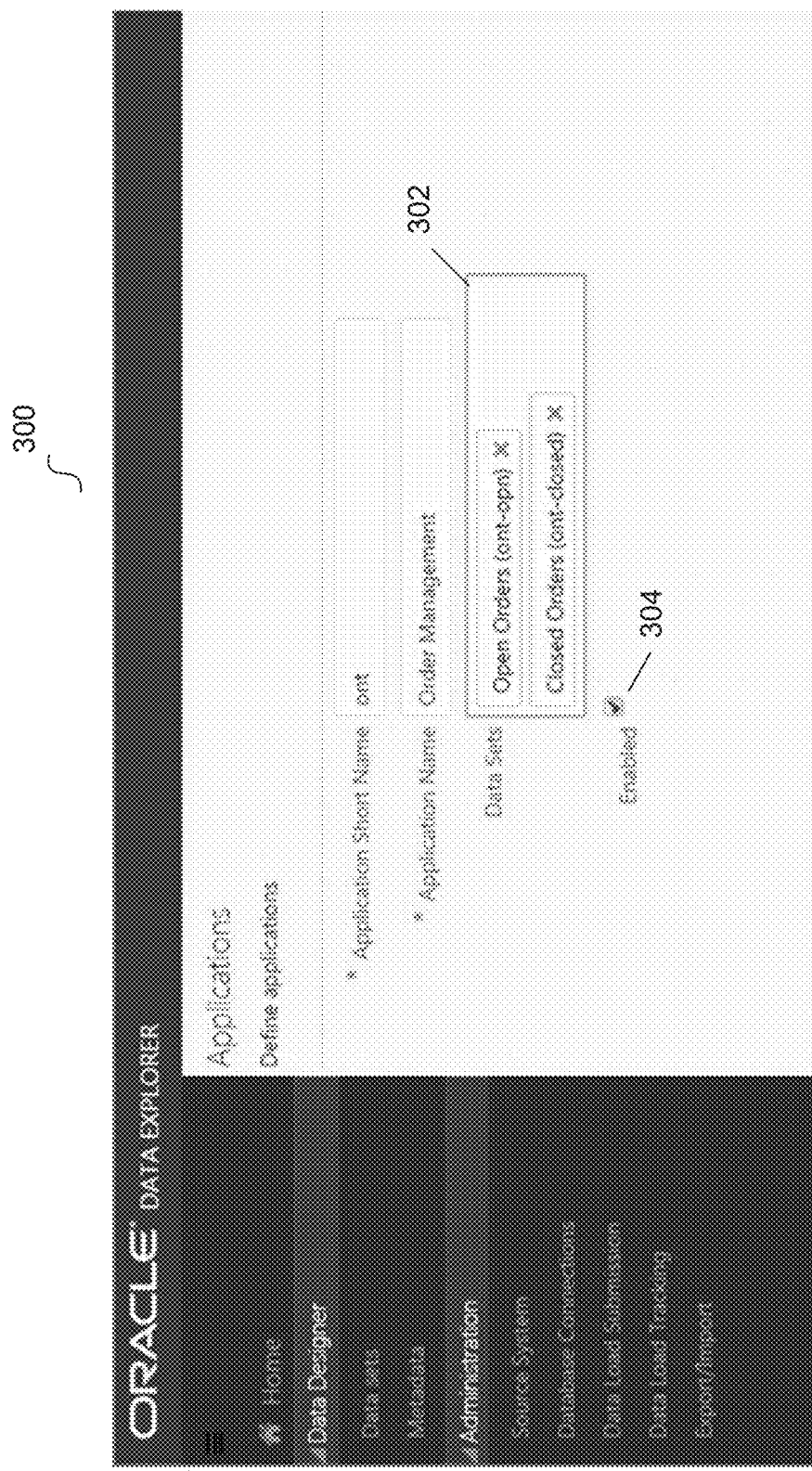
FIG. 3 illustrates a graphical user interface for creating and/or editing applications according to an example embodiment.

Various embodiments include the functionality to create new applications, edit existing application definitions, assign enabled data sets to applications, and/or enable/disable applications. FIG. 3 illustrates a graphical user interface for creating and/or editing applications according to an embodiment. For example, interface 300 can be used to input an application name. In addition, data sets owned by the application can be input into element 302 and element 304 can be used to enable or disable the application.

In some embodiments, one or more pages can be defined for an application. For example, pages can include several components that represent related business use cases within the application. Embodiments include creating one or more pages per application, where page components can be configured using owned or any other data sets. In some embodiments, created pages include a page short name, pages can be enabled/disabled, and page definitions can be edited. In a given implementation, pages can represent a related business cycle throughout its page components.

Figure 4:
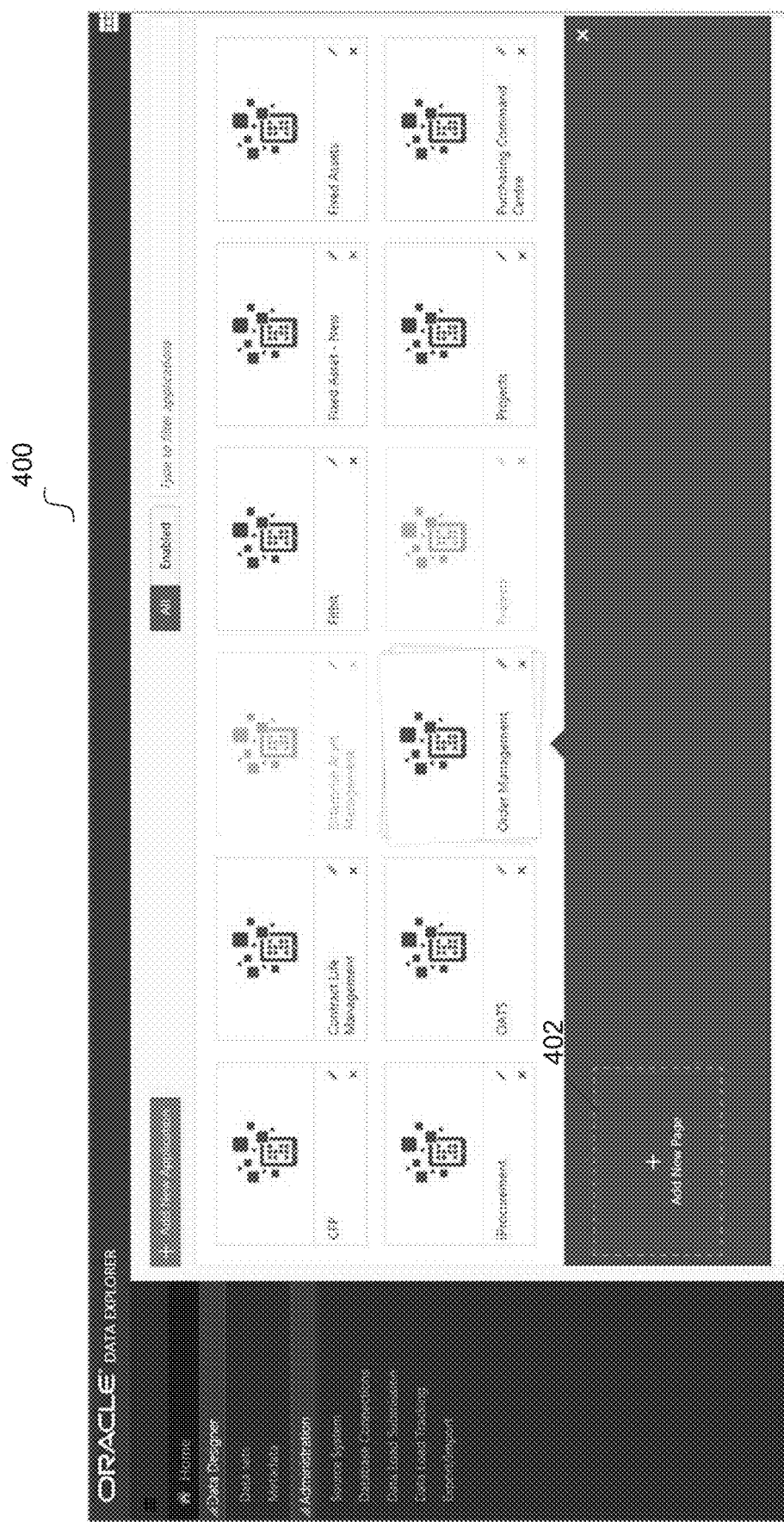
FIG. 4 illustrates a graphical user interface for viewing pages of applications according to an example embodiment.
Figure 5:
FIG. 5 illustrates a graphical user interface for defining pages of an application according to an example embodiment.

FIG. 4 illustrates a graphical user interface for viewing pages of applications according to an embodiment. For example, interface 400 can include a list of applications, where element 402 can be used to add/edit a page for the selected application. FIG. 5 illustrates a graphical user interface for defining pages of an application according to an embodiment. For example, interface 500 can include element 502 that display the application for the page being defined. In addition, a page short name and page name can be input into element 504, and element 506 can be used to enable/disable the selected page.

In some embodiments, data sets are used to configure defined pages and/or applications. A data set can be a collection of data attributes grouped based on specific conditions, for example to represent a business use case. In some embodiments, a data set can have a distinct key and its own data load rules. For example, these data set load rules can determine the following: source database objects (database packages and database procedures) that are called to ingest specific data set attribute values into the data set; data load types, where full data load can wipe out the current data set values in the system and re-ingest the last updated ones to be reflected on the dashboard page components, and incremental data load can update the existing data set values by adding new records to update existing records and/or delete unneeded records. In some embodiments, unique data sets can be defined with multiple sequenced data load rules from several system connections. Data load rules types, objects (e.g., procedures and/or packages), source database connection, and the sequence for these rules can be defined per data set. In some embodiments, data displayed from attributes owned by data sets can be displayed on page components based on parameters passed within the data set rules.

Data sets can represent a data model in which source records are partitioned into named data sets, according to their key assignments. Keys can be used to identify records and data sets. A data set specification can be used to identify each data set, and can have an assignment from one attribute that, in some embodiments, is unique and single assigned. In some implementations, the data set specification can also serve as a record specification. An application can own a data set and an owned data set can be used as a reference data set in component configurations. In some embodiments, data sets can be created by name, description, and distinct key to define a new business use case represented by a collection of attributes.

In some embodiments, existing data sets can be searched and edited, or new data sets can be created. Embodiments can also apply security rules to allow access to specific data set attribute values for dashboard page components.

Figure 6:
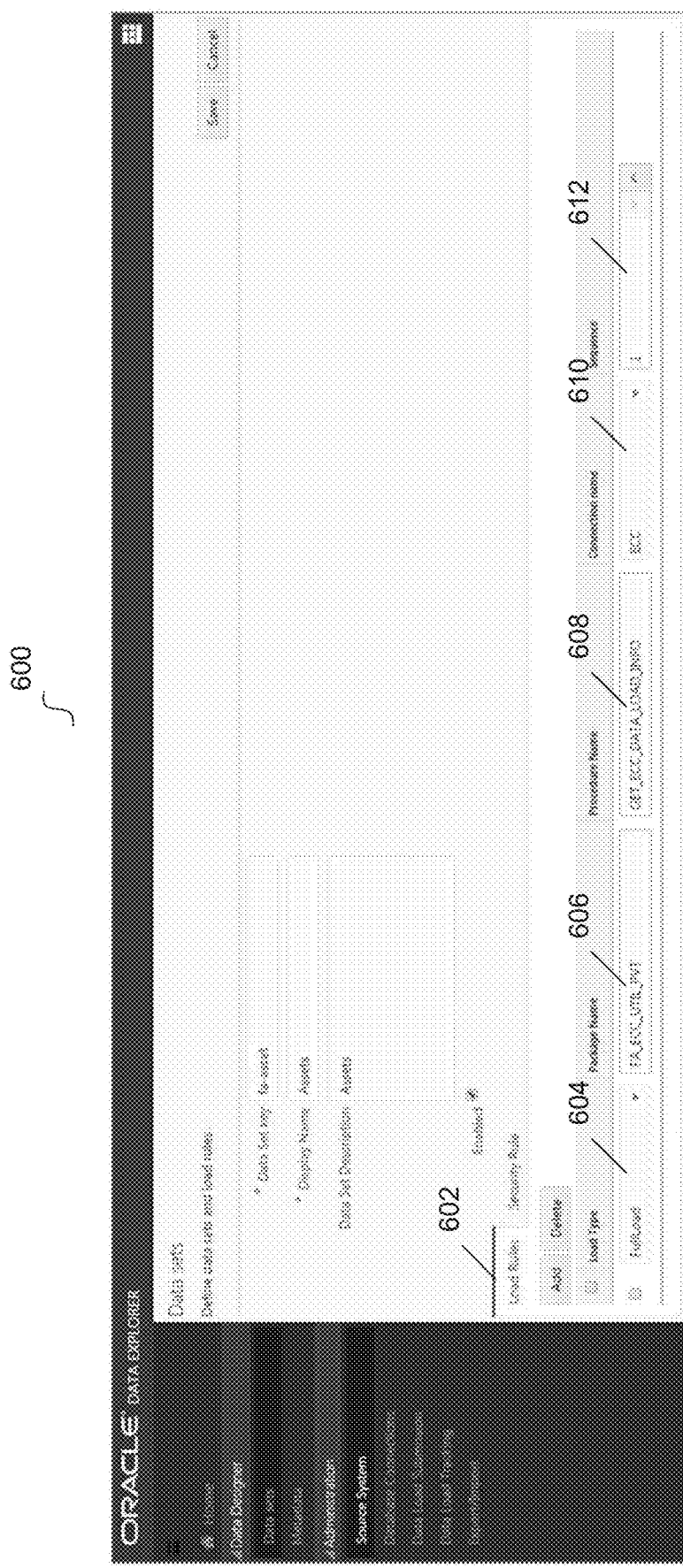
FIG. 6 illustrates a graphical user interface for defining data set load rules according to an example embodiment.

FIG. 6 illustrates a graphical user interface for defining data set load rules according to an embodiment. For example, interface 600 can include interface elements for receiving input and/or displaying a data set key, display name, and data set description. Interface 600 also includes tab 602 for configuring load rules for the data set. For example, one or multiple load rules can be added for the given data set by using the add or delete buttons of tab 602. For a given load rule, element 604 can be used to select a load type (e.g., full load, incremental load, or the like), element 606 can be used to select a package name, element 608 can be used to select a procedure name, element 610 can be used to select a connection name, and element 612 can be used to select a load sequence (e.g., sequential numbering, where multiple load rules can be added and sequenced using the numbering).

Figure 7:
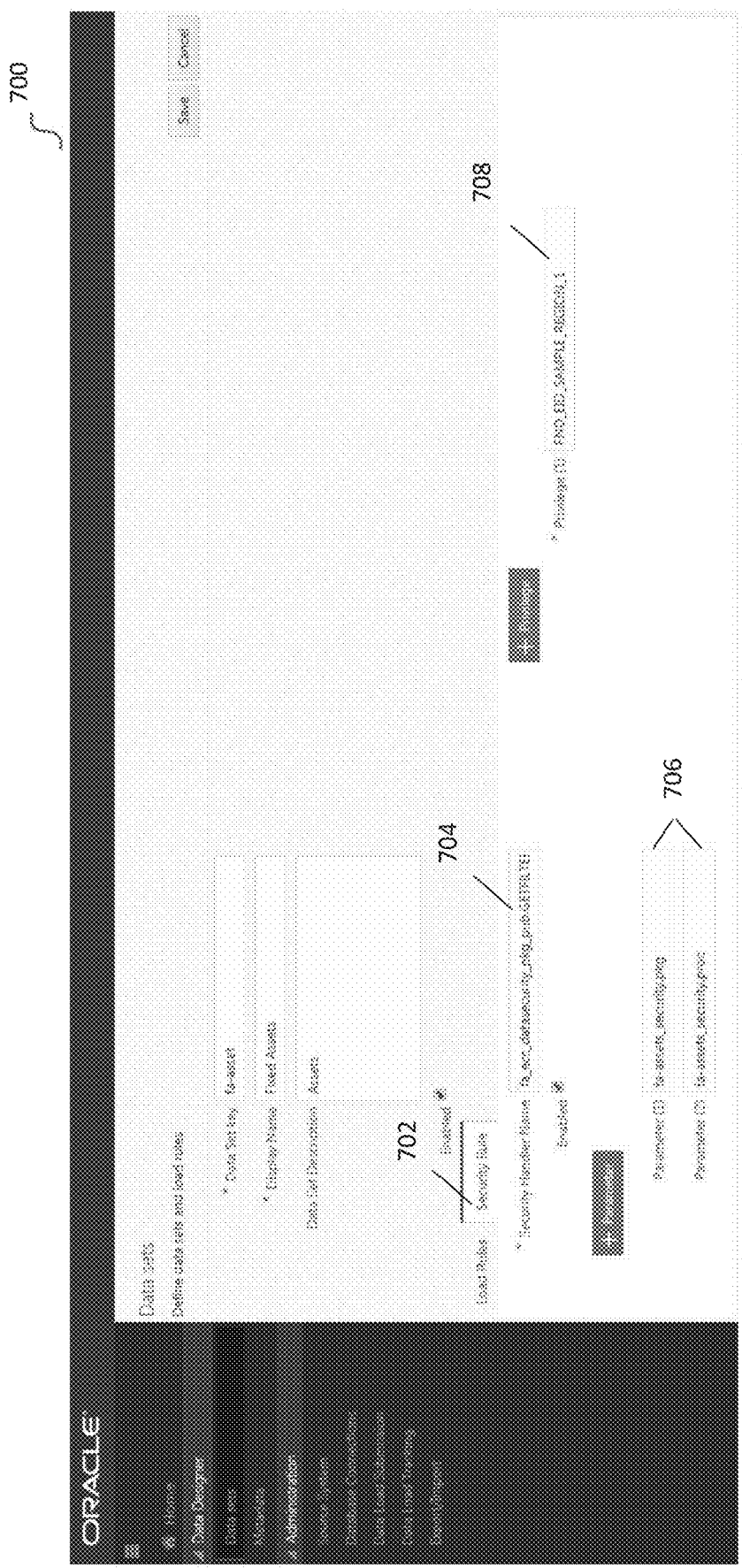
FIG. 7 illustrates a graphical user interface for defining data set security rules according to an example embodiment.

FIG. 7 illustrates a graphical user interface for defining data set security rules according to an embodiment. Similar to interface 600 of FIG. 6, interface 700 can include interface elements for receiving input and/or displaying a data set key, display name, and data set description. Interface 700 also includes tab 702 for configuring security rules for the data set. Tab 702 includes element 704 for inputting a security handler name that can define the security rules for the data set. One or multiple security parameters 706 can be added in addition to the security handler name using the add parameters button of tab 702. (e.g., sequential numbering, where multiple load rules can be added and sequenced using the numbering). The security rules can also be enabled or disabled using an interface element (e.g., check box) of tab 704. One or more privileges 708 can be added in addition to the security rule defined in 704 to control the integration with the source system (e.g., EBS).

In some embodiments, data sets can include metadata that defines how components of the dashboard can interact with the data set. For example, metadata can represent properties assigned to attributes per data set that control the behavior of these attributes when used by dashboard page components. In some examples, metadata can be classified into two categories: metadata and precedence rules. For example, metadata can be the common properties assigned to an attribute in a data set, including one or more of:

Attribute Key: The attribute key in the source database;

Source Attribute Data Type: The inherited attribute data type from the source database. Such as: String, Integer, and the like;

Attribute Profile: The value assigned to the attribute that determines how the attribute will be used in the configurations of page components. Such as: spec, int, ints, string, strings, and the like;

Enabled Refinement Attribute: Allow the attribute to refine dashboard pages;

Enabled Text Searchable: Allow attribute values to be searched using the page global search box;

Refinement Behavior: Whether the attribute is allowed to be single-select/multi-OR or multi-AND from the guided discovery component;

Refinement Order: How the values of the attribute will be ordered in the guided discovery, whether alphabetically (lexical), by record count, or by some other order;

Show Record Count: Display count of records in data set that match specific value of attribute;

Attribute Default Value: Optionally assign default value to null records for a given attribute. Such as: Unassigned, Unmatched, and the like;

Displayed in Guided navigation: Allow guided discovery of data set based on this particular attribute;

Collapsed in guided discovery: Controlled default disclosure behavior of attribute values;

Attribute Display Name: The name displayed by the attribute on the dashboard page;

Attribute Custom Display Name: Customize attribute name based on implementation;

Attribute Description: Long form description of attribute; and

Snippet Size: Whether the attribute's value searching is to be fetched after retrieving a snippet with specific size of value characters.

Embodiments set the behavior of data set attributes to manage how they are used in configuring page components. This can be managed by allowing a direct import of data set attributes into a dashboard and an intelligent population of common properties (metadata) per these attributes, including the availability to update them in an incremental fashion by several metadata import processes. The metadata can also include an Attribute Profile that determines, for instance, whether the attribute is used as a metric or dimension or whether the count of records for a given dimension attribute is to be displayed. In some embodiments, Metadata populations can be performed on imported data set attributes as follows:

Enable "Refineable" and "Text Searchable" by default to attributes with (String) source data type;

For (ECC_SPEC_ID) attribute key, intelligent metadata can be defaulted as follows:
Profile=Spec;
Disable (Text Searchable and Refineable);

Assign (double) profile, for Source Data Type=Number, Digits>10, has decimals;

Assign (float) profile, for Source Data Type=Number, Digits<10, has decimals;

Assign (long) profile, for Source Data Type=Number, Digits>10, has no decimals;

Assign (int) profile, for Source Data Type=Number, Digits<10, has no decimals.

Embodiments include the ability to filter the metadata by attribute key, source data type, profile name, and display name and edit the metadata. In an example implementation, a user can click the metadata action link to open the metadata page (e.g., filtered by a data set). The metadata page can allow the user to select an existing database connection and a source database object (e.g., views) related to a given data set to automatically import data set attributes and intelligently populate common attribute properties (metadata). In some embodiments, these common attributes properties can be overridden by easily searching the record and applying inline changes on it in an attribute options table.

In some embodiments, when the source database object (view) that owns the data set attributes and their metadata has changed, the import process can be performed again in an incremental fashion to re-populate the changed metadata. Some examples also include manual changes, such as adding/deleting metadata main attribute properties. In some embodiments, for changes created later on the data set metadata after running the data load request, the user can be prompted to perform the data load request again to reflect these changes.

Figure 8:
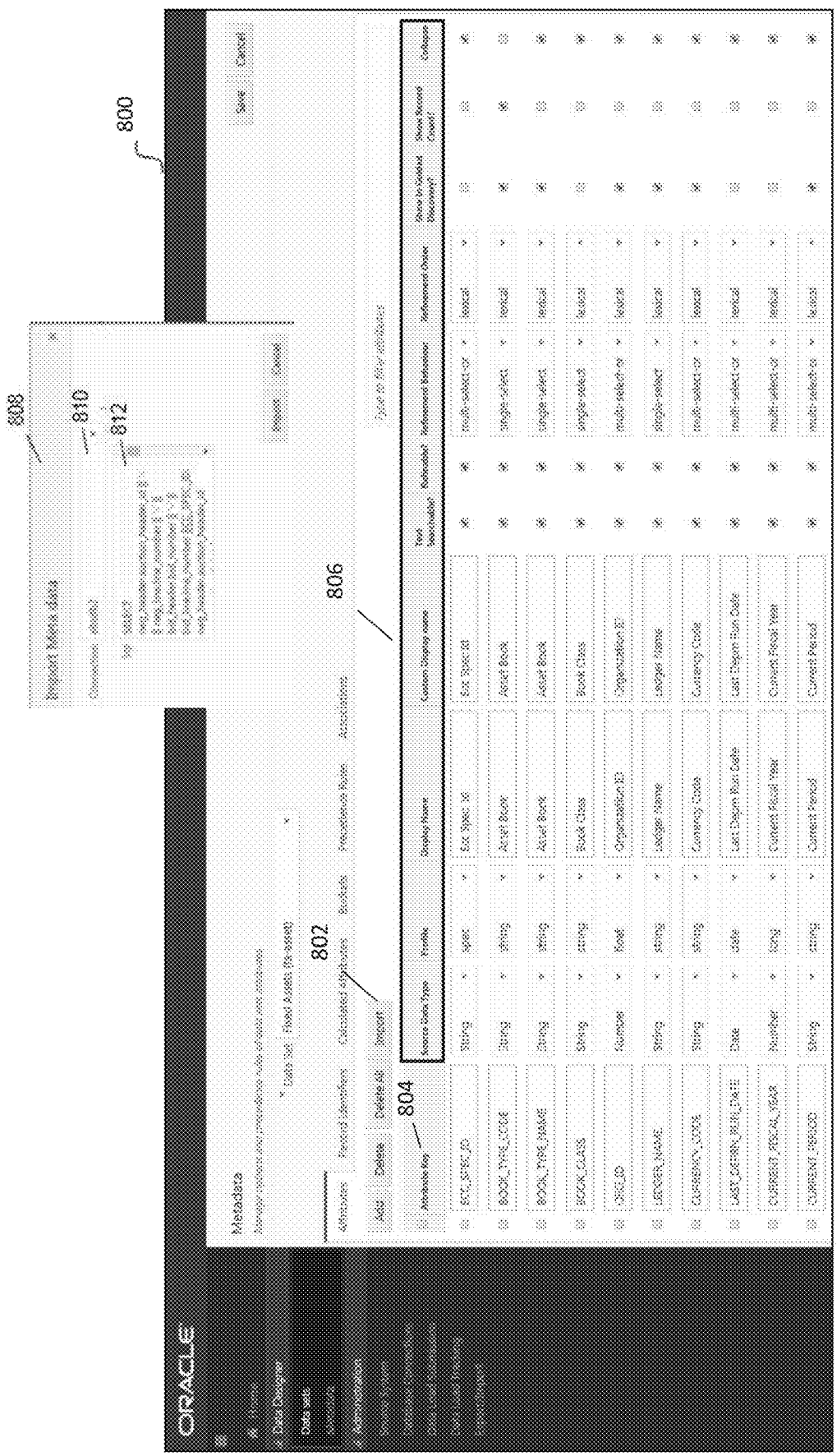
FIG. 8 illustrates a graphical user interface for defining data set metadata according to an example embodiment.

FIG. 8 illustrates a graphical user interface for defining data set metadata according to an embodiment. Interface 800 can include interface elements for receiving input and/or displaying data set related information, such displaying/selecting a data set by name. Interface 800 includes button 802 for importing metadata for a given data set. Interface 800 also includes add and delete buttons for manually adding or deleting metadata for one or more of the attributes for a data set, indicated by attribute keys 804. In the depicted implementation, metadata 806 is defined for each attribute indicated by attribute keys 804. The metadata can be manually edited/defined or can be imported using button 802. For example, selection of button 802 can launch interface 808, which includes element 810 for selecting a database connection and element 812, for providing query language (e.g., Structured Query Language ("SQL")) for selecting the relevant attributes and metadata from the database connection to be imported for the data set.

In some embodiments, the metadata can include record identifiers. For example, record identifiers can be optional metadata where the records of data sets have more than one single identifier. Data set record identifiers can be specified to avoid data replicates representation and calculations displayed by the page components.

In some embodiments, a record identifier can be used to pick one record from a plurality that has the same value for that attribute, and discard other records. In this example, attributes for each record at the extracted view can be from the same record from the base data set.

In some embodiments, data sets in the dashboard are denormalized, which results in redundant data. Using denormalized data as is for aggregation or for displaying in a grid may result in wrong results depending on the context for aggregations. An example solution in an embodiment is to provide users with a way to create a view on the fly to be used as a target for aggregation and record queries. In these embodiments, denormalized data can be used to avoid heavy joins and still maintain the granularity of data.

In some embodiments, during data set ingest, data can be retrieved from parent, child and grandchild entities at one time. This can result in a detailed granularity data set. To represent data visually in pages at various levels of this denormalized hierarchy, the visual components on the page can choose a record identifier corresponding to the desired hierarchy level and accordingly dynamically eliminate undesired redundancy at that particular level. Embodiments that implement such an ingest can leverage a one-representation data set that can be loaded once, yet can be used to serve different purposes.

In some embodiments, if a unique identifier for a record on the view has more than one attribute, a composite identifier can be created before loading the data. For example, during data load, new attributes can be created for each composite identifier to hold all the data from all attributes for each record. In these embodiments, a unique value can be achieved for that attribute for each record that has unique value for all the attributes that uniquely identify the record.

In some embodiments, additional attributes, such as calculated attributes, can be defined for a data set. For example, at times, the information displayed to a user by the underlying data attributes can be enhanced. The dashboard allows a user to create new calculated attributes and that can be saved as metadata definitions. These calculated attributes can then be used by components of the dashboard, and in some instances by the dashboard bucketing (binning) functionality.

In some embodiments, calculated attributes are defined per data set, and the calculation is based on existing attributes for the data set. The calculated attributes can use the disclosed functions and operators disclosed to accomplish the desired calculation. Example calculations include:

| Use Case | Example |
| --- | --- |
| Calculation from multiple attributes | (COUNT DISTINCT (work_On_time)/(COUNT DISTINCT Scheduled_WO))*10<br>(COUNT DISTINCT(Shipments on time)/ COUNT DISTINCT(total shipments))* 100<br>MAX(AT_COMP_BUD_BUR_COST)* MAX(FIN_PHY_PCT_COMP)/100 |
| Time based calculation | sysdate - Order Date<br>Request Date - sysdate |

Figure 9:
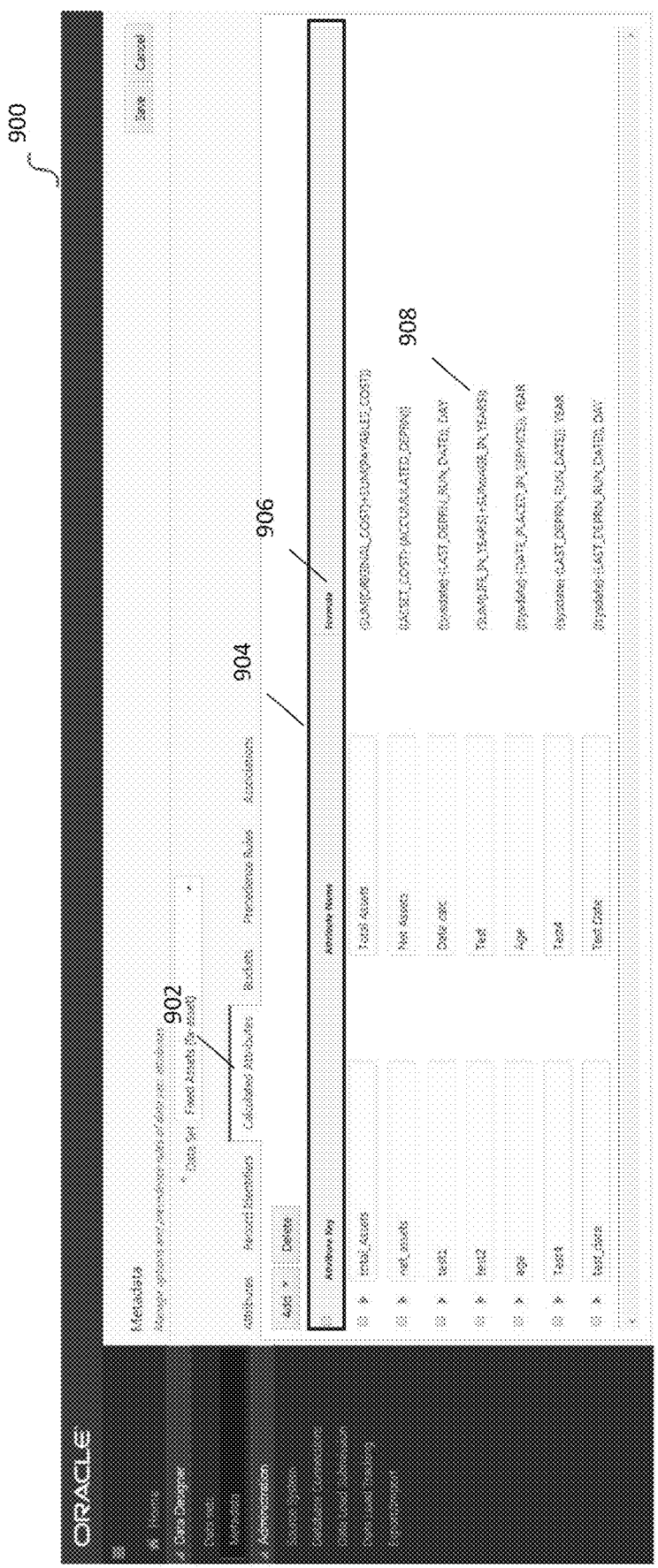
FIG. 9 illustrates a graphical user interface for defining calculated attributes for a data set according to an example embodiment.

FIG. 9 illustrates a graphical user interface for defining calculated attributes for a data set according to an embodiment. Interface 900 can include interface elements for receiving input and/or displaying data set related information, such displaying/selecting a data set by name. Interface 900 includes tab 902 that provides a display for configuring calculated attributes. Interface 900 also includes add and delete buttons for adding or deleting calculated attributes. Depicted examples show calculated attributes with different metadata 904, such as attributes keys, attributes names, and formulas. Formula 906 displays the formula used to calculate the calculated attribute. In some embodiments, the formula 906 can be edited by a user and saved to update a definition of the calculated attribute.

In some embodiments, calculated attributes can be used to configure one or more interface components of the dashboard. For example, calculated components can be used to configure at least flag functionality in any components, metric functionality in any components, summarization bars, charts, tag clouds, and any other suitable components.

Figure 10:
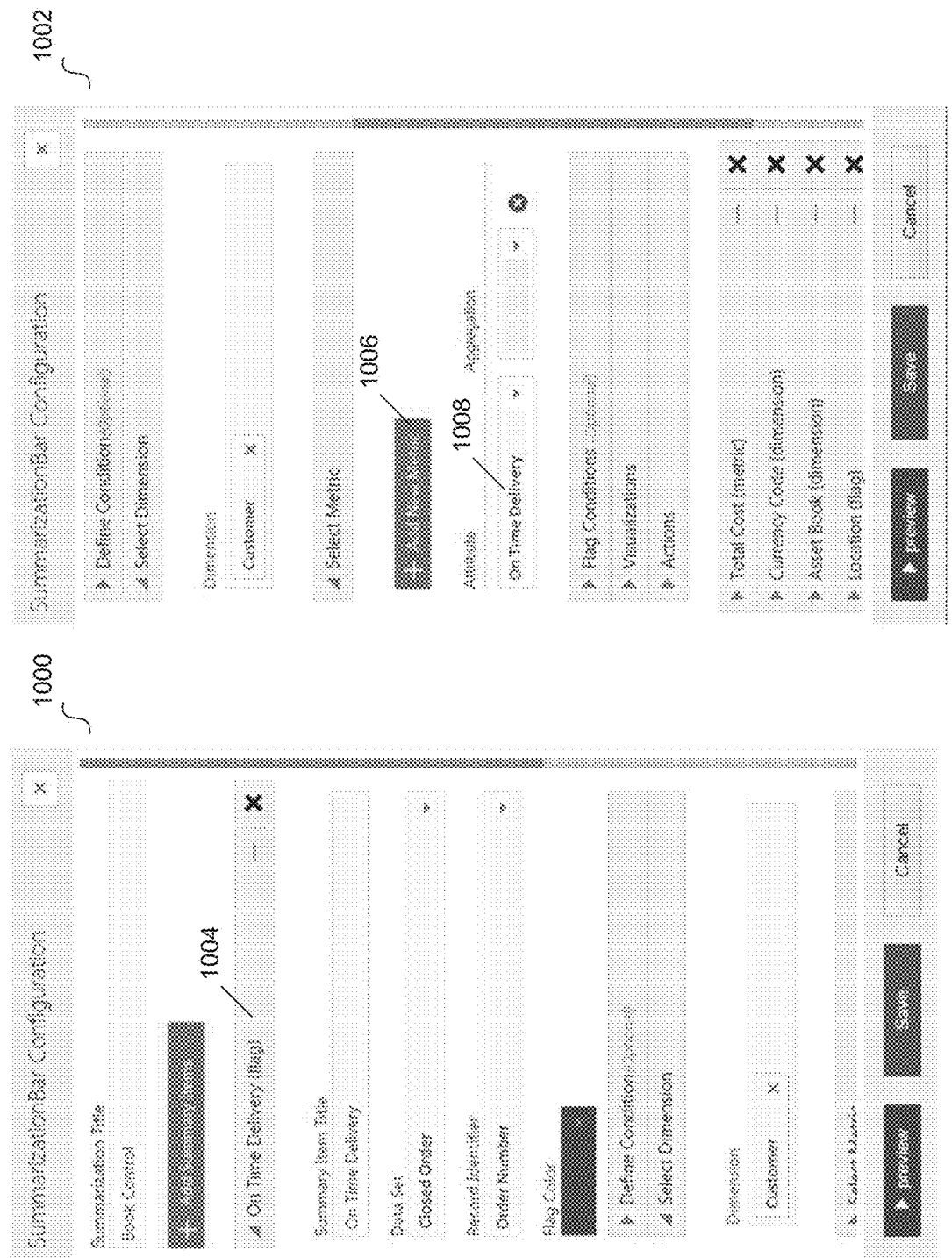
FIGS. 10-12 illustrate graphical user interfaces for configuring a component using a calculated attribute according to an example embodiment.

FIG. 10 illustrates a graphical user interface for configuring a component using a calculated attribute according to an embodiment. Interfaces 1000 and 1002 can include interface elements for configuring user interface components of a dashboard, such as a summarization bar. Interface 1000 includes flag 1004 which can be configured with a calculated attribute. Interface 1002 includes button 1006 that is used to add a new metric to configure the flag. Element 1008 includes the attribute used for the metric, in this example the On Time Delivery calculated attribute has been selected as the attribute for the metric.

In embodiments, the flag component can capture details about the dimension configured to determine the value to display in the flag. Additional metrics associated with that dimension can be displayed when additional details are displayed/triggered by flag popup action.

Figure 11:
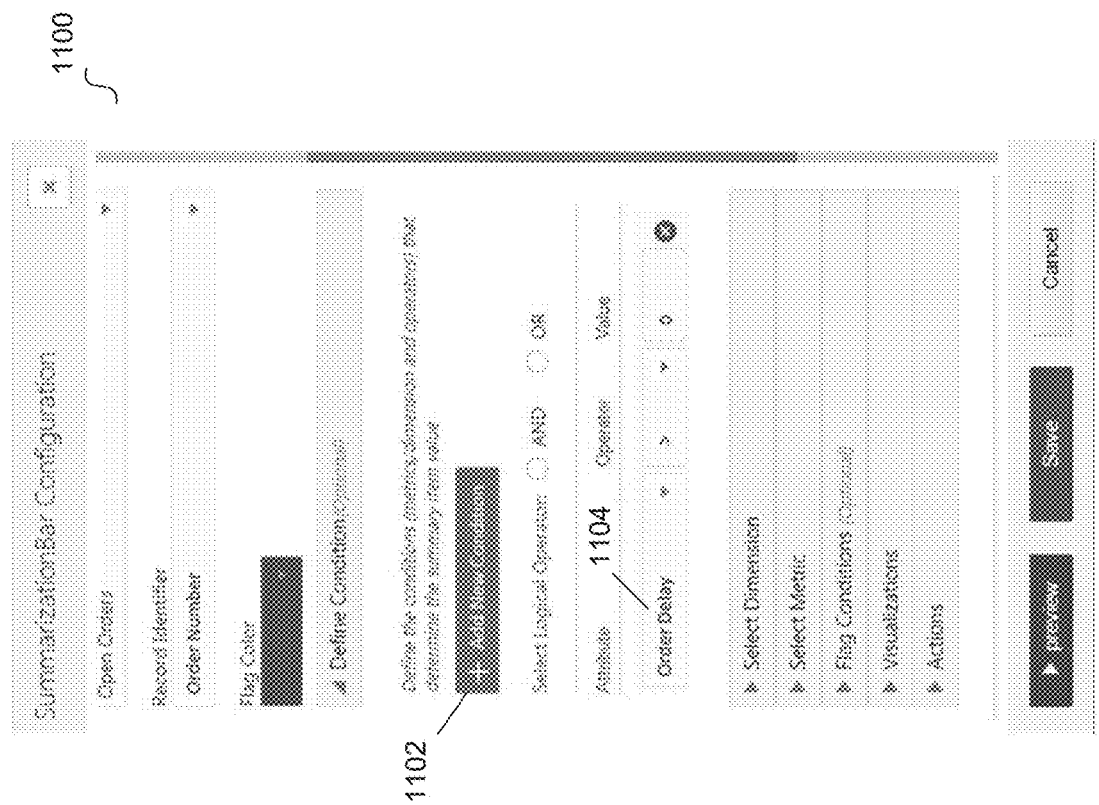

In some embodiments, a calculated metric can also be used to configure a condition for dashboard components. FIG. 11 illustrates a graphical user interface for configuring a component using a calculated attribute according to an embodiment. Interfaces 1100 can include interface elements for configuring user interface components of a dashboard, such as a summarization bar. Interface 1100 can be used to configure a flag with a condition, for example by using button 1102 to add a new condition. Element 1104 includes the attribute used for the condition, in this example the Order Delay calculated attribute is selected as the attribute for the condition.

Figure 12:
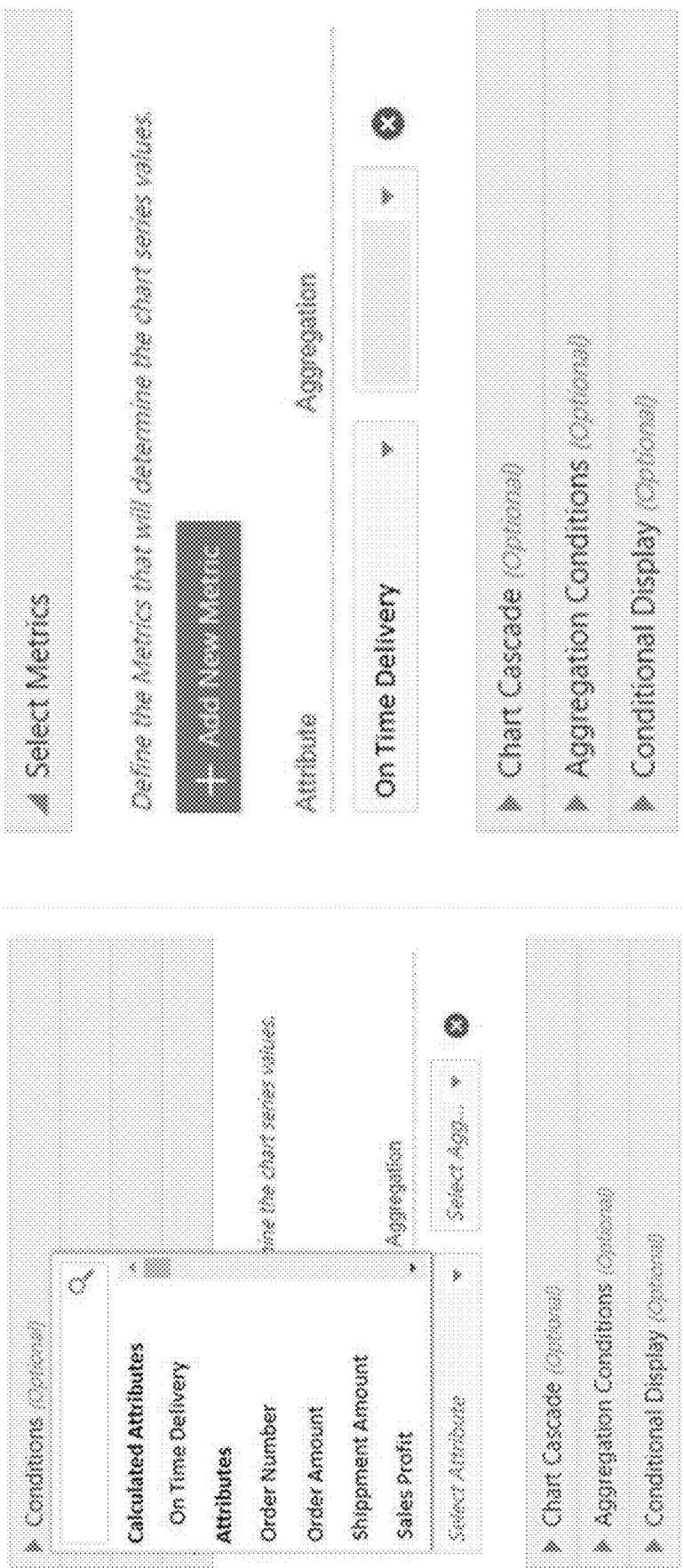

In some embodiments, other components of the dashboard, such as a chart, tag cloud, results table, and/or grid, can be configured using a calculated attribute. FIG. 12 illustrates a graphical user interface for configuring a component using a calculated attribute according to an embodiment. Interfaces 1200 and 1202 can include interface elements for configuring user interface components of a dashboard with a calculated attribute, for instance by adding a metric or a condition (e.g., aggregation condition) that selects a calculated attribute.

With regard to use of standard and calculated metrics by components of the dashboard, an embodiment can use the following validation:

Guided Discovery→displays STANDARD attributes
Summarization Bar→
  Flag:
    1. select metric displays CALCULATED and STANDARD attributes
    2. define condition displays CALCULATED attributes where UNIT is NOT NULL (date calculation) and STANDARD attributes
  Metric: select metric displays CALCULATED attributes where UNIT is NULL (math calculation) and STANDARD attributes
Chart→
  Select metric displays CALCULATED attributes where UNIT is NULL (math calculation) and STANDARD attributes
  Dimension displays BUCKET attributes and STANDARD attributes
  Tag Cloud→Metric: select metric displays CALCULATED attributes where UNIT is NULL (math calculation) and STANDARD attributes
  Results Table→displays CALCULATED attributes where UNIT is NOT NULL (date calculation) and STANDARD attributes
  Grid→displays CALCULATED attributes where UNIT is NOT NULL (date calculation) and STANDARD attributes In some embodiments, buckets can be implemented that indicate ranges (e.g., intervals) for certain data values. Buckets can represent time periods used to review and report on specific data. For example, each bucket can be a closed-open interval of a number of ranges. In some embodiments, time sensitive buckets can be created. Once a bucket is defined, data can be filtered based on the defined bucket. Buckets can include both standard attributes and calculated attributes. In embodiments that include a chart component, buckets can be used as a refineable dimension.

Figure 13:
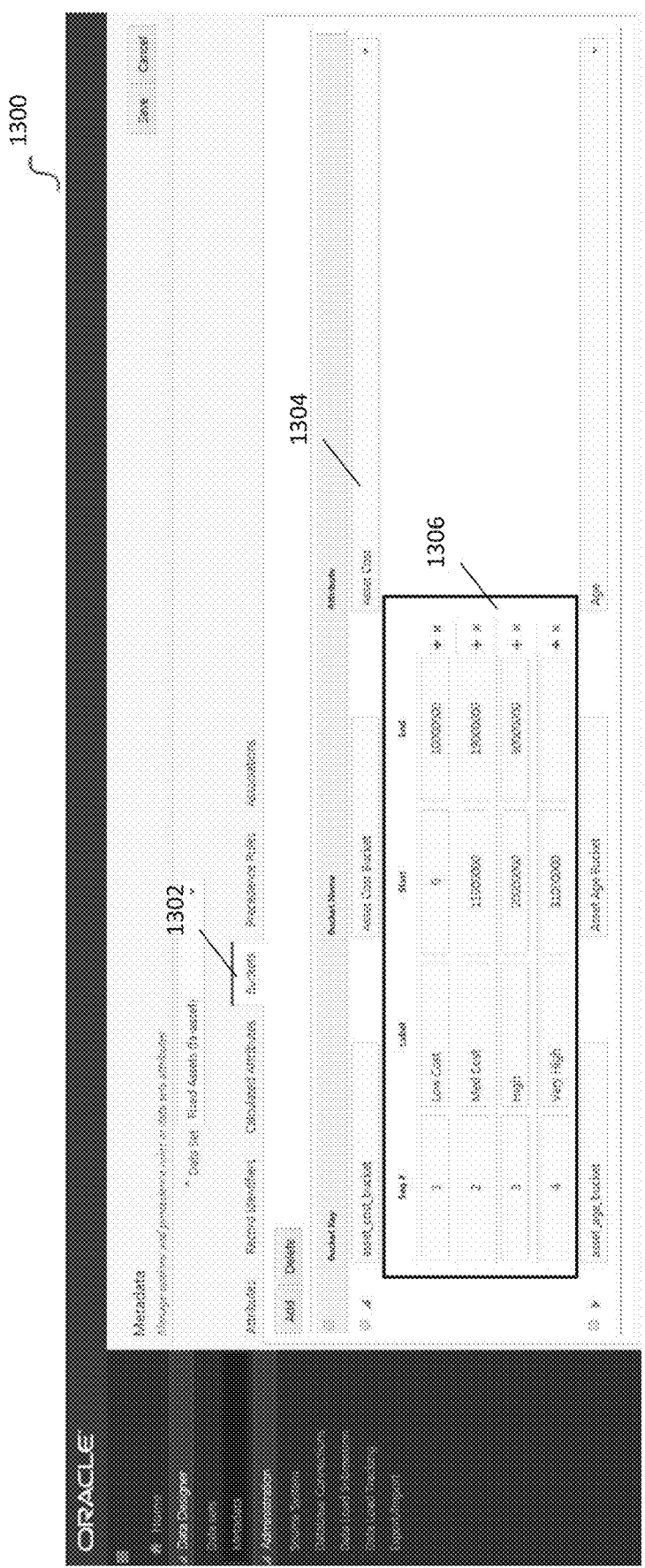
FIG. 13 illustrates a graphical user interface for defining buckets for attributes of a data set according to an example embodiment.

FIG. 13 illustrates a graphical user interface for defining buckets for attributes of a data set according to an embodiment. Interface 1300 can include tab 1302, and one or more buckets can be added or deleted using elements of the user interface. When adding or editing a bucket, configuration can include a bucket key and bucket name, and element 1304 can be used to select an attribute from the data set (e.g., standard or calculated attribute). The bucket can then be defined using elements 1306, including defining sequence numbers, labels, and a range (e.g., start value and end value).

In some embodiments, metadata for a data set can include precedence rules. Precedence rules can be assigned to some attributes in a data set to delay their display. In other words, an attribute can be hidden, for example until a change in condition triggers its display. Precedence rules can be used to enhance navigation through data and avoid information overload for users. For example, attributes of frequently used iProcurement items data set include a Shopping Category and a Monitor Size in Inch attribute. The dashboard can be more efficiently navigated when the Monitor Size in Inch attribute is hidden until the user has specified a Shopping Category. Otherwise, multiple Monitor Inches with the same name would be presented, and a user would have difficulty selecting the correct one. A precedence rule can be created with Shopping Category as the trigger attribute, Monitor as the trigger value, and Monitor Size in Inch and Monitor Color as the target attributes.

Embodiments add optional precedence rules on some data set attributes according to their business use case. Precedence rules can be edited or deleted, and are managed by defining data set trigger attributes, trigger values, and target attributes per precedence rule. Embodiments also filter metadata attributes options or precedence rules per data set. In some embodiments, precedence rules can be defined using imported data set attribute keys. For example, a precedence rule can have a trigger attribute key, trigger attribute value, and target attribute key that can be searched or updated per data set. In some embodiments, precedence rules can be enabled or disabled.

In some embodiments, precedence rules provide a way to delay the display of attributes until they offer a useful refinement of the navigation state. For example, precedence rules can be defined in terms of a trigger attribute and a target attribute, where a user's selection of the trigger reveals the previously unavailable target attribute to the user. In other words, precedence rules can be triggered by implicit or explicit selections (e.g., of standard attribute values). In some embodiments, these triggers cause standard attributes to be included as available refinements. When records in a navigation state are assigned a given attribute value, that attribute value is an implicit selection.

In some embodiments, in addition to being selected explicitly by the application, attribute values can be selected implicitly. For example, if all pens and pencils are from a first supplier, then the explicit selection of shopping category>pens and pencils can cause the implicit selection of supplier>first supplier. In some embodiments, implicit selection can be a function of the set of records in the navigation state, regardless of what combination of search, navigation, and record filters was used to obtain them.

In some embodiments, implicitly-selected attribute values trigger precedence rules in a similar manner as explicitly-selected attribute values. This behavior can help ensure a consistent user experience, by providing the same attributes for refinement of a given result, regardless of whether that result was obtained through search, navigation, or a combination of the two. In some embodiments, two navigation paths leading to the same set of records can have the same set of navigation selections (differing in whether the selections are implicit or explicit). Because of this equivalence, the set of precedence rules triggered in both states can be the same.

In some embodiments, dashboard pages allow configuring multiple components from different data sets. In order to maintain a smooth and linked refinement for pages configured from multiple data sets, data set associations can be defined. In some embodiments, associations can work with attributes that have one or more of the same or similar set of values as follow:

Enabled for refinement
Have the same data type
Have the same refinement behavior (single, multi-or, or multi-and)
Have the same multi-value setting as the first attribute (if the first attribute is multi-value, the other attributes can also be multi-value)
Are not already being used in another association rule In some embodiments, when a user refines a page (e.g., order management page) by an attribute that belongs to an association rule (order_number), page/dashboard components can be filtered by the selected value including components configured from other data set (receivables) and vice versa.

Associations can represent connections between two data sets by directly linking their common attribute who share a metadata profile name. For example, a sales data set for automotive data includes the make and vehicle ID number ("VIN") of cars that were sold. Another data set can contain warranty claims, and can also include the make and VIN of cars for which warranty claims were filed. A user can create associations for the make and VIN attributes between these data sets. When a user refines the sales data set by any attribute that belongs to one or more VINs, the warranty claims data set can also be refined to reflect the correspondent records for that VIN in the sales data set.

In some embodiments, implicit associations are supported to maintain an indirect link between data sets where, if two data sets are associated and a third data set is associated with one of those data sets by a new association rule, then the third data set is also automatically associated to the other of the two data sets in an implicit fashion. For example, consider the above embodiment where the sales data set is associated with the warranty claims data set by VIN. If a new data set is then provided for car maintenance schedules and it is associated with the sales data set by Schedule_ID, then refinement by an attribute of the maintenance schedules data set will explicitly refine the sales data set that have maintenance schedules and also implicitly refine the warranty claims data set by cars with warranty claims that correspond to cars VIN selected from the explicit association. In other words, refinement of the maintenance schedules data set flows to the sales data set by the explicit association and to the warranty claims data set by implicit association.

Embodiments define bi-directional association rules between data sets where a user can link one or more source attributes from the source data set to another target attributes in the target data set. In this example, filtering by an attribute from the source data set automatically refines the target data set and vice versa. Embodiments also provide implicit associations by allowing indirectly linked data sets to be refined as well when explicitly associated data sets are filtered. Embodiments also provide multiple associations with different target data sets as well as the functionality to edit, delete, or disable existing data set associations. Embodiments filter existing data set associations by target data set keys.

In an example implementation, a page can be created that displays three different attributes: Purchase Orders, Requisitions and Projects. The page can be designed with three different components to read from each data set where, in some embodiments, filtering from any component is required to filter the other two. Such filtration can include two bi-directional association rules:

Rule (1): Source data set is Purchase Orders and Target data set is Requisition, where source attribute is (requisition_distribution_id) and target attribute is (req_distribution_id)

Rule (2): Source data set is Open Customers Invoices and Target data set is Open Orders, where source attribute is (task_id) and target attribute is (task_id)

In this example, refining the component based on requisition data set, for instance, with a requisition number attribute, will also refine the component based on purchase order data set with matching purchase orders that have the selected requisition number. In addition, the second component will also be refined based on the projects data set with the projects that have the tasks of the purchase orders refined.

Figure 14:
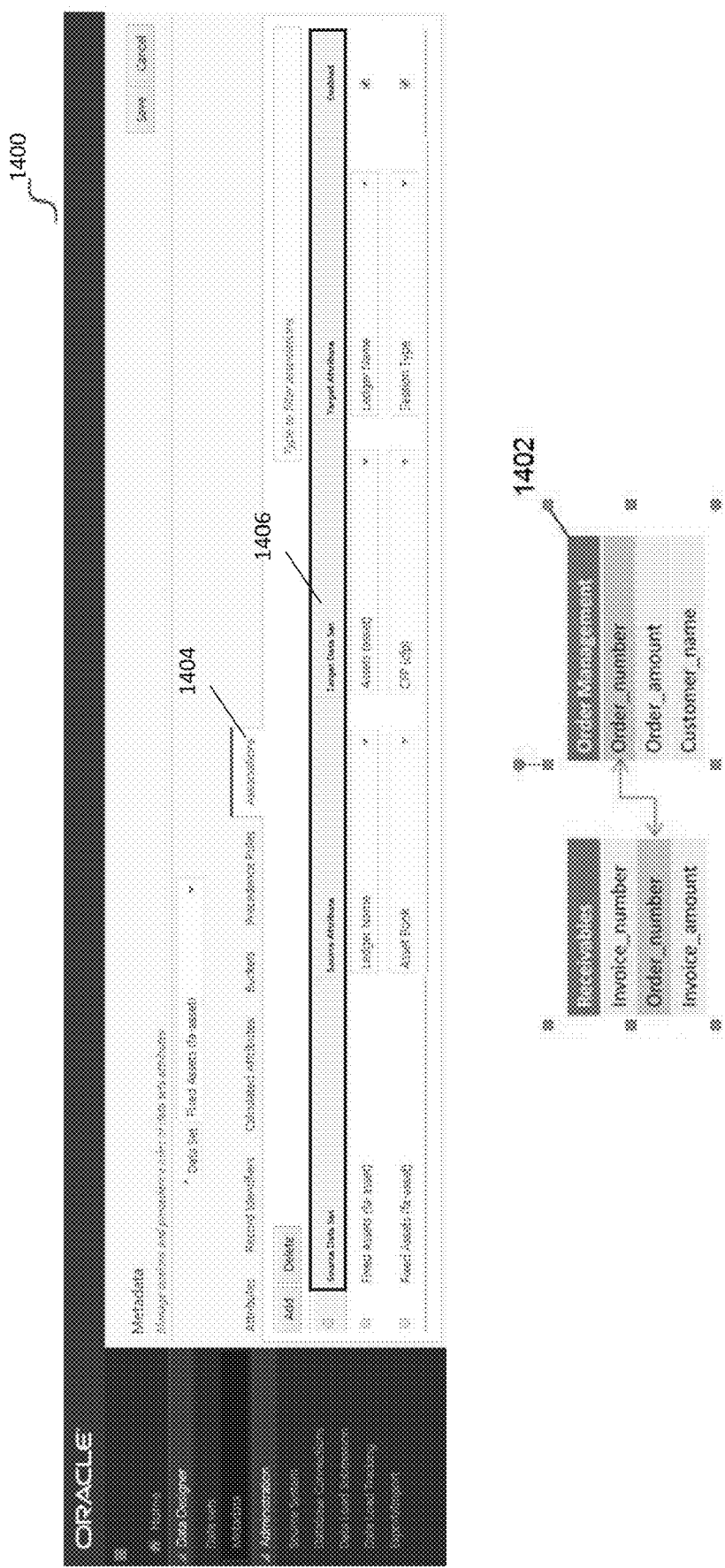
FIG. 14 illustrates a graphical user interface for defining associations between data sets according to an example embodiment.

FIG. 14 illustrates a graphical user interface for defining associations between data sets according to an embodiment. Interface 1400 can include tab 1404, and one or more data set associations can be added or deleted using elements of the user interface. For example, association 1402 represents a data set Receivables that is associated with a data set Order Management by the attribute Order_number. An association can be defined by attributes 1406, including a source data set, a source attribute, a target data set, a target attribute. Associations can also be enabled or disabled by a user using interface 1400.

In some embodiments, a dashboard can be configured according to an administration menu. For example, a menu can be used to manage the administration of dashboard systems and functions, connections, and data load request submission and tracking for applications and data sets. The menu can include various submenus including one or more of:

Source Systems—This section can provide details about the source system name, security manager, and database connection for a dashboard embodiment.

Database Connections—This section can provide a list of created database connections to source system and other systems.

Data Load Submission—This section can allow the administration to refresh the data that appears on application pages or by a given data set. It can also determine the level refresh for the data and the level of SQL tracing of output requests.

Data Load Tracking—This section can allow tracking of submitted data load requests and drilling down to the status, time elapsed, and starts and end timestamps of submitted requests.

Export/Import—This section can allow the extraction of application definitions, including their owned data sets and page components configurations, to an external file, and also the importation of it to another instance to automatically transfer exported applications definitions.

Log Files—This section can display log files for the dashboard.

Embodiments inherit details from a source system, for example a source system that a user logs into when loading embodiments of the dashboard. The source system can include one or more of a source name, security manager, and database connection. Embodiments of the dashboard can also edit the security manager information on the source system level.

In some embodiments, a source system can represent an owner (e.g., external owner) of the data set that is displayed on the dashboard. For example, a source system can be a processing or transactional system that is used as a system of record, but lacks dynamic display functionality or other analytical capabilities, such as dashboarding, advanced data analysis or guided discovery, and/or multi facetted search capabilities. In some implementations, the source system can have well defined and elaborate rules that maintain segregation of duty rules to control access to certain business functions and associated business data.

Embodiments of the dashboard allow for software access (e.g., a plugin) that a source system can use to enforce those rules on the dashboard through a security manager implementation. These embodiments can guarantee one source of truth for security rules and can delegate back the implementation of these security rules to the source system that owns the data. In some embodiments, connectivity to the source system database is leveraged to enforce the security rules. Oracle® Fusion Financials Cloud or Oracle® E-Business Suite are different examples of source systems.

In some embodiments, a user can begin by logging into a system and accessing the menu to administer the dashboard. From the administrator menu, the user can access the source system name and description labels, database connection identification and string, and security manager name.

In some embodiments, database connections can be used to configure data set load rules connections and to import metadata (e.g., by query, such as using SQL). For example, a list of configured and Application Programming Interface ("API") uploaded database connection names and strings can be retrieved.

Embodiments manage the submission of data loads centrally, for example from the menu. A user can control a level of detail of the data displayed on the menu application pages and their data sets. Embodiments define a detailed level of output and SQL tracing for the output of those requests. For example, a data load submission request from a user can include one or more of the following:

Application Name: Implying that a data load will be refreshed for all data sets owned by this application in the Application Definition form.

Data Set Name: Implying that the data load refresh will be submitted for this applications data set.

Data Load Type: FullLoad or Incremental Load data refresh.

Log Level: The level of details to appear in the log file of the submitted request, whether: TRACE, DEBUG, INFO, WARN, ERROR.

Enable SQL Trace: Enabling SQL tracing can include allowing a user/administrator to drill down to the status of the various SQL queries executed through the data load submission requests of the selected application or data set.

Force: By enabling the Force, the user implies that the data set has been recreated before data is loaded into it.

Figure 15:
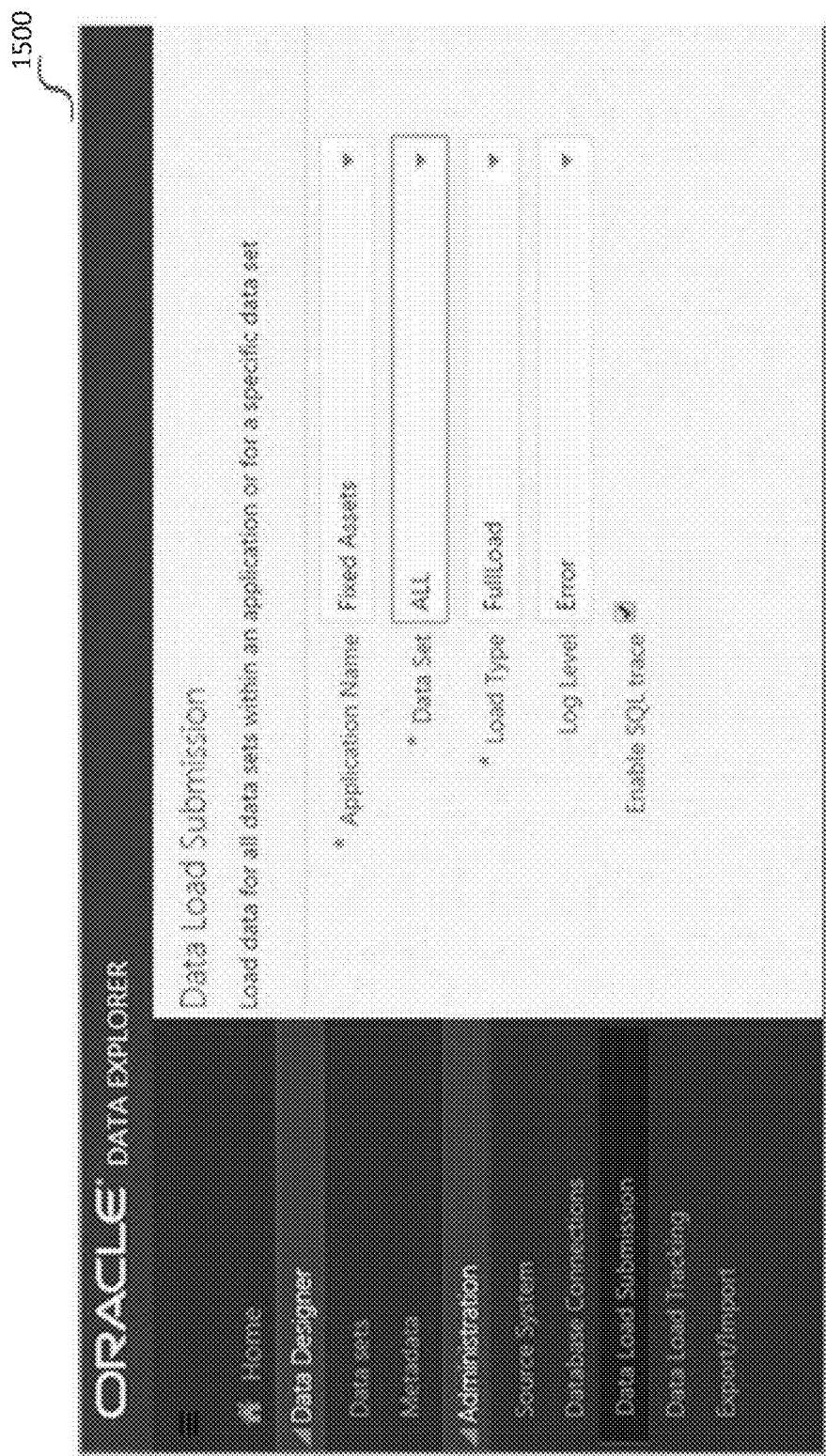
FIG. 15 illustrates a graphical user interface for data load submissions according to an example embodiment.

In some embodiments, a user can refresh loaded data sets for one or more applications (e.g., data sets for all applications, specific data sets for specific applications, and the like). FIG. 15 illustrates a graphical user interface for data load submissions according to an embodiment. A user can configure a data load submission request using elements of interface 1500 by specifying/selecting an application, data set, load type, log level, and additional options (e.g., SQL trace and force enablement).

Embodiments track the progress of data load requests that fully or incrementally load data from their source system into the dashboard applications. For example, tracking can follow the following flow:

First: Request—This layer can display the basic information about the data load request including a run ID, load type, application name, all/specific data set keys, status, start and end date-time, total time elapsed to complete the request and a status message.

Second: Data Set—This tracing layer can display the data load details per every data set key in the application, including data set key, data load status and status message, data load request start and end dates and total time elapsed.

Third: Load Rules—This layer can display the data load details per data set load rule, including the load rule sequence number, the data load process status and status message, start and end dates for running the load rule including the time taken to run its procedure and ingest the data, total time taken to run the procedure, and total time elapsed to complete the data load for the whole data set load rule. In addition, based on the SQL Trace parameter option of the data load request, the following SQL details can be available to be traced.

Fourth: SQL Details—This layer can display the data load details per SQL (e.g., command or query) included in the procedure called by the data set load rule, including SQL run status and status message, start and end dates for running the command or query, total SQL time, SQL identification, SQL query, SQL operation, and number of rows processed and/or failed. In some embodiments, SQL trace can implement any other suitable query language trace.

In an example implementation, after submitting a data load request, the user interface can directly navigate to the data load tracking page in the menu, where the request can be displayed. The user/admin can review the details of request, such as: run identification, load type, application name, all/specific data set keys, status, start and end date-time, total time elapsed to complete the request and a status message. The user can also drill down to the data load for the various data sets called by the data load request, including: data set key, data load status and status message, data load request start and end dates and total time elapsed.

In order to provide enhanced visibility, embodiments of the menu can also allow the user/admin to drill down to the review the data load details of the load rules per data set, including: the load rule sequence number, the data load process status and status message, start and end dates for running the load rule including the time taken to run its procedure and ingest the data, total time taken to run the procedure, and total time elapsed to complete the data load for the whole data set load rule. Examples where further visibility parameters are enabled (e.g., SQL Trace) allows the user/admin to drill down to the details of commands and/or queries called by the procedure of every data load rule, including: SQL run status and status message, start and end dates for running the queries or commands, total SQL time, SQL identification, SQL query, SQL operation, and number of rows processed and/or failed. In some embodiments, the user/admin can also filter the data load requests by: Run ID, load type, application name, data set key and time, reset the filters and/or to submit new data load request.

Figure 16:
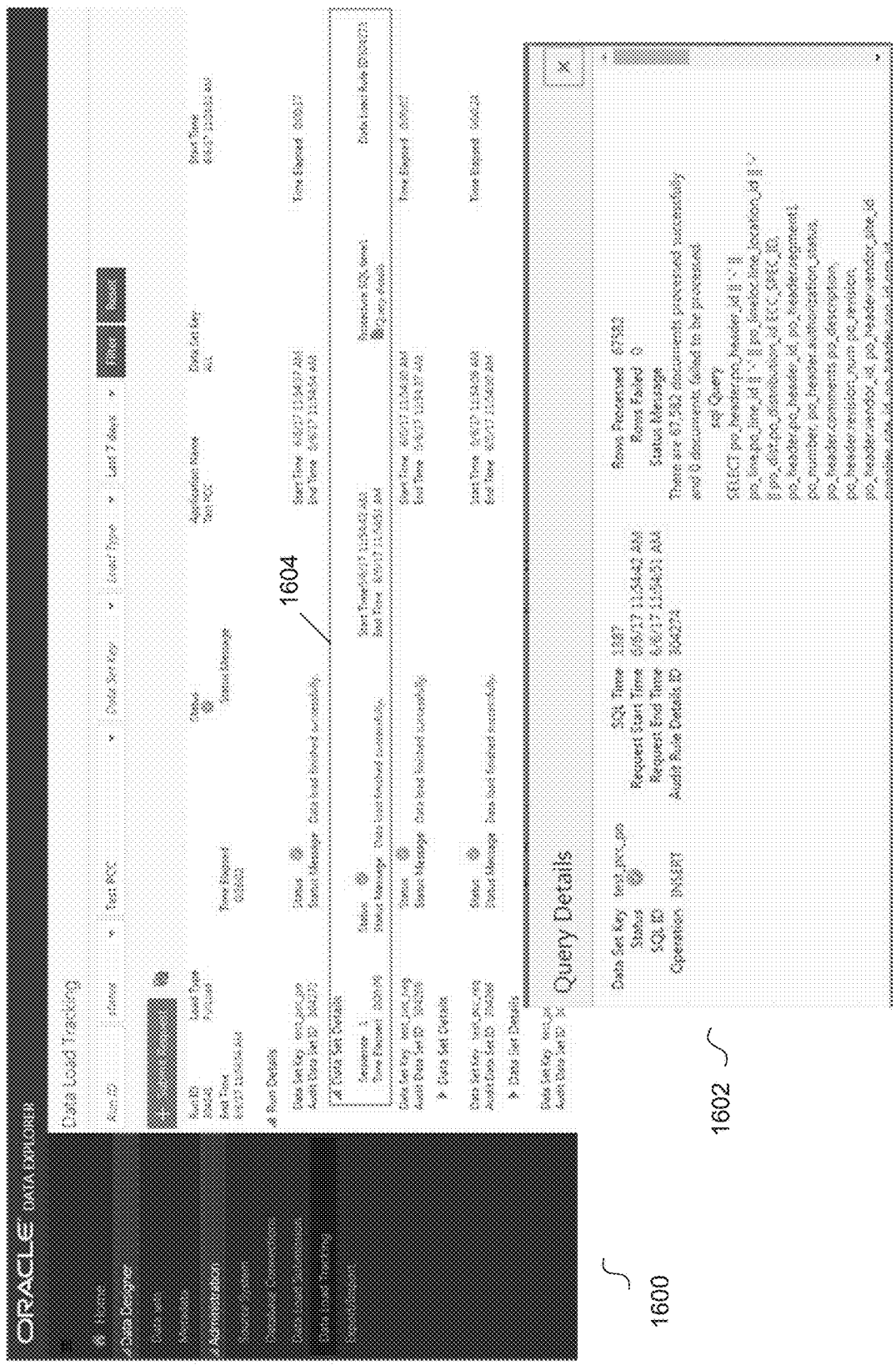
FIG. 16 illustrates a graphical user interface for data load submission tracking according to an example embodiment.

FIG. 16 illustrates a graphical user interface for data load submission tracking according to an embodiment. A user can track a data load submission request using elements of interface 1600 by specifying/selecting one or more of a run identification, status data set, data set key, load type, and/or time period for submission (e.g., last 7 days). Interface 1600 can then display details for one or more data load requests, for example those that meet the data load request details provided by the user. One or more of the displayed data load requests can be selected to drill-down and display additional tracked information. For example, selection of request 1604 can launch interface 1602, which provides additional tracking information about the request 1604. In some embodiments, these additional details can include the SQL trace information previously disclosed.

Embodiments export definitions of a dashboard application including owned data set definitions and metadata, pages definitions, and page components into an external file. This can enable efficient importation of that application's definitions to another environment. In some embodiments, importing also includes new and updated entities. Embodiments import page components and association with non-owned and non-existing data sets on target environments and correctly displays them upon re-importing those data sets on the target environment (e.g., through the target environment's interface/application). Embodiments track the export and import process success/failure details and stores them to an external log file, for example, per each import or export process.

In an example implementation, after data sets are defined/updated with metadata and a dashboard application (including its pages) have been designed with both owned and non-owned data sets on a given environment, embodiments export these details collectively in an external file. In some embodiments, the application's exported file can be imported, for example to another dashboard environment, based on a success message that indicates completion of both the export or import processes. Any successes/failures in the export or import processes can be tracked through a log file, for example, after receiving an error message.

In some embodiments, export processes include the functionality to export a number of application, page, and data set details, including application definitions, page definitions, component configurations, owned data sets and their metadata, associations with non-owned and non-existing data sets in with null values until these data sets are imported, page components configured by non-owned data sets and non-existing data sets with blank configurations until these data sets are imported. In addition, an export data file generated by the exportation process can be associated with a version or release of the dashboard system that generated the file.

In some embodiments, import processes include the functionality to import new and updated entities (e.g., applications, pages, components, data sets, and metadata), and import an application through an external data file with the option to delete missing pages. In some embodiments, an incompatibility between the exported data file and importing environment (e.g., version of the dashboard system) can be detected, and an importation can be prevented based on the detecting.

Embodiments include a dashboard configured with an application, and one or more data sets, pages and components for providing dynamic displays of data that can be filtered, for example based on the attributes of the underlying data sets. FIG. 17 illustrates a graphical user interface of a dashboard with a plurality of components according to an embodiment. Interface 1700 displays an embodiment of a dashboard that includes search component 1702, filters component 1704, guided discovery component 1706, chart component 1708, and summary component 1710. For example, interface 1700 can be associated with a page of an application, and that various displayed components can display data from one or more owned data sets. Other components, such as a tag cloud component, a graph component, a results table component, or a grid component may similarly be implemented by the dashboard.

For example, and as further disclosed herein, guided discovery component 1706 can display selectable filters that are based on the underlying attributes/values of a data set. In some embodiments, chart 1708 can be refineable based on filters selected from the dashboard and displayed by filters component 1704, where the selected filters also can be based on the underlying data sets (e.g., attributes). In the illustrated example, filters component 1704 indicates that the filter OPS CORP has been selected, and guided discovery component 1706, graph component 1708, and summarization bar 1710 have been filtered according to the selection.

In an embodiment, guided discovery component 1706 may display suggested filters for the data on the dashboard based on the data attributes for the loaded data sets and based on the data displayed on the dashboard. When the users select one of the suggested filters, the data displayed by the components of the dashboard may be filtered according to the selection. For example, data displayed by chart component 1708 can be filtered according to a filter selected from guided discovery component 1706. In another example, a filter selected from chart component 1708 can also filter guided discovery component 1706, and in addition to other components of the dashboard. In some embodiments, the suggested filters displayed by guided discovery component 1706 can be dynamically adjusted. In some embodiments, the filters selected from the various components of the dashboard can each be displayed by filters component 1704, for example to communicate to a user the current filtration level of the dashboard.

In some embodiments, chart component 1708 can illustrate a plurality of different data attributes according to a specific input configuration. The segments of chart component 1704 that correspond to various data elements can be selected by the user to filter the chart. For example, the segment of chart component 1708 that shows "76.5%" can be selected such that the chart is filtered according to that data element and/or other conditions (such as data ranges, and the like). When selected, the chart dynamically adjusts to show that selected data element and new segments that correspond to further data elements or conditions, as further disclosed herein. In some embodiments, a selected filter from the chart component is also used to filter data displayed by other components of the dashboard, and can be listed by filters component 1704. Additional description about various components of dashboard embodiments and configurations for these components is provided.

Embodiments include configuring components of a page/dashboard using a data set, attribute, and/or attribute value. An attribute can define a type of measurement/observation about the data. Each attribute can have a set of values. In some embodiments, attributes can be numerical or categorical, and these attributes can have either numerical or categorical values, based on the type. Numerical attributes can have discrete numerical values representing a particular set of numbers or can have an infinite continuous set of values. Categorical attributes are either nominal or ordinal. For example, categorical attributes and their associated values can be represented as dimensions in the different visual components on the dashboard. Examples of metrics are numerical values associated with those dimensions, such as an amount of sales per product. In this example, product is a categorical nominal attribute (dimension) while amount of sales is a numerical continuous attribute (metric).

Embodiments of a search bar component allow users to filter data using a search. For example, when a user performs a search, the search term can be added to the filters component for the data set being search. As users types in the search bar, the user can be prompted to select a matching attributes value from a suggestion list.

The search bar component can allow mining of data by partial or complete searching terms. For example, type-ahead suggestion listing attribute values that match typed text can be displayer to a user. In some embodiments, when a search is completed:

Embodiments of the dashboard can be filtered to include records with the matching search terms or selected attribute value. Additionally, previous searched filters can persist on the page.

The filters component can be updated to add the appropriate filter.

The selected value/data element/attribute can be removed from the guided discovery component.

In some embodiments, a value search can allow users to perform searches across attributes for values with matching names and returns single values that match the user's search terms. In embodiments, a value can match all of the search terms that the user provides in the search, organized by attribute. As a user types a search term, a list of attribute values containing the search terms can be displayed in the suggestion list. In some embodiments, the matching values can be grouped by attribute, and then within each attribute ordered alphabetically. Based on the maximum number of type-ahead suggestions to initially display for each attribute, a "Show More" link can be displayed to allow users to see the other values.

The following features can be available for embodiments that implement value searching:

Supported for string attributes

Default search behavior is search within

Implicit wildcard (*) added at the end of the search term, such as "gua*" for the search term "guarantee"

In multiple key search, an implicit AND added between two words

In some embodiments, a record search can allow a user to perform a keyword search against specific attribute values assigned to records. For example, a user can enter search terms in the search box and click a search icon or press "Enter" to perform a record search. In some embodiments, resulting records that have matching attribute values are returned based on the configured attributes for record search through a metadata property at an attribute level by setting the "TEXT_SEARCHABLE_FLAG". Example settings for this attribute are:

If set to Y, the attribute is enabled for record search.

If set to N, the attribute is not enabled for record search.

In some embodiments, a record search also includes stemming, thesaurus, and, for attributes that support snippeting, a search snippet can be displayed. For example, the snippet can display a portion of the attribute value that contains the search terms. In embodiments that include a results table and/or grid component, the search terms can be highlighted. In some embodiments, wildcard characters (e.g., "*") allow a user to easily combine or eliminate search terms, and simplify searching a complex data set.

FIG. 18 illustrates a graphical user interface of a search bar component in accordance with an embodiment. Interface 1800 can be an embodiment of a search bar component that includes search bar 1802, suggested major categories 1804, and suggested minor categories 1806. For example, search bar 1802 can be used to input characters or a string for searching one or more data sets (e.g., attributes or elements of an owned data set).

In some embodiments, interface 1808 can configure the functionality of interface 1800 and the search bar component. For example, interface 1808 can be used (e.g., by a user or administrator) to define a title for the search bar component, and by default three characters can trigger a suggestion list. Element 1810 can be used to select an owned data set for the search bar, for example fa_asset, as shown.

In various embodiments, suggested major categories 1804 and suggested minor categories 1806 are attributes and/or data elements of the data set specified in element 1810. For example, when the characters entered into search bar 1802 meet or exceed the default minimum characters, data elements/attributes from the selected data set can be displayed as suggested major categories 1804 and suggested minor categories 1806.

For example, major category 1804 and minor category 1806 can be concepts in Fixed Assets, which is the example data set used in FIG. 18. Interface 1800 displays that a particular sequence of characters entered in search box can match values across attributes in the data set. In some embodiments, a user can select a suggested filter from suggested major categories 1804 and suggested minor categories 1806 to filter embodiments of the dashboard.

Button 1812 can be used to preview the display of the search bar component given the configuration of interface 1808. In some embodiments, save and cancel buttons can be used to save the configuration from interface 1808 or to cancel. In some embodiments, other page components can similarly implement preview, save, and cancel buttons to allow a user to preview the appearance of a page component, save a particular configuration for a page component, or cancel.

Embodiments of a filters component can display currently selected refinements or filters and allows user to modify and remove them. For example, filter values selected by a user to filter the dashboard can be classified by attribute name and the attribute data set. Selected filters can also reflect the refinement selections of values from any component on the page and allow users to view and quickly make adjustments to the current filtration state of a page/dashboard.

In some embodiments, the filters component also manages association navigation paths between pages of a dashboard, for example through a multi-data set support feature. For example, a page designer can decide how to apply association relationship between different data sets and which path the system can follow to effect the flow. These filter components can allow a designer to determine an association rule based on the flow of user interaction between pages. For example, navigating between Purchase Orders and Requisitions can be achieved through buyer workload or through supplier agreements based on the business case at hand.

Figure 19:
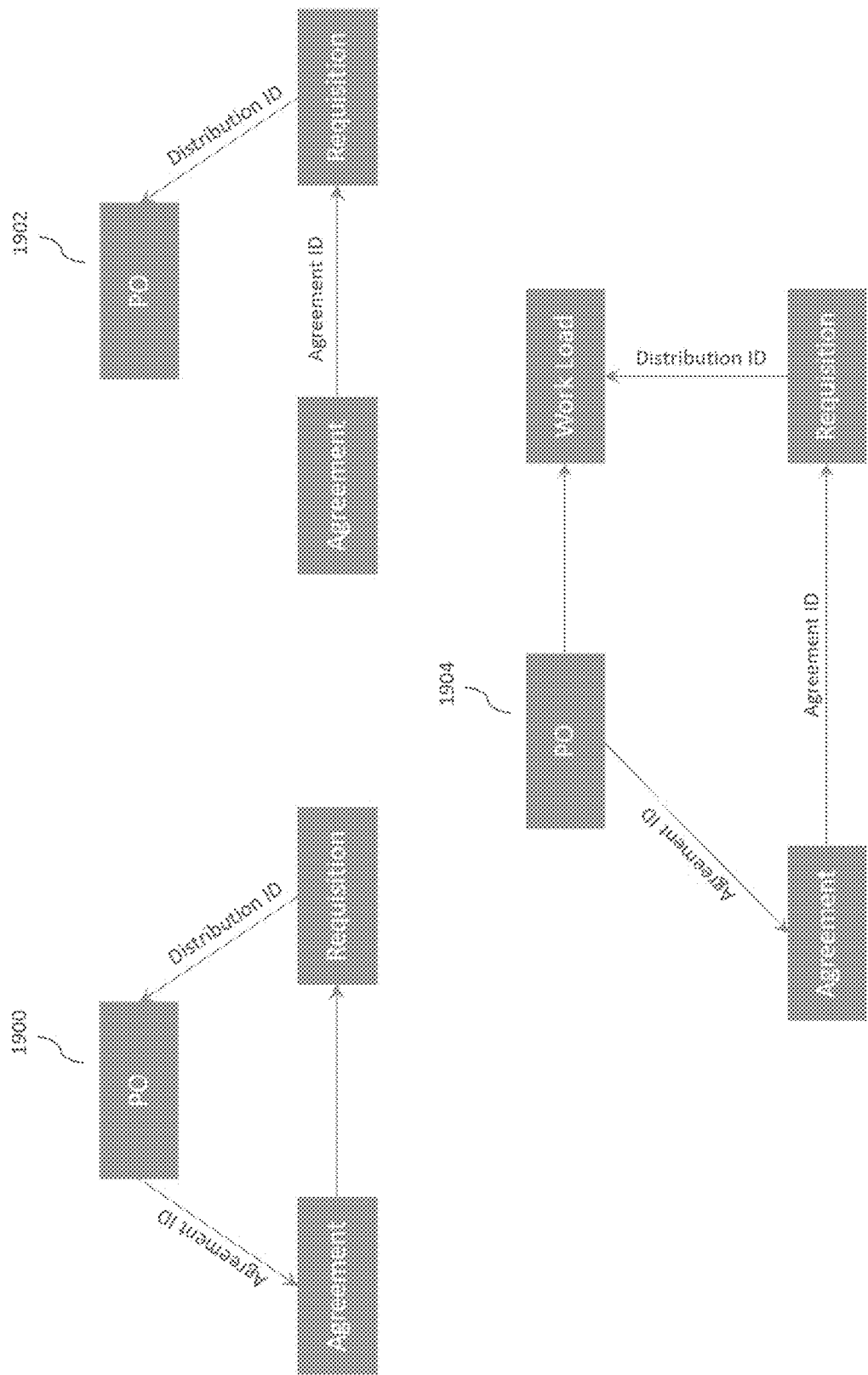
FIG. 19 illustrates association navigations paths according to an example embodiment.

FIG. 19 illustrates association navigations paths in accordance with an embodiment. Example 1900 display a first path: PO>Agreements>Reqs-Agreements, and Reqs data sets will be added in PO selected filter configuration. Sample SQL in accordance with this example can include:

```
FROM
PO, AGR,REQS
WHERE
PO.AGREEMENT_ID = AGR. AGREEMENT_ID
AND AGR. AGREEMENT_ID = REQS. AGREEMENT_ID
AND REQS.DISTRIBUTION_ID = PO. DISTRIBUTION_ID
```

Example 1902 display a first path: PO>Reqs>PO-Reqs and PO data sets will be added in Agreements selected filter configuration. An indirect association can be applied between Agreements and PO through the Reqs data set. Sample SQL in accordance with this example can include:

```
FROM
PO, AGR, REQS
WHERE
AGR. AGREEMENT_ID = REQS. AGREEMENT_ID
AND REQS.DISTRIBUTION_ID = PO. DISTRIBUTION_ID
```

Example 1904 display a first path and a second path: PO>Agreements>Reqs-PO and Agreements data sets will be added in Reqs selected filter configuration; PO>Work Load>Reqs-PO and workload data sets will be added in Reqs selected filter configuration.

In some embodiments, data sets added in a selected filter component configuration can be defined in a query state. The filters component can discard filters coming from a data set not defined on the dashboard page/component. In some embodiments, users can use the filters component to remove filters and individual refinement values by clicking a delete icon. Users can also remove all filters at once by clicking a delete all button in the component.

In some embodiments, each filter/refinement can be displayed as a collapsible section per attribute name heading. Users can use an expand/collapse button to display or hide a full list of refinement values available per attribute.

Figure 20:
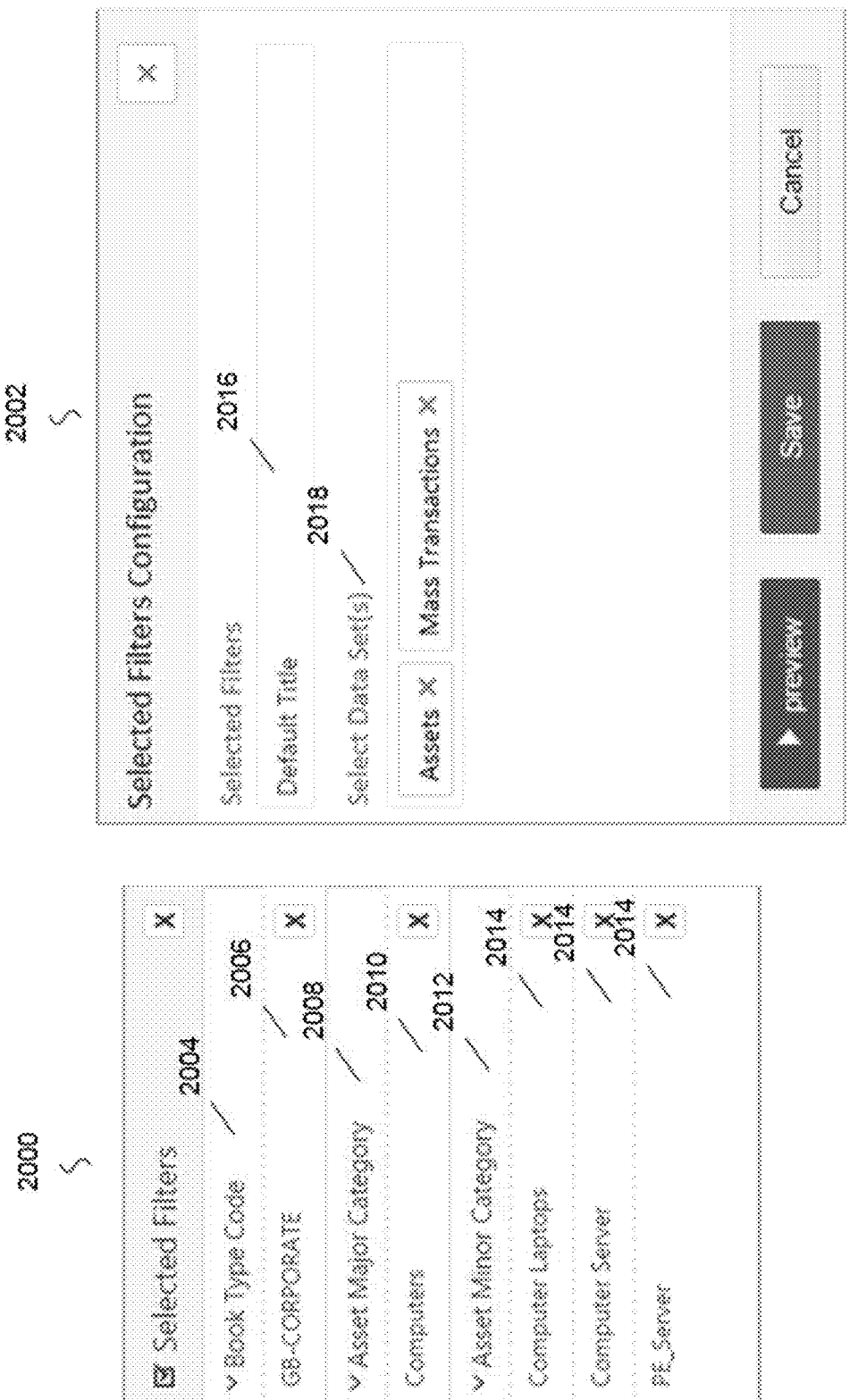
FIG. 20 illustrates a graphical user interface of a filters component according to an example embodiment.

FIG. 20 illustrates a graphical user interface of a filters component in accordance with an embodiment. Interface 2000 can be an embodiment of a filters component that includes attribute 2004, attribute value 2006, asset major 2008, asset major value 2010, asset minor 2012, and asset minor values 2014. Filters can be selected for a dashboard or a page of a dashboard in a variety of ways, such as via a search component, guided discovery component, selected from a graph or chart component, or in any other suitable manner. In an embodiment, the filters that are actively filtering a dashboard or page of a dashboard can be displayed within interface 2000. For example, in the depicted example, attribute value 2006, major category value 2010, and minor category values 2014 are displayed as filters in interface 2000. Each filter value is displayed under its attribute, namely attribute 2004, asset major 2008, and asset minor 2012. The filters under a given attribute can be expandable and collapsible. A user can remove an active filter by selecting a delete interface element adjacent to the filter. Multiple filter values under a given attribute (e.g., minor category values 2014) can be displayed in sequential order. A filter than includes a value range can display this value range in interface 2000.

In some embodiments, interface 2002 can configure the functionality of interface 2000 and the filters component. For example, interface 2002 can be used (e.g., by a user or administrator) to define a title for the filter component using element 2016. In addition, element 2018 can be used to define data sets whose attributes can be used to filter the page or dashboard and are displayed in the filter component.

Embodiments of a guided discovery component can display available refinements or filters for a page or dashboard. For example, the guided discovery component can allow users to filter data to include specific attribute values or ranges of values from a selected data set. The selected values or ranges can be added to the filters component.

In some embodiments, a guided discovery component can be used to filter pages of a dashboard based on attribute values. These attributes can be collapsed, sometimes by default, and can be configured to be expanded per attribute. Depending on the refinement, users can either select a specific value or values from value list or specify a range of values. When a user selects one or more attribute values from the guided discovery component, the selected refinements appear in the filters component. In some embodiments, a number of attribute values that can be displayed for each attribute is configured. If the number of records is greater than the number of values to be displayed, then a "Show More" button can be displayed to allow a user to display the remaining values (up to the maximum values to show).

The guided discovery component can allow users to discover information in data sets without knowing exactly what they are looking for from the start. Guided discovery is designed around the idea of conversation between the user and the data, where the user can select repeated filters, and with each one receive a set of matching data. Guided discovery provides hints to a use about how to further narrow down their results. This process can sometimes be referred to as "Guided Navigation". Guided Navigation can allow a user to discover information within data sets without knowing exactly what the user is looking for or how to find it.

Embodiments utilize Guided Navigation by allowing a user to select a refinement from the available attribute values, and then by using other refinements to narrow down the results from the data sets. As the user explores, knowledge about what values are currently available for refinement can be helpful to exploring data. At any given step in the exploration process, a cache can return a list of available values for each refinement. In some embodiments, a user can be displayed only those refinements (e.g., attribute values) for which records exist in the data set. In some embodiments, the suggested refinements are those that can be used for further navigation. When the user selects a specific refinement, it filters (or refines) the resulting set of records. Additional refinements can then be returned by the cache.

In some embodiments, an order of attributes value in the component can be displayed based on the "RANKING_TYPE_CODE" value in the attribute's metadata, which controls the default order of the available refinement values. Example value for the RANKING_TYPE_CODE can be:
- record-count: sorts refinement values in descending order, by the number of records available for each refinement value.
- lexical: sorts refinement values in alphabetical or numeric order. For example, if the end user has these values in Major Category attribute, MACHINE (15 records), COMPUTER (25 records), and BUILDING (5 records). So, if the sorting is lexical, the values are displayed in this order: BUILDING (5 records), COMPUTER (25 records) MACHINE (15 records). Lexical can be a default for some data sets.

In some embodiments, a number of matching records displayed for each attribute value can be configurable based on the "SHOW_RECORD_COUNTS_FLAG" property in the attribute metadata. In some embodiments, matching record counts can be displayed concatenated with the attribute value (For example, OPS CORP (23847)). Example valid options for this flag can be:
- True: that record counts are enabled and will displayed.
- False: that record counts are disabled and will not be displayed. This is the default In some embodiments, a default refinements behavior of the guided discovery component is to allow users to add a single value from an attribute to the navigation state. In other words, when users select a refinement from an attribute (by clicking it in the list of suggested refinements), that attribute can be removed from the list of suggested refinements available for future refinement. For example, after selecting "Vision Operations" from the ledger Name attribute, the attribute can be removed from the guided discovery component.

However, sometimes a user can find it useful at navigation time to select more than one value from an attribute. For example, the user interface can provide a user with the ability to show assets that have both "Building" and "Machine" values from the "Major category" attribute. In some embodiments, this refinement behavior is based on the "SELECT_TYPE_CODE" property in the attribute metadata. The "SELECT_TPE_CODE" attribute can have the following example settings:
- Single-select: configures the attribute as a single-select attribute. This is the default.
- Multi-select-and: configures the attribute as a multi-select AND attribute.
- Multi-select-or: configures the attribute as a multi-select OR attribute.

In some embodiments, when an attribute is configured as multi-select-and or multi-select-or, multiple attribute values from the same attribute can be added to the navigation state and the results can be different for the two types of multi-select attributes:
- multi-select-and refinement—Embodiments include a cache that considers the list of attribute values selected from a multi-and attribute as a Boolean AND operation. That is, the cache can return all records that satisfy the Boolean AND of all the attribute values selected from an attribute that is multi-AND. For example, the cache can return all records that have been tagged with "Building" AND "Machine". If a user continues the refinement process by clicking one of the suggested refinements, the cache can also continue to return refinements for a multi-AND attribute. The list of available refinements can be the set of attribute values that have not been chosen, and are still valid refinements for the results.
- multi-select-or refinement—In embodiments, if the navigation state contains multiple values from a multi-or refinement, then all of the records in that state contain at least one of the selected values as a Boolean OR operation. That is, all records that have been tagged with "Building" OR "Machine" are returned. The cache can return all attribute values for a multi-or attribute that have not already been selected—this means that the set of suggested refinements in the user interface does not correlate to the set of remaining records. Also note that as more multi-or attribute values are added to the navigation state, the set of record results gets larger instead of smaller, because adding more terms to an OR expands the set of results that satisfy the query.

In some embodiments, the expected refinement behavior for each select type can be:
- An attribute can be hidden/shown based on a precedence rule and regardless of single and multi select status. Precedence rules can be defined in metadata and they can be triggered into action by query state.
- If an attribute is single-select: Embodiments render list of values based on query state, hide attribute if list contains one value.
- If an attribute is multi-or: Embodiments honor any other filter state than own, compute results.
  - If (has own filter state): Embodiments discount own filter state, render what is left if it has one or more values.
  - Else if (does not have own filter state): Embodiments render if list is greater than one.
- If an attribute is multi-and: Embodiments honor all filter state including own, compute results.
  - If (has own filter state): Embodiments discount own filter state, render what is left if it has one or more values,
  - Else if (does not have own filter state): Embodiments render if list is greater than one.

In some embodiments, refinement counts on an attribute that is multi-select-or indicates how many records in the result set will be tagged with the refinement once selected. When no selections are made yet, the refinement count can equal the total number of records in the result set if that refinement were selected. In some embodiments, for subsequent refinements, the refinement count may be different from the total results set.

Guided Discovery allows user to search for a specific value in a value list and/or begin typing the value in the attribute search box. As the user types, the matching values can be displayed, and the search can search in all the available values in the relevant attribute (not only the displayed one). String value attributes can be displayed as a list of values. Numeric and date/time value attributes can be displayed by default as a range filter and can be changed from the configuration to be a list. In some embodiments, the value list can behave in a manner similar to other value lists for string attributes. In some embodiments, users can select a range between two values (default) by specifying a minimum and maximum value (e.g., by entering the value in text field).

In some embodiments, value searches can be made from a search box component by typing the search term. In some implementations, as a user types the search term (e.g., in the guided discovery component or search box component), a list of attribute values containing the search terms can be displayed, and the user can select one of these vales.

In some embodiments, a partial search allows a user to match query terms to fragments of words using the special asterisk or star operator (*). For example, such a query term will match any text containing a substring of larger words, even if it occurs in the middle of a word. Partial searches can be made from the search box component or from the attribute search box in the Guided Discovery component and supported in record search and value search.

In some embodiments, the guided discovery component allows the attributes that have been created dynamically to be available by default within the component. Users can refine each of the attributes with specific search and selection criteria. The dynamic attributes behavior can be based on the "SHOW_IN_GUIDED_DISCOVERY_FLAG" property in the attribute metadata. Example options for "SHOW_IN_GUIDED_DISCOVERY_FLAG" can be:
  False: Attribute will not be displayed in the component.
  True: Attribute will be displayed in the component.

Figure 21:
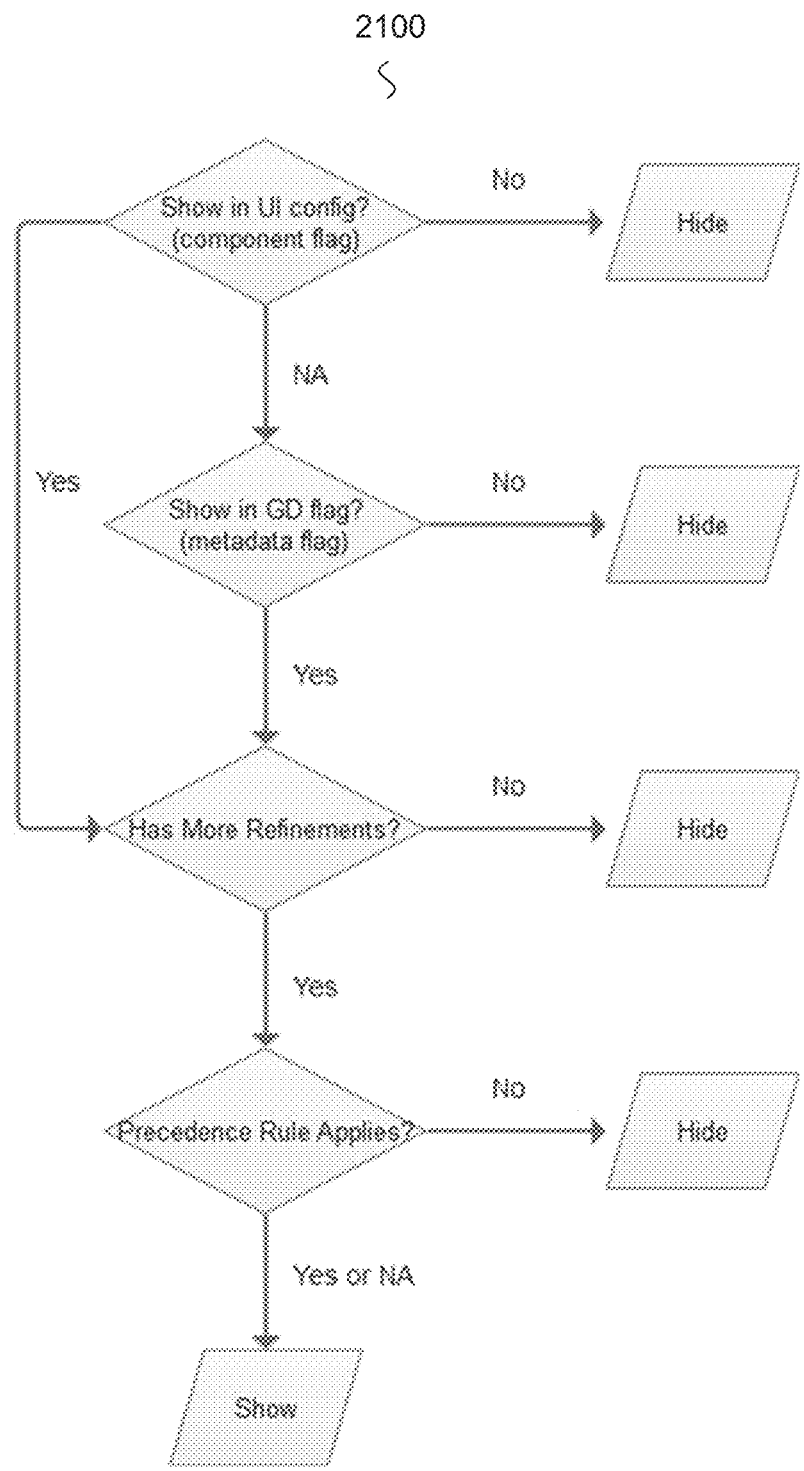
FIG. 21 illustrates a flow chart for displaying information in a guided discovery component according to an example embodiment.

FIG. 21 illustrates a flow chart for displaying information in a guided discovery component according to an embodiment. Embodiments of the guided discovery component support precedence rules. For example, precedence rules can provide a mechanism to delay the display of attributes until these attributes offer a useful refinement of the navigation state. In some embodiments, refinement rules can be defined in terms of a trigger attribute (source attribute) and a target attribute (destination). A user's selection of a trigger can reveal the previously unavailable target attribute to the user. In other words, precedence rules can be triggered by selections of standard attribute values. These triggers can cause standard attributes to be included as available refinements.

Embodiments of the guided discovery component include logic that can determine attributes to display or hide based on these precedence rules (e.g., a previous attribute value can control the display), based on whether additional refinement values are available or whether the attribute is defined as multi-select or single-select. The dynamic displaying and hiding of attributes can reduce clutter of the attribute list, assist the user during a discovery session, and can facilitate and overall productive interaction with the page/dashboard. Flow chart 2100 illustrates logic that a guided discovery component can use to determine if/when to display and/or hide an attribute.

Figure 22:
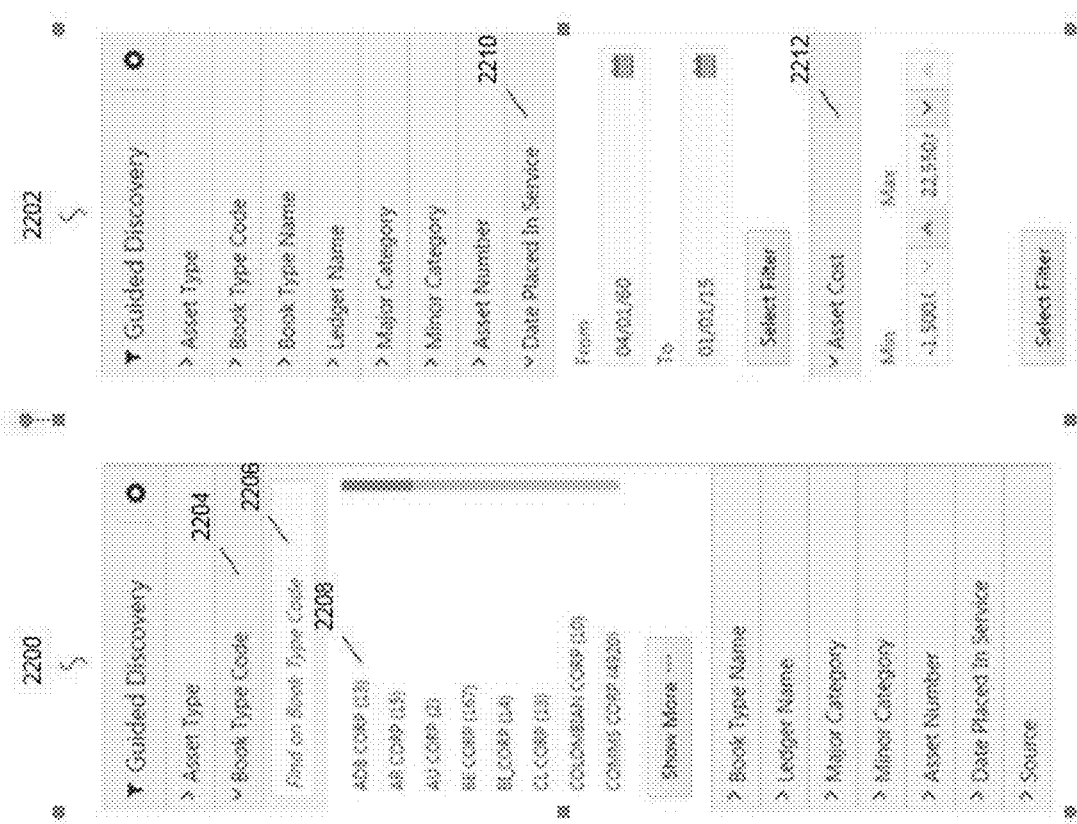
FIGS. 22 and 23 illustrate graphical user interfaces of a guided discovery component according to an example embodiment.
Figure 23:
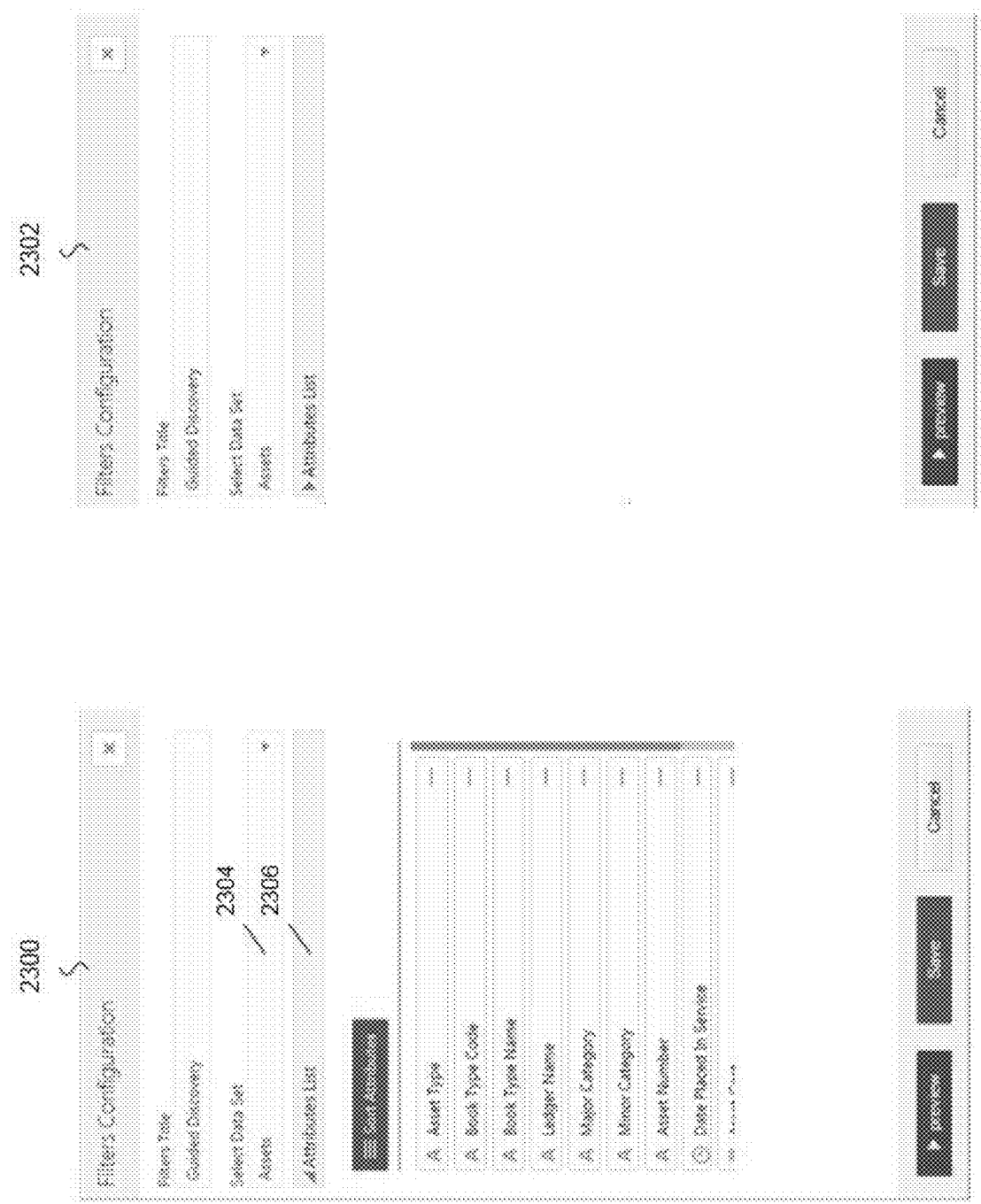

FIGS. 22 and 23 illustrate graphical user interfaces of a guided discovery component in accordance with an embodiment. Interfaces 2200 and 2202 of FIG. 22 can be an embodiment of a guided discovery component that includes attribute 2204, value search 2206, filters 2208, date attribute 2210, and numeric attribute 2212. Attribute 2204 can be an attribute of a data set selected for the guided discovery component. Value search 2206 can be used to search for attribute values in the data set. Filters 2208 list values for the attribute upon which the data set/dashboard can be filtered. In some instances, characters or a string can be input into value search 2206 such that attribute values that match the input are displayed as filters 2208. Date attribute 2210 can be a date attribute that allows a user to select date values for the attribute to filter the data set. Similarly, numeric attribute 2212 can be a numeric attribute that allows a user to select numeric values for the attribute to filter the data set.

Interfaces 2300 and 2302 of FIG. 23 can be an embodiment of an interface used to configure a guided discovery component that includes data sets 2304 and attribute list 2306. A user can use data sets 2304 to select a data set for the guided discovery component. Once the data set is selected, attributes for the data set can be populated in attribute list 2306, where a user can select attributes to configure the guided discover component.

In some embodiments, various visualization components can be displayed on a page/dashboard such that data, for instance from selected data sets filtered according to the components of the dashboard, can be visualized for a user. In some embodiments, visualization components can be designed to return a subset of data that meets a certain criteria in a declarative fashion defining pre-aggregation conditions (e.g., WHERE). For example, these conditions can be applied to both dimensions and metrics attributes with conditional operators (e.g., Less than, Less than or equal to, Greater than, Greater than or equal to, Equal to, Is not null, Is null) and conditional value. In some embodiments, more than one condition can be added as per the attributes and the relation between these conditions (e.g., AND). Also, post aggregation filters can be defined (e.g., HAVING). For example, these filters can be one-to-one mapping with predefined metrics in the component using filter operators (e.g., Less than, Less than or equal to, Greater than, Greater than or equal to, Equal to, Is not null, Is null, between).

Embodiments of a summarization bar component can display available refinements or filters for a page or dashboard. For example, a summarization bar component can be used by a user to quickly view metric or dimension values that summarize aspects of underlying data. In some embodiments, summary items contain one of the following types of values: metric value, dimension value, and flag.

In some embodiments, a summary item can have a display name (e.g., label) honoring user locale and can display a tooltip that provides an additional description or detail for the summary item. The description can include tokens to represent value associated with the selected summary item. In some implementations, the visualization bar component can allow selection of a summary item in order to refine or filter the page/dashboard based on a predefined dimension value. In some embodiments, selection of a summary item can also navigate to a different page or external URL. In some embodiments, the summarization bar component can allow users to view and interact with high-level summary information generated from different data sets, so the user can quickly assess where to direct their attention.

In some embodiments, the summarization bar implements a metric value that provide an overview of an analytic, such as a key performance indicator ("KPI"), with a single aggregated metric value (e.g., total open orders, fulfillment delayed, and the like). A hyperlink action can also be defined for metric refinement based on a predefined dimension value. In some embodiments, metric refinements follow similar rules as "selected refinement" filters. For example, metric refinements can be added to the component when the user clicks on the metric with the following sample rules:
  1. For any particular attribute, based on multi or single assign and or vs and multi-select.
  2. AND operation between different attributes.

In some embodiments, metric refinement actions can configure a target tabbed component for a refinement, and specify the tab to display. The following can specify the tab that is selected: <tabComponentName or tab id><[tabNumber]>, Where:
  tabComponentName can be the name of a tabbed component container.
  tabID can be the ID of the tabbed component container (displayed in the configuration panel).

tabNumber can be the number (1, 2, 3, etc.) of the tab to select.

The user can be redirected to the second tab in an orders tabbed component. A double colon (::) can be used in order to delimit the components to select the tab to display for multiple tabbed components (e.g., for the following target tabs: Orders[2]::Details[2]).

On the orders tabbed component, tab 2 can be selected.

On the details tabbed component, tab 2 can be selected.

In some embodiments, the metric value can be displayed based on conditional display attribute. For example, total sales can be based on a currency code. In some embodiments, a metric item can expand to fit the complete displayed value (number).

In some embodiments, the summarization bar component can include a dimension value. A dimension value can display a single dimension value, for instance, that is associated with the top or bottom value for a single metric. For example, the name of a product category that has the highest or lowest total sales can be displayed. In some embodiments, the dimension value can be displayed based on conditional display attribute. For example, a product category name that has the highest total sales based on the sales organization.

In some embodiments, flags can be used by the summarization bar component. A flag can indicate the number of values for a selected dimension or combination of dimensions that meet a set of metric conditions (e.g., number of product category and sales region that had more than 500 sales and for which the percentage of total sales was at least 90% of expected sales). In some embodiments, users can select a flag color and select one or more dimensions. Metrics can be configured to be displayed on a flag pop-up and flag conditions can be defined. In some embodiments, a flag can be displayed when at least one value matches all of the conditions in the flag conditions list.

In some embodiments, when a user selects (e.g., clicks on) a flag item, a popup window can be displayed that displays a complete list of the dimension values that match the flag conditions with the corresponding metric values. Refinements can be triggered by selecting a dimension value in the list of flags. In some embodiments, defining an aggregation metric can be a flag option.

Figure 24:
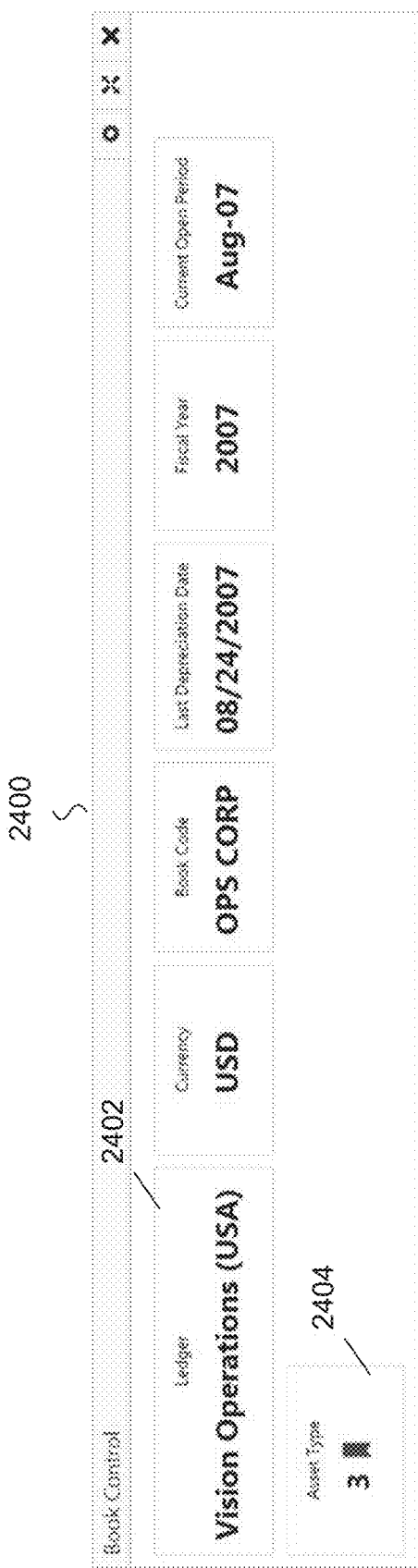

FIGS. 24 and 25 illustrate graphical user interfaces of a summarization bar component in accordance with an embodiment. Interface 2400 of FIG. 24 can be an embodiment of a summarization bar component that includes summary item 2202 and flag summary item 2404. Other summary items not depicted can be implemented in various embodiments, including a metric summary item. Interfaces 2500 and 2502 of FIG. 25 can be used to configure a summarization bar component such that the one illustrated in FIG. 24.

For example, a user can add summary items to a summarization bar using the depicted user interface elements of interfaces 2500 and 2502. Each added summary items can be further configured. For example, the ledger summary item 2504 can be configured using data set 2506 to select a data set. Similarly, ledger summary item 2504 can also be configured to define conditions, select dimensions (of the data set), select metrics, aggregate conditions, and define visualizations. For example, define condition 2508 can be used to define a condition for a summary item, such as a selected attribute (e.g., Book Code), an operator (e.g., "="), and a value (e.g., "OPS CORP").

In some embodiments, a tag cloud component can also be used to visualize data on a dashboard. A tag cloud component can displays attribute values (e.g., tag cloud terms), for example based on a configured weight. In some embodiments, this weight is based on metric value, which can be defined in flexible manner. In some embodiments, the weight of each term can correspond to a display of the term with different font sizes or a term can be displayed in parentheses in cloud view or to the right in the list view. A tag cloud component can also provide that availability to switch between different attributes dimension associated with different metrics.

In some embodiments, a tag cloud component can allow users to quickly compare a set of displayed terms based on the value of an associated metric. In examples where there are multiple sets of terms and multiple metrics available, a user can select the set of terms and the metric to display the tag cloud term with relative weight.

In some embodiments, when considering a filter with one of the terms, the tag cloud can automatically cascaded to a next level. When the user clears a filter, the tag cloud can cascade out again. In some embodiments, within a tag cloud, each term can be followed by the calculated metric value. For example, the metric can be displayed in parentheses. In list view, the metric can be aligned to the right of the list.

Figure 26:
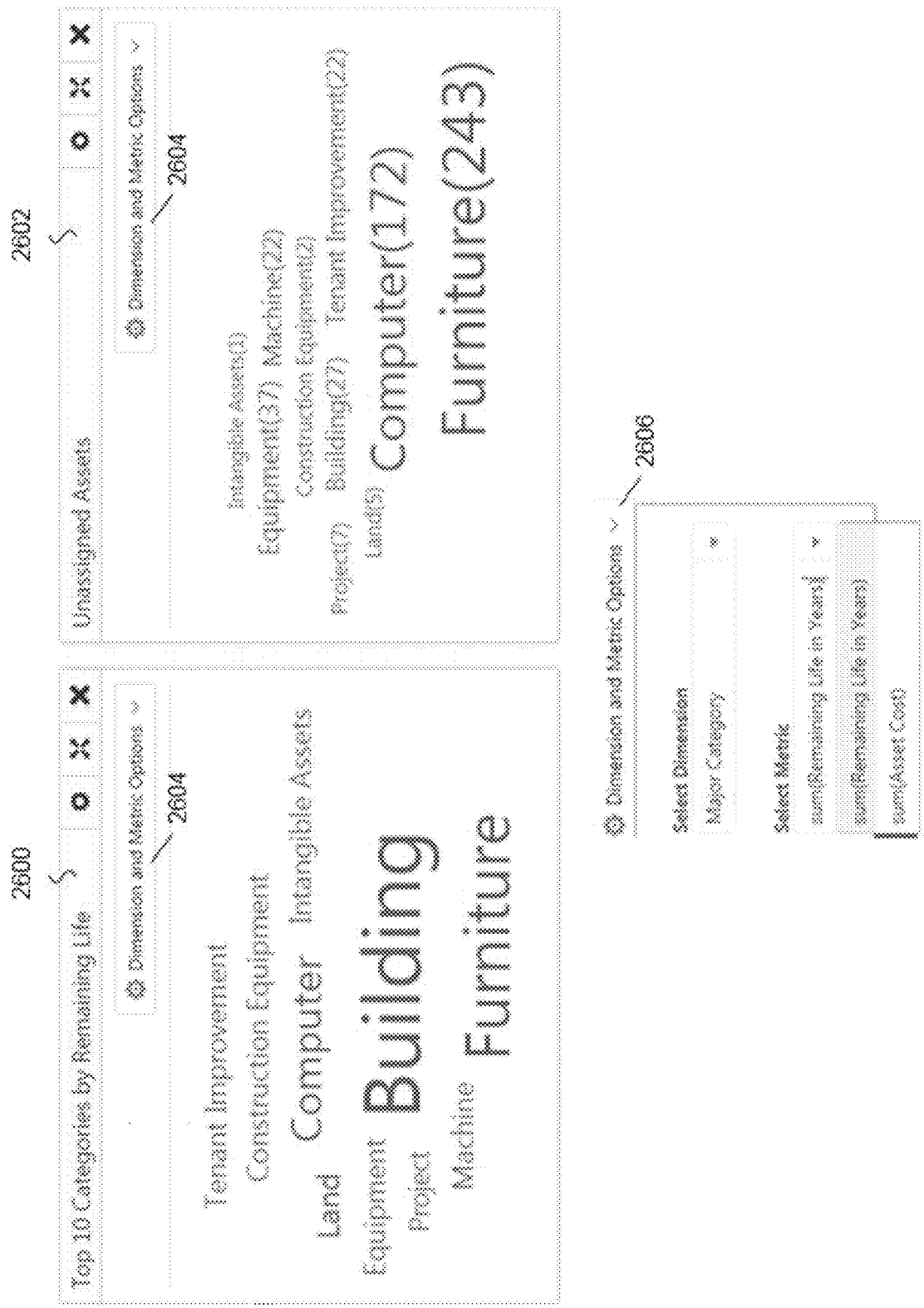
FIGS. 26 and 27 illustrate graphical user interfaces of a tag cloud component according to an example embodiment.
Figure 27:
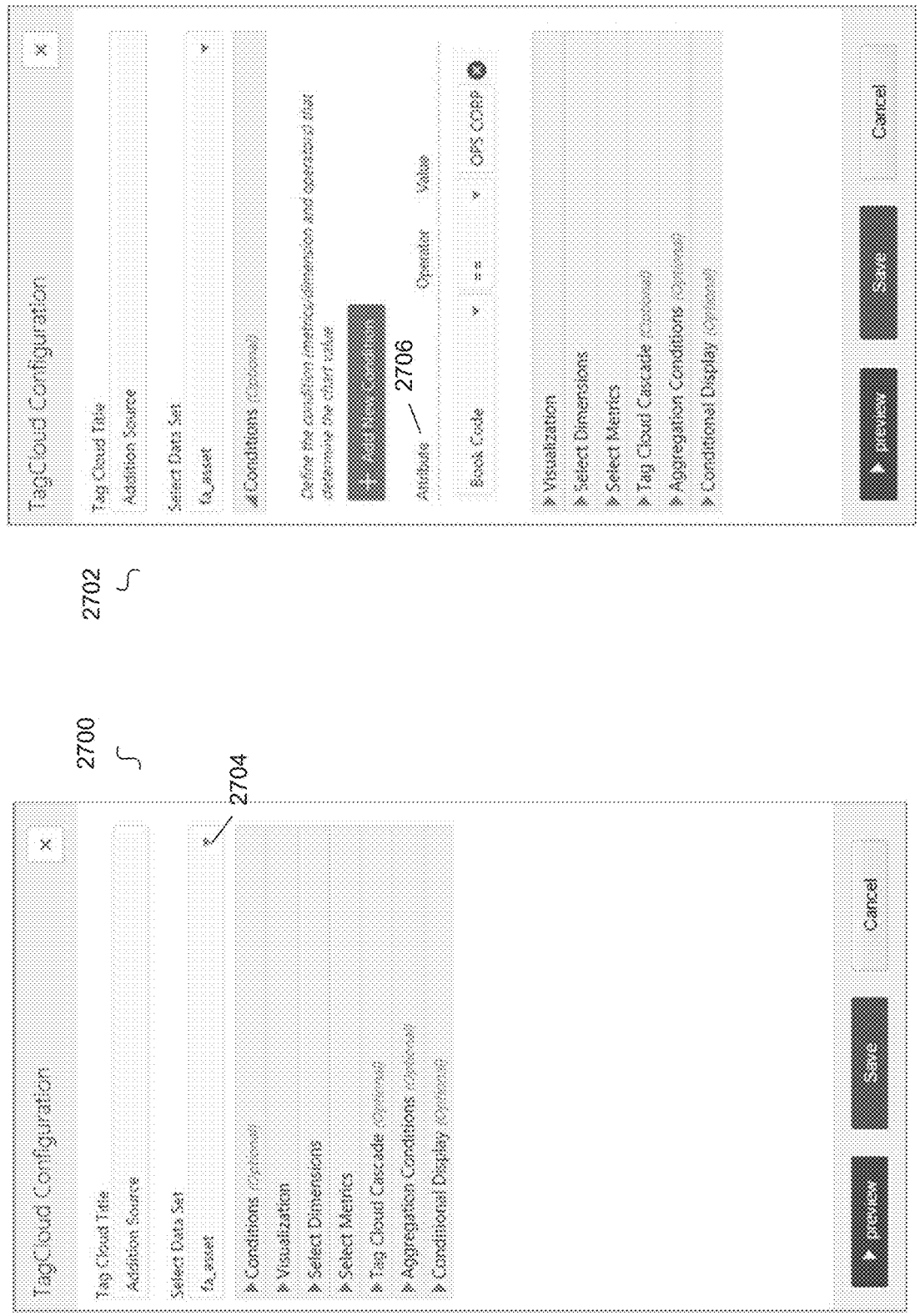
Figure 28:
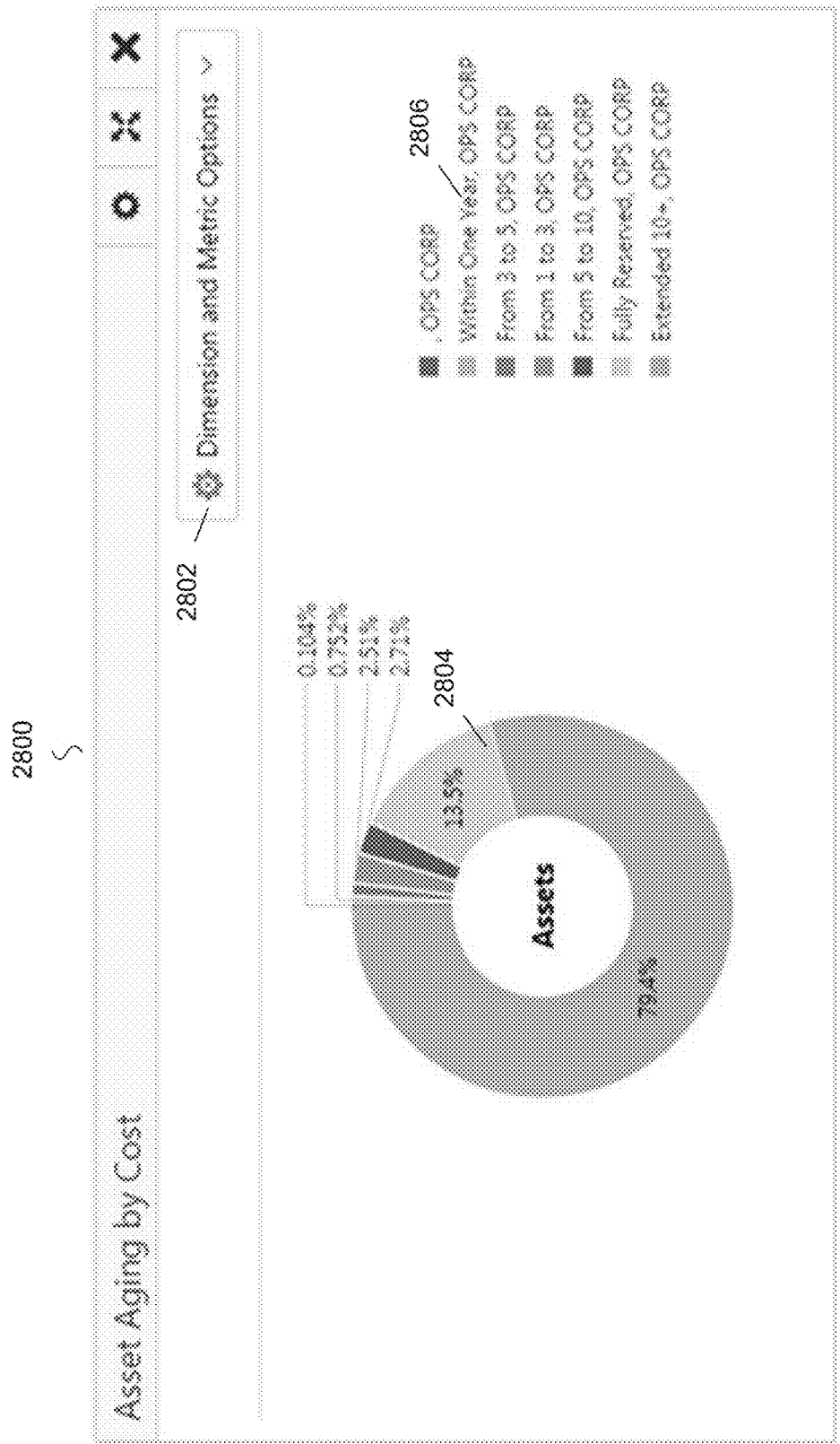

FIGS. 26 and 27 illustrate graphical user interfaces of a tag cloud component in accordance with an embodiment. Interfaces 2600 and 2602 of FIG. 26 can be an embodiment of a tag cloud component that includes a word or tag cloud and selector 2604. As previously disclosed, the words or tags within the cloud can be of different size or fonts, where the characteristics of the words or tags can be based on (and in some embodiments, in proportion to) one or more weights. The word or tag cloud can be configured based on attribute values. For example, selector 2604 can be used to launch interface 2606, where a user can select a dimension and/or a metric (e.g., calculated according to the dimension) to configure the tag or word cloud. Interface 2602 displays the metric or attribute value along side the displayed tag or word.

In some embodiments, interfaces 2700 and 2702 can be used to configure a tag cloud component. For example, interfaces 2700 and 2702 can configure components of a page/dashboard in a manner similar to interfaces 2500 and 2502 of FIG. 25. Interface 2700 can be used to select a data set for the component using data set 2704. A number of other configurations can be defined, such as conditions, visualization, dimension selection, metric selection, tag cloud cascade, aggregation condition, and conditional display. For example, conditions can be defined for the tag cloud component using interface 2702 and condition 2706, such as an attribute, operator, and value.

In some embodiments, a tag cloud component can cascade, for example based on refinements or filtration, in a manner similar to other components, as disclosed. For example, a tag or word from a tag cloud can be selected by a user to filter the component/page/dashboard. The visualization of the tag cloud component can then cascade based on the refinement or filtration according to the defined settings.

In some embodiments, data visualization component can include graph or chart components. For example, a graph or chart component can display a visualization of attribute values from a data set. A number of sub-types are available with options for selecting the specific data to display:

Pie
Donut
Bar
Bar/line

In some embodiments, different sub-types support specific usage. For example, a pie or donut chart can show a single metric aggregated across a group dimension. These charts can be useful for showing how each value contributes towards a total. Metric values can be displays as pie wedges, with each wedge sized proportionally to the relative size of the value. Two embodiments of a pie chart are:

Pie: A basic pie chart.

Donut: A variant of the pie chart, with a blank center allowing for additional information about the data as a whole to be included. Each point can be specified by an arc that's length is proportional to the circumference as the data value to the total sum of all values. Ascending or descending sorting can be enabled based on the values.

In some embodiments, hovering over a wedge or segment (e.g., with a cursor) can display the corresponding metric value as well as its percent of the total. When configuring a chart, note that a pie chart can use an independent metric (e.g., slice size) and render dependent values from one configured color metric. In various embodiments, a segment size metric can be both numeric and countable. In some embodiments, a pie or donut chart can be sorted ascending or descending based on the values, and can be displayed in a 2-dimensional and 3-dimensional configuration.

Another sub-type of the component can be a bar char. A bar chart can show a metric value aggregated across a group dimension. A bar chart can support both group dimensions and series dimensions, and the bars can be displayed vertically or horizontally. Embodiments of bar charts feature the following variants:

Bar: A basic bar chart.

Stacked bar: A bar chart that displays multiple values atop each other to show how they contribute towards a varying total. For example, a stacked bar char may plot total sales for three different regions across each fiscal quarter.

Embodiments of bar charts are scaled so that all data can fit on the chart. Bars on the chart can be arranged in any desired order. In some embodiments, a zoom functionality can be enabled (e.g., using a scrollbar) in a simple view or overview. An initial zoom can be used until a user trigger a change in the zoom.

Another embodiment can be a bar-line chart. A bar-line chart can show two or more metric values aggregated across a group dimension. These charts can be useful for showing quantity alongside changes in trends over time. Bar-line charts support a dual Y axis: the first Y-axis metric can be displayed as a bar; and the second Y-axis metric can be displayed as a line. The zoom functionality can be enabled or disabled in various embodiments.

In some embodiments, a user can refine or filter the displayed data by clicking a data point on the chart. Other techniques for filtering/refining can be:

Click a data point on the chart, in some examples the data can be refined by all of the applicable dimension values.

Click a label on the category axis, the data is can be refined by the labeled value.

Click a legend entry, the data can be refined by the legend entry value.

In some embodiments, when a user performs a "mouse over" on a chart, the chart can display the dimension and metric value for that data point. In some embodiments, a chart dimension can allow for a cascading of values. For example, when a user refines/filters by a specific attribute value, the component can be updated to display values from a different attribute (e.g., according to the cascading setting configured).

In some embodiments, a bar or chart component can support multiple dimensions and metrics that can be changed from a drop down list on the chart. The chart legend can identify (e.g., by color) each displayed data series. Each pie/donut wedge, bar section, line, or the like, can be represented by an item on the legend. In some embodiments, a title/label can be displayed for an axis. For a category axis, the labels can be the group dimension values. For a value axis, a label can be interval values based on the scale needed for the displayed series metric values.

In some embodiments, a chart may be configured with multiple options for the specific metrics and dimensions to be displayed on the chart. An options list can be provided at the top of the chart, where the dimensions and metrics to be displayed can be changed by selecting specific items.

In some embodiments, a bar or pie chart component can support sorting configurations based on the chart type as follow:

| Chart Type | Available Items to Sort By |
|---|---|
| Bar with group | Group dimension value First metric value |
| Bar without group | Series dimension value First metric value |
| Bar/Line | Group dimension value First bar metric value First line metric value |
| Pie | Dimension value Metric value |

In some embodiments, a user can select, from the options list, an item to use for a sort and select a sort order between ascending and descending. In some embodiments, a chart dimension value can be displayed using a same color. Within the chart, the color can stay the same when user refines the data. The color can also be consistent across different chart components on the same page/dashboard. In some embodiments, it may be possible for colors to repeat if the number of values for the dimension is greater than the number of values in the color palette (e.g., 12 colors, 24 colors, and the like), then the same color may be used for more than one value.

In some embodiments, colors can be assigned based on the total number of values for a dimension rather than the number of values for the current refinement/filtration. In other words, even if the data is refined to include a smaller number of values, if the total number is greater than the number of values in the palette, repeated colors may be displayed. In some embodiments, a tooltip, as previously disclosed, can be used in chart or bar components to display dimension and metric values. In some embodiments, chart or bar component refinement/filtration triggers an animation, for example when performing a cascade to the next data visualization.

FIGS. 28-31 illustrate graphical user interfaces of a bar or chart component in accordance with an embodiment. Interface 2800 of FIG. 28 can be an embodiment of a chart component that includes a donut chart, selector 2802, segment 2804, and legend entry 2806. As previously disclosed, the displayed donut chart can display a visualization of attribute values. Selector 2802 can be used to configure the visualization, where a user can select a configuration for the donut chart in a manner similar to that described with reference to FIG. 26 and interface 2606. In some embodiments, values of the visualized attribute can be used to filter/refine the display. For example, segment 2804 can be used to refine the displayed donut chart, and the display can follow a cascading flow as defined in the component configuration. In some embodiments, a legend can be displayed that describes a correspondence between the segments of the donut chart, data attributes/values, and colors. In some implementations, legend entries, such as legend entry 2806, can be selected by a user to filter/refine the data visualization. As described with reference to other components, a refinement/filter selection can be used to refine/filter other components of a page/dashboard.

Figure 29:
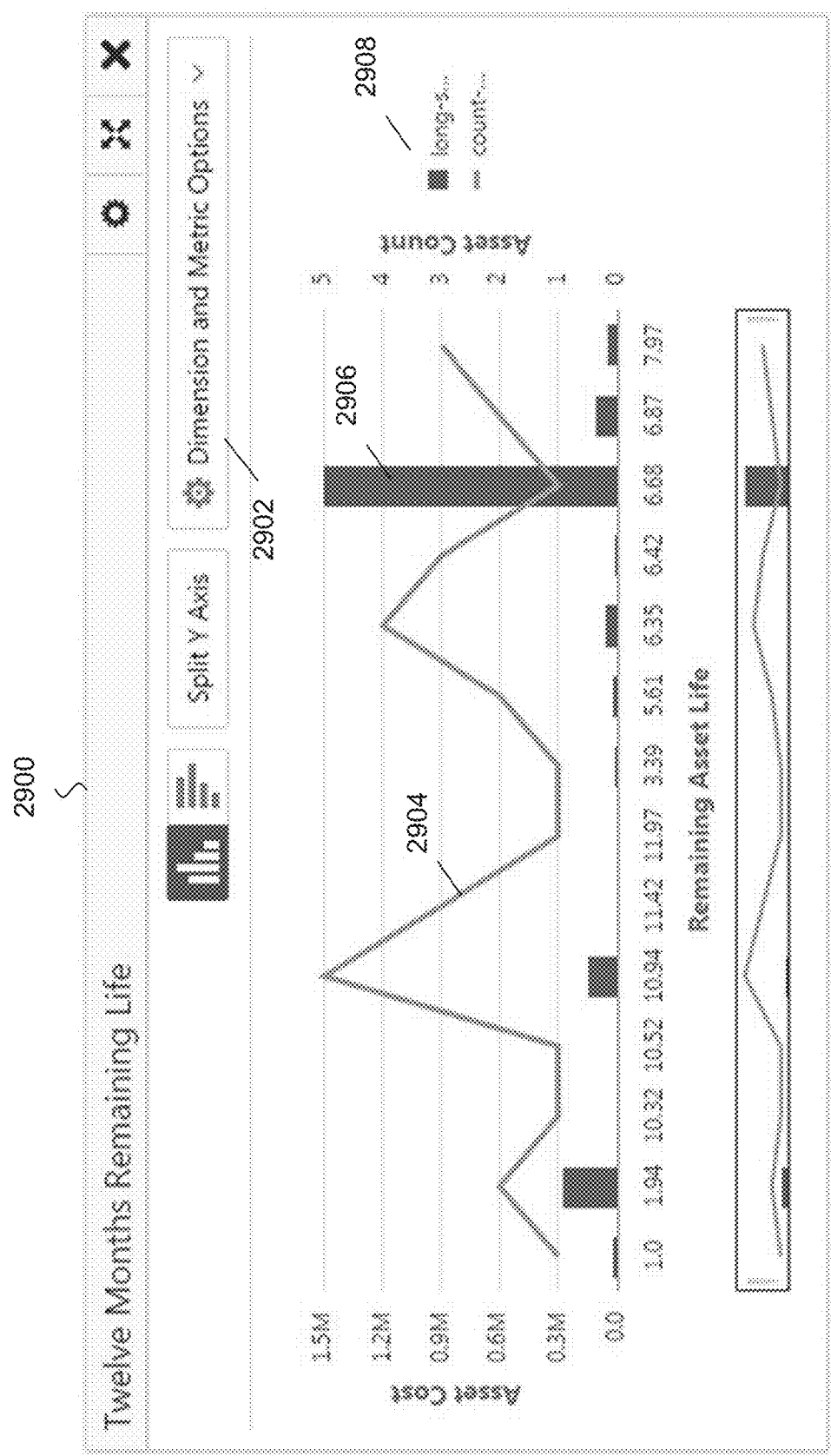
Figure 31:
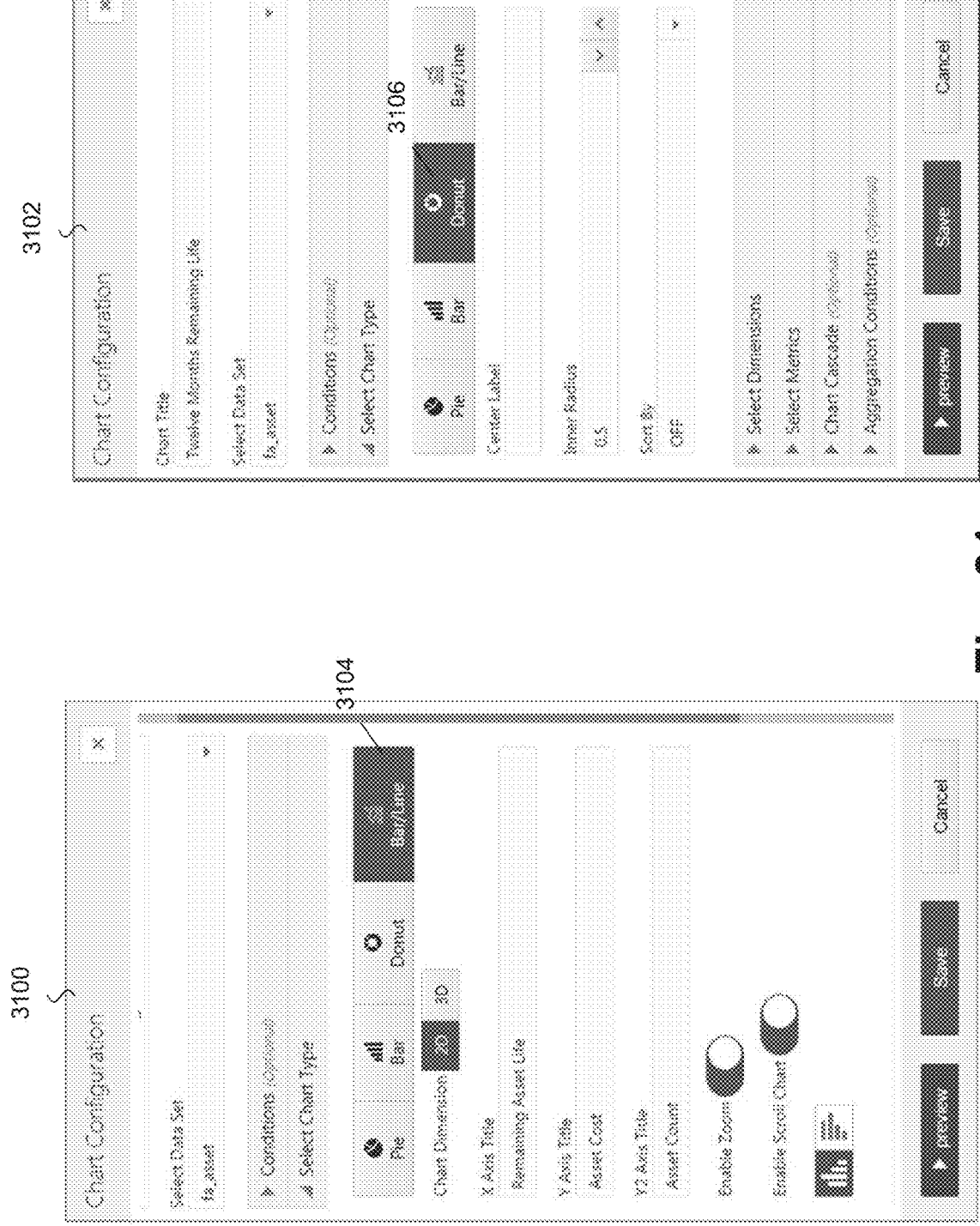

Interface 2900 of FIG. 29 can be an embodiment of a chart component that includes a bar-line chart, selector 2902, line 2904, bar 2906, and legend entry 2908. Selector 2902 can be used in a manner similar to selector 2802 for configuring the display bar-line chart. As disclosed, the bar-line chart can display both a line graph including line 2904 and a bar graph including bar 2906. Configurations for the bar-line chart can include vertical or horizontal orientation and split Y or split X axis. A legend and legend entry 2908 can be included, which are similar to the legend of FIG. 28. In some embodiments, selection of bars, legend entries, or other representations of data can be used to filter/refine this component and other associated components, as previously disclosed.

In some embodiments, interfaces 3000 and 3002 can be used to configure a bar or chart component. For example, interfaces 3000 and 3002 can configure components of a page/dashboard in a manner similar to interfaces 2800 and 2802 of FIG. 28. Interface 3000 can be used to select a data set for the component. A number of other configurations can be defined, such as conditions, chart type, dimension selection, metric selection, chart cascade, aggregation condition, and conditional display. For example, conditions can be defined for the component using interface 3002 and conditions 3004, such as a set of attributes, operators, and values.

Interfaces 3102 and 3104 can be used to select a chart type for a component. For example, interface 3100 illustrates configuration information for bar-line chart type 3104. A number of other configuration options can be defined, such as axis titles, orientation, and the like. Interface 3102 illustrates configuration information for donut chart type 3106. For example, interface 3102 illustrates configuration information for bar-line chart type 3104. A number of other configuration options can be defined, such as center label, inner radius size, sort options, and the like. Other chart or graph types (e.g., bar, pie, and any other suitable type) can be similarly defined using a similar interface to configure options specific to those chart types.

In some embodiments, components can display detailed insights of data sets. For example, a results table component can display a flat list of records from a selected data set. Each row can represent a single record and columns can contain attribute values for that record. For example, users can configure an attribute to be displayed as visual indicators:

Indicator Bar: can be used for indicating thresholds at specific values
Custom Images: can be used for visual representation for specific value
Star Rating: can be used for ranking values for specific attribute In some embodiments, visual indicators can be configured to refine/filter or can be configured to be otherwise actionable (e.g., hyperlink) when selected by a user. For example, users can use the values in the results table to refine the data as follow:

| Option | Description |
| --- | --- |
| Refine by a specific attribute value | The displayed values can be hyperlinked (if attribute property "DIM_ENABLE_REFINEMENTS_FLAG" is "Y" or can be override form the configuration) to allow user to refine by that value. When the hyperlink is clicked, the data can be refined to include records with that attribute value. |

In some embodiments, an indicator bar can display a single key measure with the outer scale. The indicator bar can be color-coded to provide additional context. In some embodiments, an indicator bar can have a background color to indicate a qualitative range while the bar can indicate the value. In some embodiments, on an attribute level a qualitative range (max value) can be added from another attribute value or constant value. An option of displaying the percentage of the value or provide a additional description for the attribute value is also supported. In some embodiments, a description can include a token to present the value of an attribute (e.g., Asset Age: {Value}).

In some embodiments, a custom image can provide visual representation (images) of the attribute value with refinement and hyperlink actions. For example, an Image URL used to retrieve a thumbnail image for the attribute value with token can be defined. The images that represent the attribute value can be saved in a predetermined folder. For example, an alert flag attribute can have values Y and N. To represent these values as images, two images that correspond to Y and N can be defined.

In some embodiments, a star rating can provide a visual representation (stars) of a numeric attribute value with refinement and hyperlink actions. For example, a default rating can range from 0 to 5 stars. The minimum and maximum values of the rating range can be set, with option of displaying the rating value. In some embodiments, a tool tip, as previously disclosed, can be provided for an additional description or details for the attribute value. In an embodiment, the description can include a token to represent the attribute value (e.g., Age in Years: {Value}).

In some embodiments, a results table can include hyperlinks to other URLs. For example, the hyperlink can pass parameters in the form of attribute values from a row or rows. In some embodiments, for individual rows, a column can contain a hyperlink to another URL. The URL can include attribute values for that record as part of the URL or as query parameters for the URL.

In some embodiments, an actions menu can contain options to send attribute values from selected rows as POST parameters. A results table component can support adding actions columns to allow end users to perform an action on a specific row. Examples of available actions are:

| Action | Description |
| --- | --- |
| No Action | Indicates that the value is not hyperlinked. For attributes that do not support refinement. |
| Refinement | When users click the value, the data is refined to include records with that value. Also, refinement can be configured as a hyperlink action that navigates to a different page, so when users refine by a value on one page, a different page |

| Action | Description |
|---|---|
| | could be displayed. Note, however, that the refinement can be applied to all of the components that use the same data set across a dashboard, and in some embodiments across different pages.<br>A target page setting for a refinement can use radio buttons to indicate whether to stay on a current page or navigate to a different page. If other page is selected, configuration should specify the internal page name as the value of the URL. |
| Hyperlink | When users click the value, the dashboard/page navigates to the specified URL. A hyperlink can be to another page in the same application, or to an external URL. Hyperlinks to external URLs can include attribute values as parameters. |
| Pass Parameters | Allows users to create a hyperlink that generates an HTTP POST request containing attribute values from the selected records as POST parameters. The Actions menu can contain multiple Pass Parameters options, each with a different label, URL, and parameters. |

In some embodiments, users can select and configure an action for a displayed value. Example actions for a displayed value include:

Column Action: can configure conditions for a hyperlink and allow the user to perform an action on a specific column value.

Row-level Actions: allow end users to perform an action on the specific row, for example using:

Action Columns: (record action) can be Hyperlink actions, the link to the action can be either a text string or an icon. The hyperlink can allow users to navigate to a specified URL. The link can include attribute values from the current row. Users can create multiple Hyperlink action columns, each with unique settings.

In some embodiments, a user can configure the name, URL, whether to display the URL in a new browser window, and, in some implementations, whether to include attribute values as URL parameters. Record action can define a hyperlink to open an EBS form using forms. A call can be defined for selected record with an attribute value as a parameter. For example, forms caller can have the following parameters:

| Parameter | Description |
|---|---|
| functionCode | The function code for the function to be invoked (e.g. 'FAXASSET') |
| respId | Optional, the responsibility Id, set if a different responsibility is defined |
| respApplId | Optional, set this if a different responsibility application is defined |
| securityGroupId | Optional, set if a different security group is defined |
| languageId | Optional, set if a different language is defined |
| Other Parameters | Optional, pass values to forms (e.g. DP_ASSET_ID = {0}) |

In some embodiments, users can configure URL and whether to display it in a new browser window or not and can also include attribute values as POST parameters. The Actions menu can contain multiple pass parameters options, each with a different label, URL, and parameters.

In some embodiments, users can set up a condition to determine whether an action is enabled or not by configuring a conditional action display. This condition can control whether the action is available, for example by:

Defining the attribute for the condition (user can select any of the columns in the table, except the one that has the action)

Defining the comparison operator to use for this condition (Equal, Not Equal, Null, Not Null), for the equal and not equal comparisons, type the value to use for the comparison in the value filed Defining whether to enable or disable the action if the condition is met In some embodiments, when an action has an associated condition, the following can apply:

| Action Type | Effect of Action Condition |
|---|---|
| Column values | For rows that should not have the action, the column value is not hyperlinked |
| Action columns | For rows that should not have the action, the action column is empty. It does not display the icon or hyperlink text |
| Actions menu | For Actions menu options, users can first select at least one row to perform the action on. If all of the selected rows should not have the action, the action is disabled (grayed out) in the Actions menu. If at least one of the selected rows can have the action, the action is enabled. |

In some embodiments, users can configure a default sort order to use for the table by enable sorting per column and determine whether to sort in ascending or descending order. Table columns can be storable from an interface by default. A user can hover (e.g., with a cursor) over any column header and sort the data by this column in ascending or descending order. The sort can be to all table records (the service form the backend returned with all records sorted), not only the displayed within the paging control.

In some embodiments, a table can have checkboxes on a first column for single and multiple rows selection. For example, once a record or records get selected they can be highlighted in different color. In some embodiments, users can compare between records by selecting more than one record. A compare dialog can be displayed with the selected items.

Figure 33:
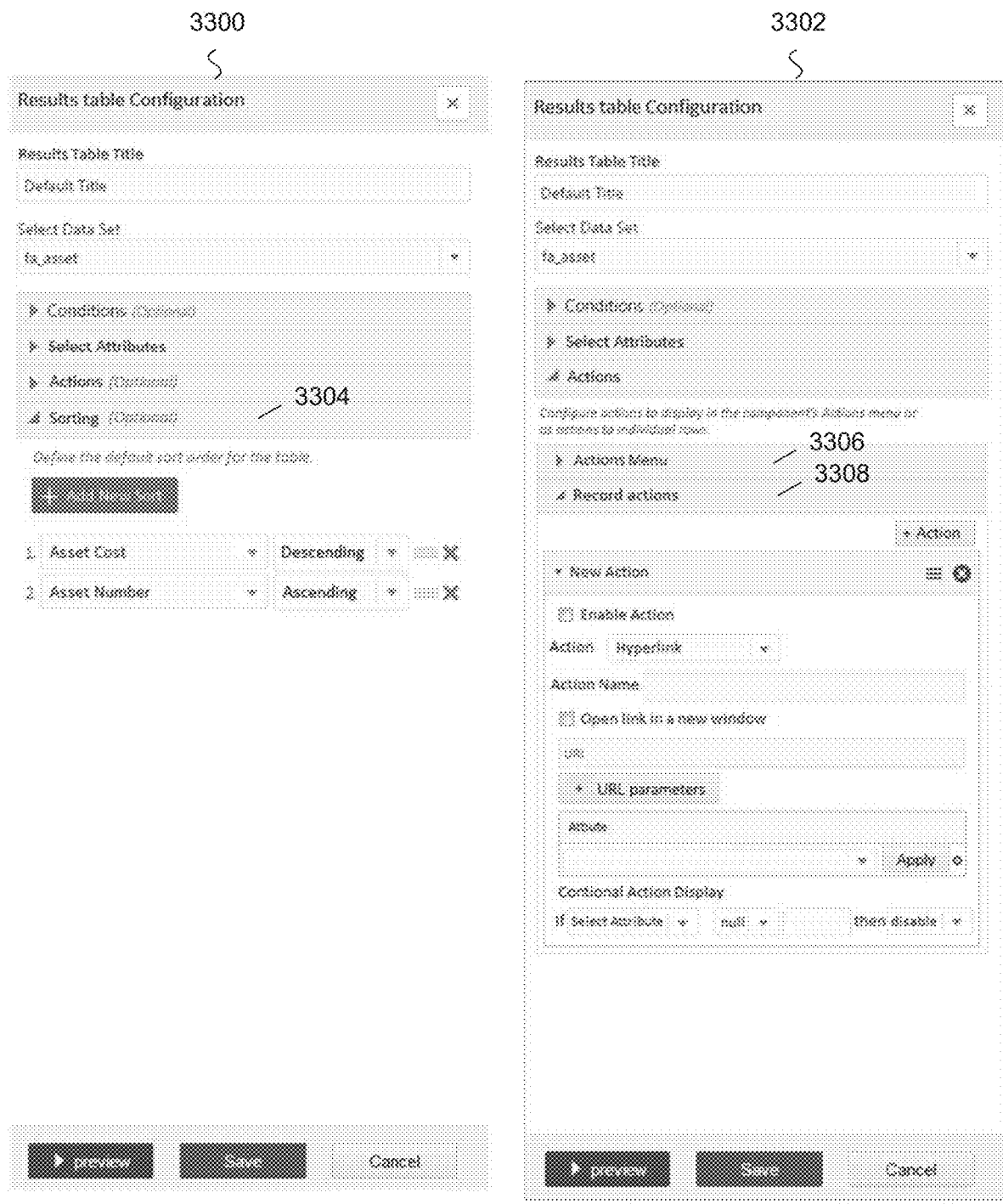
Figure 34:

In some embodiments, a user can navigate through data using a pagination toolbar:

To navigate to the next or previous page, click the next or previous page button To navigate to the first or last page, click the first or last page icon To jump to a specific page, type the page number in the field, then press Enter FIGS. 32 and 33 illustrate graphical user interfaces of a results table component in accordance with an embodiment. Interface 3200 of FIG. 32 can be an embodiment of a component that includes results table, action 3202, flag element 3204, and star element 3206. As previously disclosed, the displayed results table can display a list of data from a data set. Action 3202 can be any action related to a results table as disclosed. Flag element 3204 and star element 3206 and similarly be configured as disclosed.

In some embodiments, interface 3300 and 3302 of FIG. 33 can be used to configure a results table component. Interface 3300 can be used to select a data set for the component. A number of other configurations can be defined, such as conditions, selected attributes, actions, and sorting. For example, sorting options can be defined for the component using sorting 3304. Interface 3302 can be used to configure actions for the component using action menu 3306 and record actions 3308. For example, record actions can be configured as previously disclosed using the illustrate user interface.

In some embodiments, a results grid component can be used to display results of a data set. For example, a results grid component can provide a meaningful and interactive summary of results by visualizing records that include unstructured data, such as long text fields or item images using an innovative look & feel. Embodiments can also support customizable interactive actions that serve various business use cases. The results grid component can have a flexible layout template for displayed items that can include multiple rows and columns, where cells can span any number of columns or rows. Flexible templates can also allow the display of multiple item types per cell, such as one or more of: dimension and metric attribute values, input texts, custom buttons, star rating, and visual indicator icons.

In some embodiments, a results grid component can allow the configured data set items to be grouped by a specific attribute or composite record identifier. Where attributes conditions are supported with multiple operators, such as: Null, Not Null, Greater than and Not equal and are applied in (AND/OR) fashion. In some example, the grid can represent a summary of the main attributes per data set record in optionally toggled view between film strip (carousel view) and grid. Such views can be supported with an insightful image about the main attribute in the record with controlled positing in the view, actionable indicators and star rating that identify the items status, and reviews and drill-down actions into the user's systems.

In some embodiments, and similar to other components, actions can refine various components of a page/dashboard, navigate outside to another page/website having more related data, or execute code (e.g., a java function call) with the ability to pass attribute parameters and input text values. The results grid component can support custom tooltips and images/indicator icons images URL using one or more token values in combination with texts. In some embodiments, a results grid can provide users the ability to easily compare and highlight differences across several records, sort the records ascending or descending with multiple default attributes, view the results in presentable number of columns, and easily move across different pages of the component.

In some embodiments, a results grid component can display items in several pages using a number of columns, and can allow toggling between grid and film strip views. The component can also provide users with a visual insight about displayed items, for example, employee or shopping list items images. The results grid can be easily configured by selecting a specific data set and optionally grouping its displayed attributes by given data set attribute or a composite data set record identifier. In some embodiments, a flexible layout template can be added with multiple rows and columns. Cells can be configured to add multiple items types, such as one or more of: dimension/metric attributes, star ratings, visual indicator icons, custom buttons, and input texts.

In some embodiments, dimension attributes may include long texts attributes, such as items description or employees addresses while metric attributes (numeric and date/time) may get displayed in terms of stars rating with value range. A results grid can apply conditions to the displayed attributes of items using multiple operators, such as: null, not null, equal, not equal, greater than or less than that help supporting multiple use cases, or Where conditions can be applied in (AND/OR) fashion.

In some embodiments, indicator icons can provide visual statuses about the items. In example implementation, these indicator icons can include: stock availability, over-priced, out of catalog, off-contract, certified supplier, free shipping fees, best selling or GPS locations of supplier sites that are supported with interactive refinement, and hyperlink actions with specific parameters and tokenized tooltips and images URL. Input text items can have configurable labels and can be added on a results grid component to allow users to insert meaningful values that can be passed as parameters to source systems through items hyperlink actions or custom action buttons, such as: quantity or cancel reason.

In some embodiments, custom buttons support both hyperlink and code execution (e.g., java functions call) while passing parameters and input text values, such as: adding selected items to shopping card each with specific input quantity added by users. The results grid can also be configured with additional options, such as:

Number of items displayed per page
Number of grid columns
Sorting rules by multiple items displayed, for example ascending or descending, such as: Highest rating review, lowest items price or recent year of release
Item images positioning, including: top, bottom, left and right In some embodiments, configurations also support adding an items comparer with custom comparing column names that allow users to perform comparisons. For example, a user can highlight differences across selected items from an interface and clear selections after comparison.

FIGS. 34-37 illustrate graphical user interfaces of a grid component in accordance with an embodiment. Interface 3400 of FIG. 34 can be an embodiment of a grid component that includes a plurality of cells, such as cell 3402. As previously disclosed, the displayed grid can display a plurality of cells that each contain a plurality of items. Additional cells/grid items can be viewed using the navigation links depicted at the bottom of interface 3400.

Figure 36:
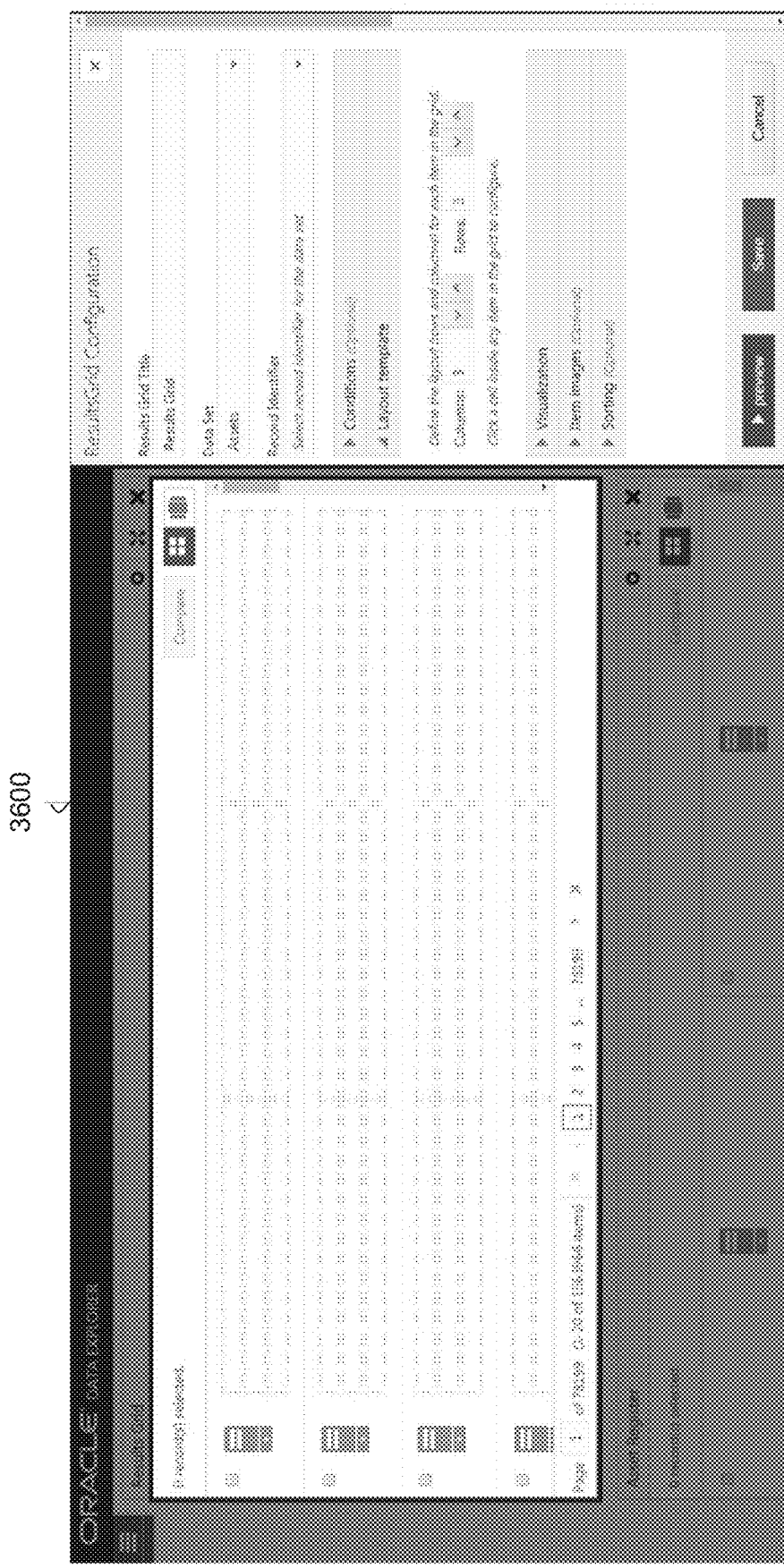

In some embodiments, interface 3500, 3502, 3600, 3602, 3700, and 3702, of FIGS. 35-37 can be used to configure a results table component. For example, interfaces 3500 and 3502 can configure components of a page/dashboard in a manner similar to previous disclosed interfaces. Interface 3500 can be used to select a data set for the component. A number of other configurations can be defined, such as conditions, layout template, visualization, item images, and sorting. Interface 3502 and record identifier 3506 can be used to configure a record identifier for the results grid component. Visualization 3508 can be used to define visualization options, such as display (e.g., grid), number of grid columns, number of items per page, enablement of compare, and a compare header. Interface 3600 of FIG. 36 can be used to configure a layout template for the grid component (e.g., 3 columns by 3 rows, and the like).

Interface 3700 and 3702 of FIG. 37 can be used to configured items within cells of the grid component. For example, a column span and a row span for a cell can be defined. Element 3704 can bee used to define an item that is an attribute value. For example, an attribute value item can be shown as a star, can include a corresponding action (e.g., refinement/filtration), and can include a target (e.g., for the refinement/filtration). Interface 3702 can be used to define a button item, for example with an action (e.g., hyperlink), and other configuration options (e.g., URL for the hyperlink).

Embodiments of the dashboard include layout components. For example, layout components can be used to configure or organize a page/dashboard by allowing a user to group components on a page/dashboard. In some embodiments, a tabbed container can group components into multiple tabs. Each tab can contain one or more components. In some embodiments, to add tab component containers, a user can drag and drop from a component list to the desired location on the page/dashboard. Users can also name or rename tabs.

Figure 38:
FIGS. 38 and 39 illustrate graphical user interfaces of a layout component according to an example embodiment.
Figure 39:
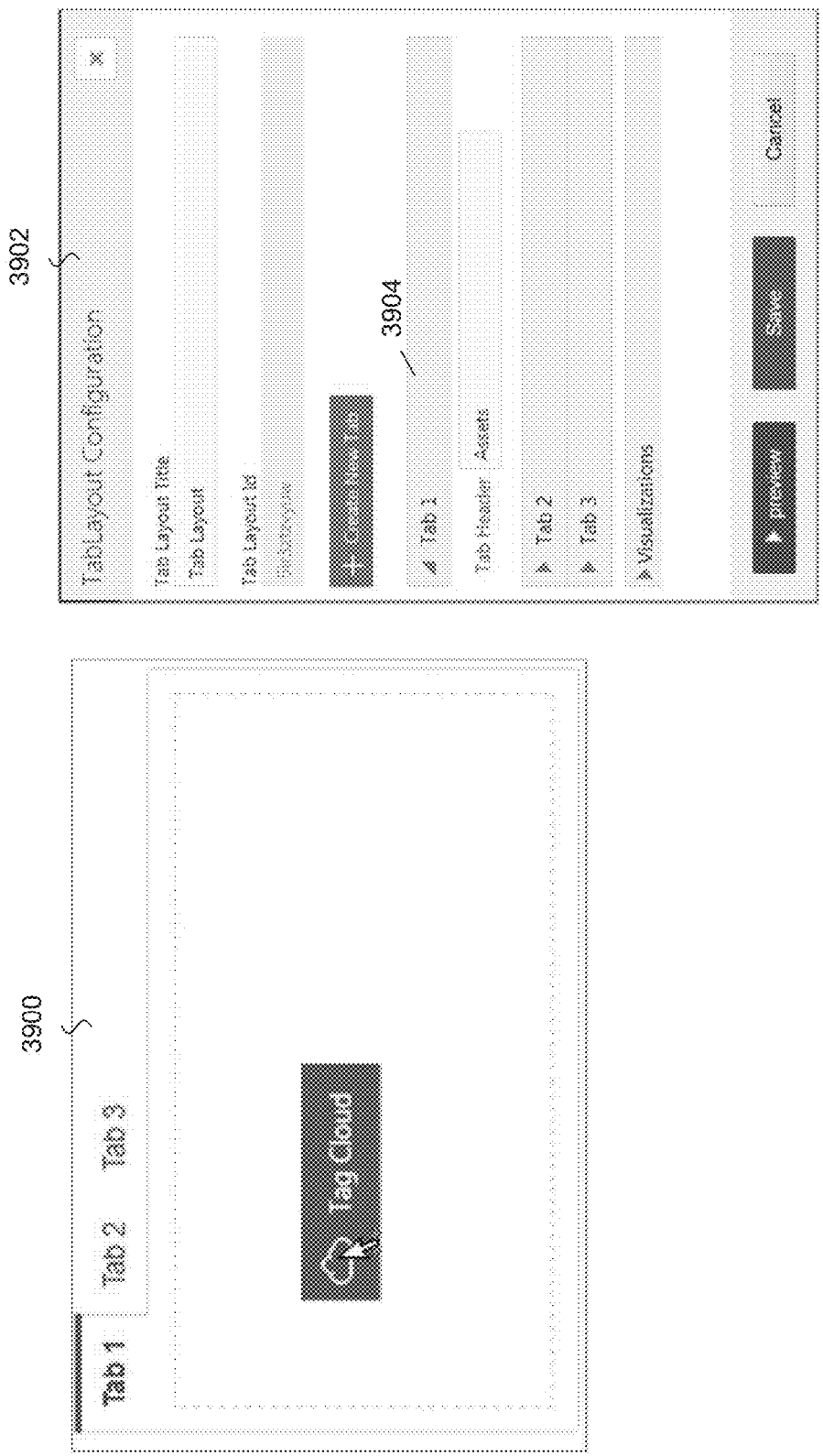

FIGS. 38 and 39 illustrate graphical user interfaces of a layout component in accordance with an embodiment. Interface 3800 includes tab 3802, where a plurality of components can be placed at locations within the tab. Interface 3900 of FIG. 39 depicts a configurable tab of a dashboard that includes a tag cloud component. Interface 3902 of FIG. 39 can be used to configure a tab component. For example, new tabs can be created using the interface and created tabs, such as tab 3904, can be defined.

In some embodiments, dashboard components can define cascading behavior, for instance in response to selected filters/refinements. In other words, cascading can refer to when data is refined to a single value for a dimension value, and the dashboard component is updated to use a different dimension. In some embodiments, cascading can be support in chart, and tag cloud components. In some implementations, when there are no dimensions to cascade to, the component can remain on the last dimension in the cascade.

Figure 40:
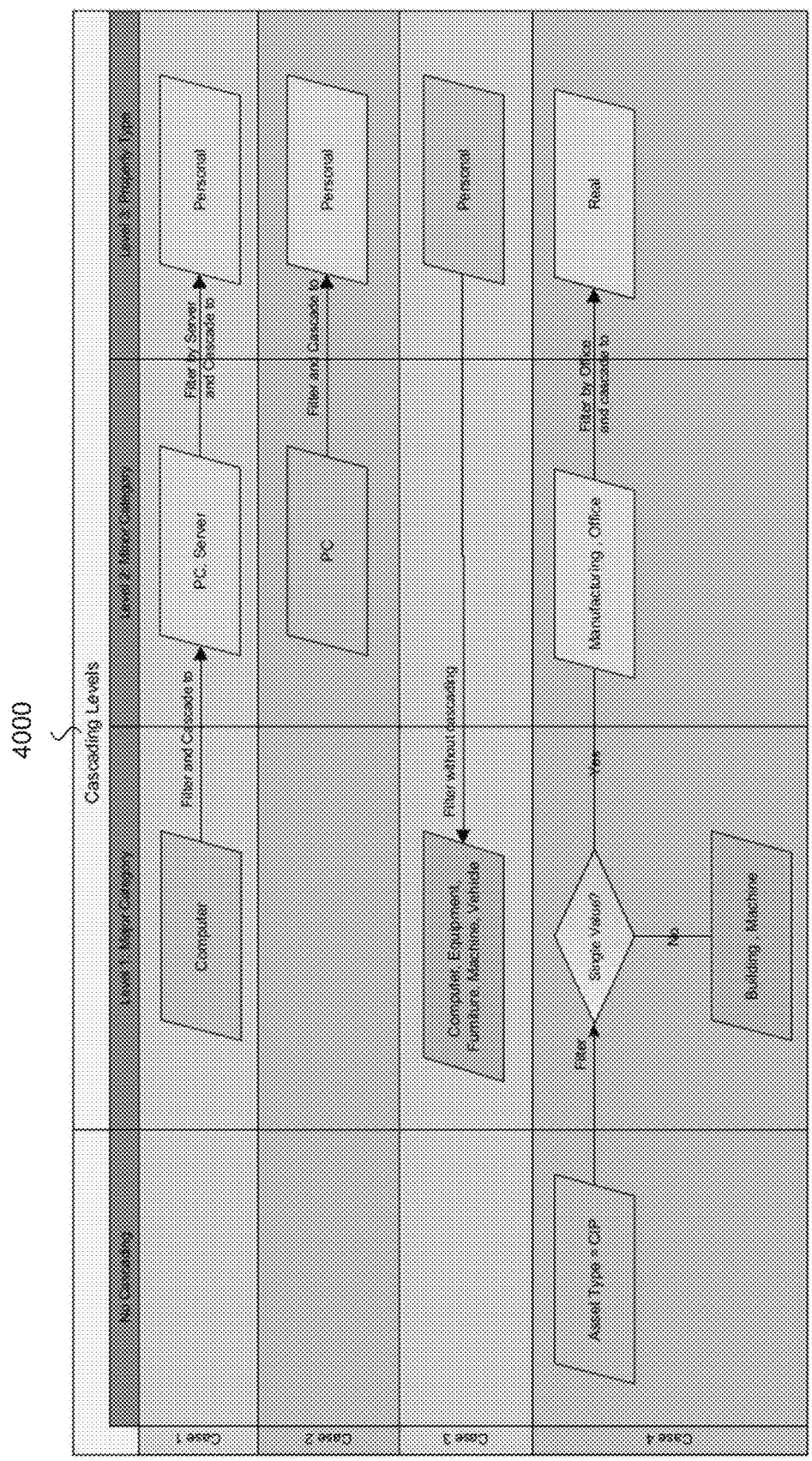
FIG. 40 illustrates a flow of example use cases of cascading functionality according to an example embodiment.
Figure 41:
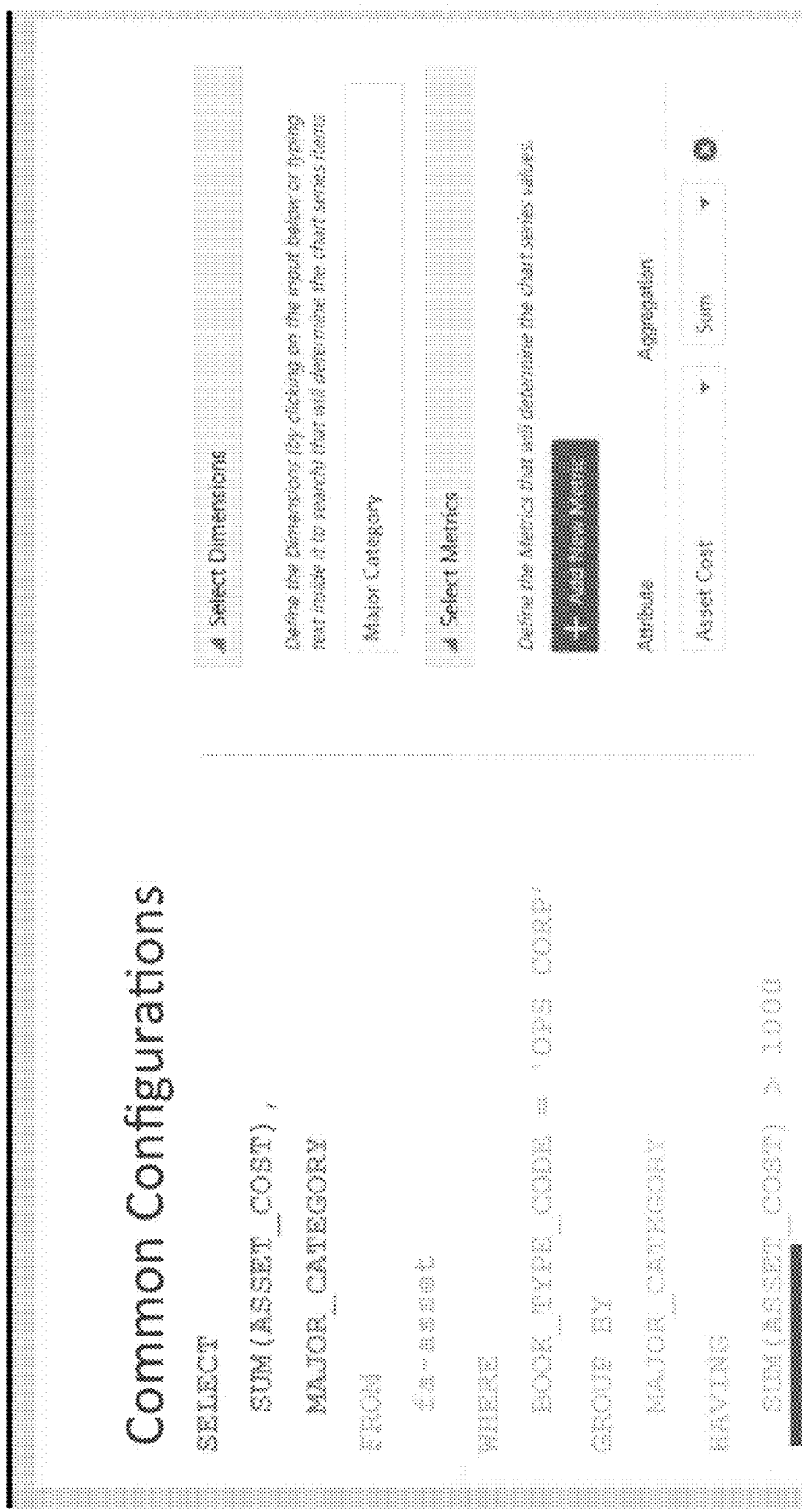
FIGS. 41-44 illustrate correspondences between an SQL command that includes SELECT, FROM, WHERE, GROUPY BY, and HAVING and a plurality of input forms used to configured a component of the dashboard according to an example embodiment.
Figure 42:
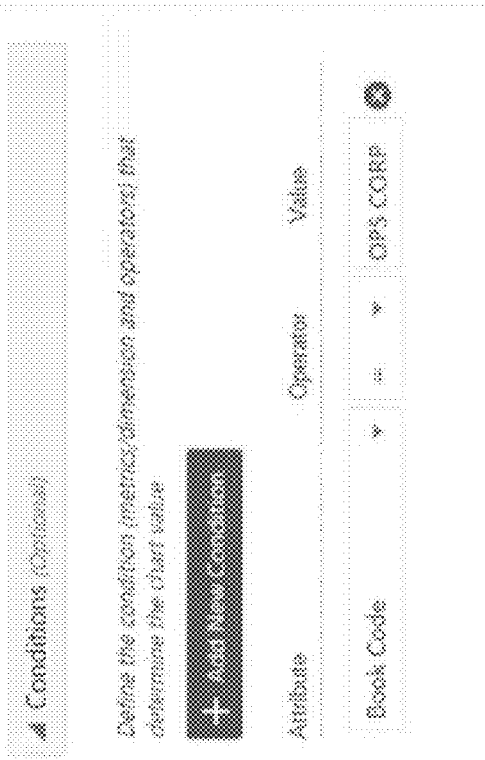
Figure 43:
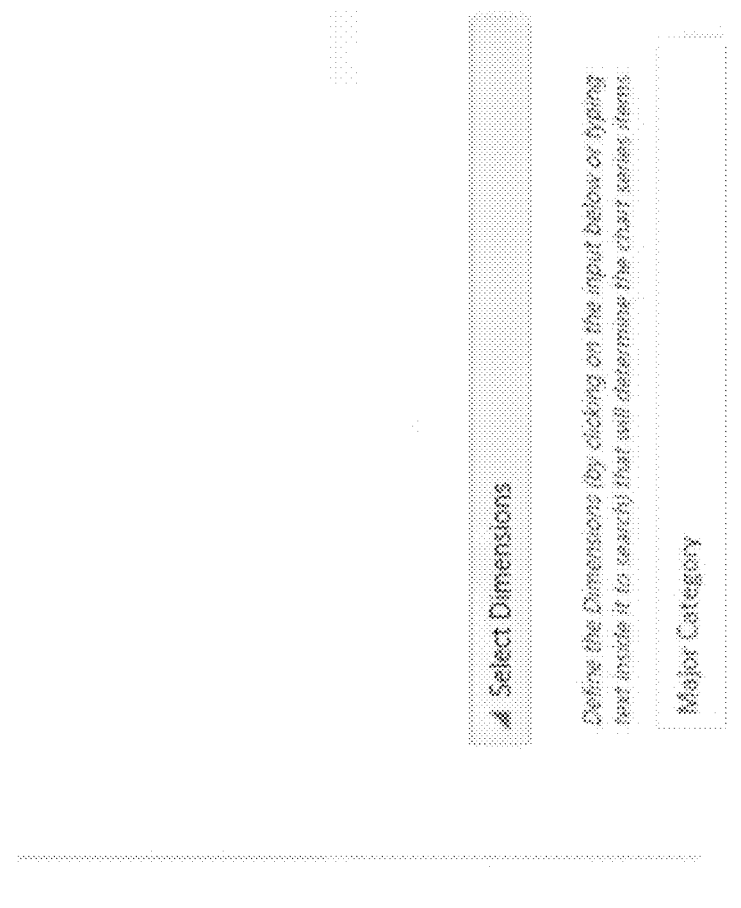
Figure 44:
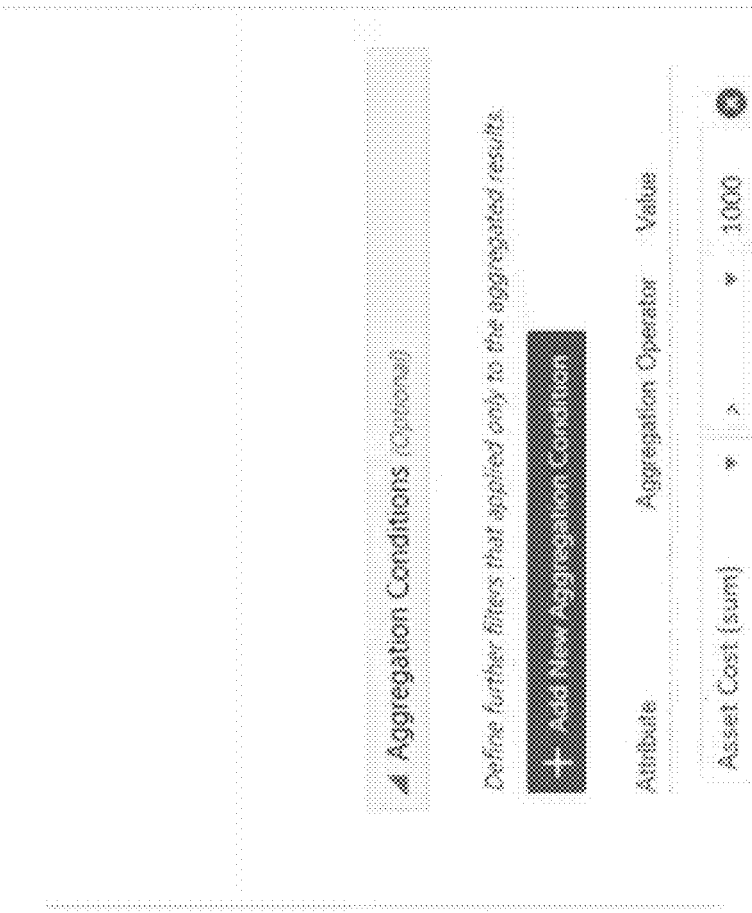

In some embodiments, for multi-or or multi-and dimensions, where users can refine by more than one value, if the data is refined by any one of the dimension values, the cascade can continue to the next dimension, even if there are still available values to refine by in the guided discovery component. FIG. 40 illustrates a flow for example use cases of cascading functionality according to an embodiment.

Embodiments that implement cascading can dynamically introspect a subset of the data a user is interacting with and drill-down into a data set based on variability of the displayed data and based on a configuration of the visual component. In some examples, regardless of which filters on which attributes the user may have applied through their discovery session, cascading can analyze the corresponding subset of data and automatically display additional information in the components if the existing level of detail has been fully exhausted. For example, in the Fixed Assets data set, if one value of major category is remaining in the subset of data based on the filter state of the page/dashboard, then cascading can automatically disclose/display a minor category which will likely have more variability and thus more information to be conveyed through the dashboard. In this example, a user can broaden their selection criteria and return to additional major category values, and the components can dynamically cascade up to that level. Flow chart 4000 of FIG. 40 illustrates examples of cascading functionality for different example use cases, where a component can cascade to disclose/display information related to the "cascade level" based on the filter state of the page/dashboard.

In some embodiments, cascading can automatically move from one level to the next based on a basic rule: the current level has one value across the data set or subset of the data set currently being viewed. The flow can cascade down one level and look for a distinct number of values. If the above applies to that level as well, then it will cascade down again if there is an additional cascade level defined. In some embodiments, a page/dashboard user/designer can configure the cascading levels based on dimensions that have a hierarchical relationship to each other. For example, country to state to city, and/or major category to minor category can represent hierarchical data relationships that a user/designer can leverage to configure cascading levels between these dimensions of data. Once the levels are configured as desired, the user experience of down cascading or up cascading across the levels is dynamically applied by the dashboard.

In some embodiments, drilldown functionality can enable a user to navigate from a dashboard page to an external page (e.g., source system application page) through a hyperlink. A URL can contain one or more variable placeholders, each representing an attribute from the underlying data. At runtime, the dashboard can replace the placeholders with the actual attribute values for the current record.

Drilldown to Example Source System
Use ExampleCaller Function
Example: /ecc/ebs/formsCaller?functionCode=FAXASSET&DP_ASSET_ID={0}

| Parameter | Description |
|---|---|
| functionCode | the function code for the function to invoke (e.g. 'FAXASSET') |
| respId | Optional, responsibility Id, set this to use a different responsibility |
| respApplId | Optional, set this to use a different responsibility application |
| securityGroupId | Optional, set this to use a different security group rather than current |
| languageId | Optional, set this to use a different language rather than the default language. |
| Other Parameters | Optional, pass values to source sytem (e.g DP_ASSET_ID = {0}) |

In some embodiments, a filter state on a data set will be maintained as a user navigates from one dashboard page to another. For example, a filter state on an associated data set can be maintained as a user navigates from one dashboard page to another. This behavior can be available when navigating through dashboard links or through host system links. Such an approach can be achieved by implementing the following:

a. Store query state striped by data set key on the browser session.
  b. Selected refinement component can allow configurability of one or more data sets.
  c. Filters stored on the client side that are striped with data set key and match the data set keys configured on selected refinements will be shown on the page and sent on every request to backend. This can cover both self-filters and filters that are applied as association joins up to 2 levels.

In an embodiment, the user interface components can be declaratively configured. For example, the chart component may be declaratively configured using a plurality of input forms. In some examples, the input forms may correspond to (e.g., mimic) declarative SQL commands. For example, FIGS. 41-44 illustrate correspondences between an SQL command that includes SELECT, FROM, WHERE, GROUPY BY, and HAVING and a plurality of input forms used to configured a component of the dashboard according to an embodiment. In this example, the input forms' association with an SQL command can be intuitive for a user with a working knowledge of SQL.

In some embodiments, rollup functionality can be achieved by one or more components of the dashboard. An embodiment of rollup is an extension of groupby aggregations applied to different levels of grouping sets. Rollup can calculate aggregations such as SUM, COUNT, MAX, MIN, and AVG at increasing levels of aggregation, from the most detailed up to a grand total. For example: consider a data set with these columns emp_id, emp_name, emp_salary, emp_team, emp_tech and emp_department. The sum of salaries can be obtained at level of emp_team, emp_tech and emp_department:

| Group by | Sum(Salary) |
| --- | --- |
| Department1, Technology1, Team1 | 50,000 |
| Department1, Technology1, Team2 | 60,000 |
| Department1, Technology1 | 110,000 |
| Department1, Technology2, Team3 | 40,000 |
| Department1, Technology2, Team4 | 30,000 |
| Department1, Technology2 | 70,000 |
| Department1 | 180,000 |

In some embodiments, rollup can be implemented by chart, bar, and tag cloud components. For example, rollup can allow a cascade from one insight level to another and providing additional detail using a "result-driven" technique. Embodiments can roll up the aggregation metrics at multiple cascade level, which can make it easy for components to discover which level should be used. For example, the first more generic (vs. more detailed) level that has more than one distinct value can be used. The following are illustrative examples of definitions and pseudocode for implementing the rollup functionality:

Service Definition

```
POST
/COLLECTION_KEY;RECORD_IDENTIFIER/rollup-
(METRIC_CLAUSE,groupby(ROLLUP_CLAUSE),orderby-
(ORDERBY_CLAUSE),having(PREDICATE_CLAUSE))?-
start=START_VAL&count=COUNT_VAL
```

Where (* in front of the term below means it is optional):
a. COLLECTION_KEY: This is the collection key to query.
b. *RECORD_IDENTIFIER: This is the record identifier attribute to use to extract data set of only records we care about for this request.
c. *METRIC_CLAUSE: This is a comma separated list of aggregations we want to calculate for each level of the grouping set.
d. *ROLLUP_CLAUSE: This is a pipe 'l' separated list of all dimensions we want to rollup over.
e. *ORDERBY_CLAUSE: It is in this format "ORDERBY_VAL asc|desc".
   ORDERBY_VAL: This is either "index" for sorting by the dimension at all levels. Or it can be "aggregation1(metric1)" to sort by any of the aggregations.
f. *PREDICATE CLAUSE: This is to restrict the results to the ones that match that predicate. It is this form "EXPRESSION LOGICAL_OPERATOR EXPRESSION"
   EXPRESSION: This is the expression in the predicate clause and it is in this form "aggregation1(metric1) BOOLEAN_OPERATOR LITERAL_VALUE"
   BOOLEAN_OPERATOR: This can be one of >, <, >=, <= or ==
   LOGICAL_OPERATOR: This can be &&, || or !
   LITERAL_VALUE: This can be any numeric value.
g. METRIC_CLAUSE and ROLLUP_CLAUSE can't be both missing at the request.
h. START_VAL: This is to support pagination. It defaults to 0.
i. COUNT_VAL: This is to support pagination. It tells how many results to return. It defaults to −1 which means get all results.

Backend Request:

```
{
  DIMENSION_1:{
    type:terms,
    numBuckets:true,
    missing:true,
    limit:−1,
    offset:0,
    sort:"index asc",
    field:"_DIMENSION_1_facet",
    facet:{
       "AGGREGATION_1(METRIC_1)":"AGGREGATION_1
    (METRIC_1)","AGGREGATION_2(METRIC_2)":
    "AGGREGATION_2(METRIC_2)",
      DIMENSION_1:{
        type:terms,
        numBuckets:true,
        missing:true,
        limit:−1 ,
        offset:0,
        sort:"index asc",
        field:"_DIMENSION_2_facet",
        facet:{
           "AGGREGATION_1(METRIC_1)":"AGGREGATION_1
       (METRIC_"AGGREGATION_2(METRIC_2)":
       "AGGREGATION_2(METRIC_2)"
        }
      }
    }
  }
}
```

Embodiments of the dashboard provide a declarative, designer driven, flexible user interface for data exploration. For example, visual component configurations can be accomplished through a unified interface template that is modeled after the familiar structure of an SQL statement. Component configuration can be fully encapsulated in the configuration template without the need to learn a new expression language or write code.

Embodiments also allow for complex interactions between the user and data in a simplified context. For example, a user can explore attributes/dimensions of a data set using intuitive (e.g., declaratively configured) components. This exploration includes discovering aspects of data using different components filtered in tandem. As a result, embodiments can efficiently communicate a host of different aspects to a piece of data (e.g., an attribute in a data set), and thus a user can explore new data relationships or can discover new aspects to a piece of data without explicitly seeking to explore or discover these concepts. One example use case is the ability to efficiently explore the depth and breadth of a data set without prior knowledge of the data it contains and without text input (e.g., typing into forms).

Embodiments also include associations that allow differently configured components (e.g., configured with different data) to be filtered in tandem. Such data associations, for example based on a common attribute, further enables a user to visually explore data in multiple data sets using the dashboard.

Embodiments also include improved data analysis capabilities, for example controlled through metadata in the configuration interface. These data analysis capabilities enable advanced relationships to be defined between data sets, and also provide the ability to project the same data set at different levels of a hierarchy with the appropriate level of related detail (e.g., displayed by different components on the dashboard).

Embodiments also implement data exploration that is based on a flow from one level of data to the next. For example, data sets can include hierarchical data and components configured to visualize this data can be defined with cascading functionality. This functionality can dynamically and efficiently move deeper into a data set and provide dynamic data visualizations at these deeper layers. A user can also navigate back to a shallower depth in the data in order to explore another dimension. When combined with embodiments that include multiple components (e.g., visualization components) on the same dashboard that filter in tandem, such an exploration provides numerous facets of data at each layer. The user can flow from one layer of data to the next, at each layer the user can be displayed a multitude of facets by different components, and the user can consider this information to flow to the next state of the dashboard. Such functionality provides greater efficiency in communicating the complexities, breadth, and depth of a data set using an improved user interface.

Embodiments also include a data ingest approach that allows for native database capabilities and a native runtime environment to be used for the extraction and transformation process, allowing for a productive development experience with a shallow learning curve. The capability to reuse source system security, embed in a source system user interface, and control data ingest process from the source system allows for improved integration with a source system and democratizes access to discovery capabilities to a population of users previously denied access to advanced discovery tools. In other words, embodiments can reduce the time, cost, and complexity of incorporating an advanced data analytical tool with a source system that stores data in data sets.

In addition, embodiments that include a hierarchical data ingest approach that loads multiple levels at once and relies on components to define/select the appropriate level to remove data inconsistencies further provide an improved and streamlined data ingest approach made possible by improved interface components. In other words, embodiments provide improved flexibility by leveraging interoperability with various source systems, improved security by leveraging existing security protocols and allowing further fine grained security measures, and improved data management by providing a robust yet flexible data ingest approach.

Figure 45:
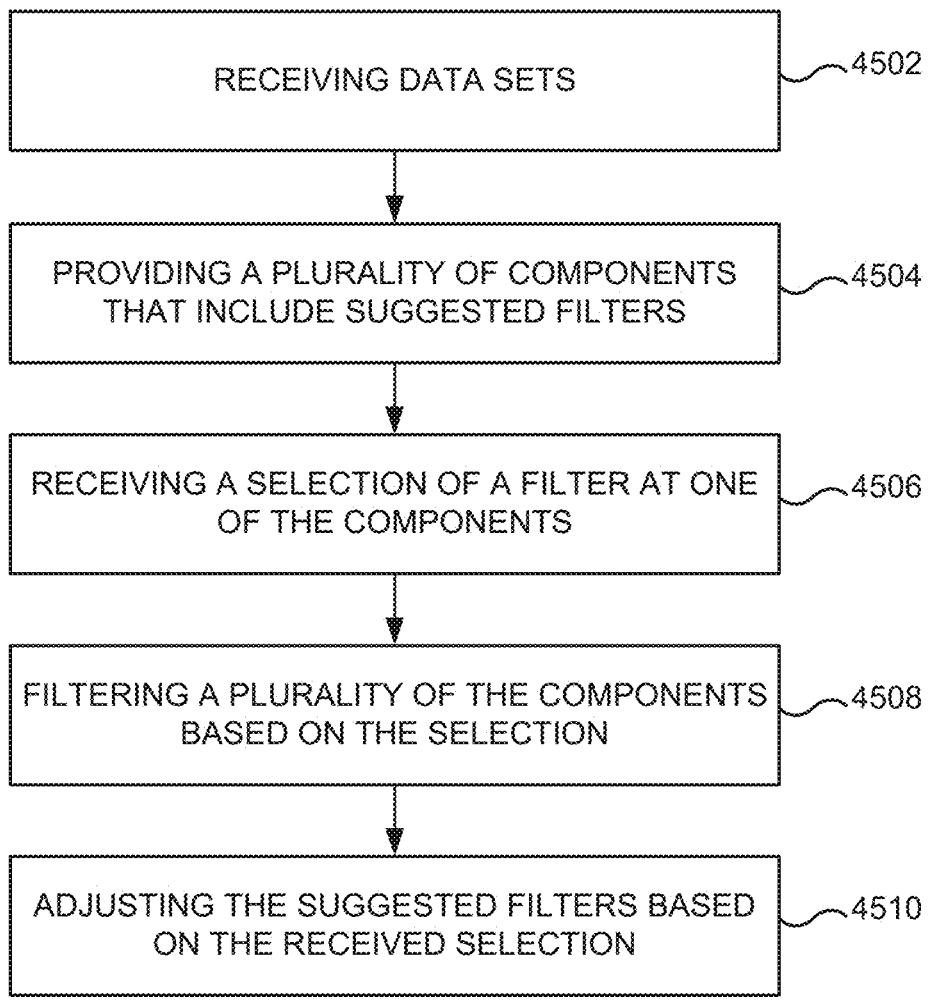
FIG. 45 illustrates example functionality for configuring a dashboard with guided discovery according to an example embodiment.

FIG. 45 illustrates an example functionality for configuring a dashboard with guided discovery according to an example embodiment. In one embodiment, the functionality of FIG. 45 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 4502, one or more data sets populated by a plurality of data attributes and data attribute values can be received, wherein the dashboard is configured to display data from the one or more data sets. In some embodiments, data sets can include data attributes and data attribute values.

At 4504, a plurality of components can be provided on the dashboard including a guided discovery component that displays suggested filters for the dashboard according to one or more of the received data sets. In some embodiments, the components include one or more of a graph or chart component, a search bar component, a results component, a grid component, a summarization bar component, a tag cloud component, and any other suitable component. These components can be dynamically filtered according to received filters.

In some embodiments, one or more of the components can be declaratively configured using a plurality of input forms that correspond to declarative SQL commands. For example, wherein the input forms can correspond to at least SELECT, FROM, WHERE, GROUP BY, and HAVING SQL commands.

At 4506, a selection can be received at one of the components of a filter for the dashboard. In some embodiments, received filters and suggested filters can be data attributes or data attributes values from the received data sets.

At 4508, a plurality of the components can be dynamically filtered based on the received filter. For example, one or more of the components that are configured with a data set that includes a data attribute value of the selected filter can be dynamically filtered. In an embodiment, the graph or chart component can be dynamically filtered when the received filter corresponds to a data attribute or data attribute value for a data set used to configure the graph or chart component (e.g., when the graph or chat component display data related to the received filter). In an embodiment, a received filter can be a selection of a portion of a graph or chart component that corresponds to a data attribute value, and the graph or chart component can be filtered according to that selected data attribute value.

In some embodiments, a filter received at one of the components can be used to dynamically filter others of the components based on a correspondence between the value for the filter (e.g., data set attribute value) and the data set used to configure the other components. For example, one of the other components can be filtered based on whether the data set used to configure the component includes the attribute/value and/or whether any data set associations have been defined (e.g., whether the data displayed or visualized by the component is related to the received filter value).

At 4510, the suggested filters displayed by the guided discovery component are dynamically adjusted based on the received filter, wherein one or more suggested filters are dynamically hidden and one or more suggested filters are dynamically displayed based on the received filter. In some embodiments, data displayed on the dashboard is dynamically filtered based on selected filters from the guided discovery component or selected filters from the remaining components as the user is interacting with different components on the page/dashboard. For example, in some implementations and uses the user does not need to input text to filter data displayed by the dashboard.

While organizational data is used to describe the data loaded and displayed in the dashboard, any other suitable data sets may be implemented. For example, products data, social media data, and any other data sets may be processed by the dashboard framework and displayed on the dashboard using the plurality of components.

In an embodiment, the guided discovery component may display suggested filters for the data on the dashboard based on the data attributes for the loaded data sets and based on the data displayed on the dashboard. When a user selects one of the suggested filters, the data displayed on the dashboard may be filtered according to the selection. For example, data displayed by a chart component may be filtered according to the selection. In addition, the available filters displayed by the guided discovery component may be dynamically adjusted. For example, available filters may be dynamically hidden and other available filters may be dynamically displayed based on the selection.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

I claim:

1. A method for configuring a dashboard with a plurality of components, the method comprising:
receiving one or more multi-dimensional data sets populated by a plurality of data attributes and associated data attribute values, the data attributes comprising a numerical attribute type or a categorical attribute type, wherein the dashboard is configured to display data from the data sets;
providing a plurality of components on the dashboard including a guided discovery component that displays suggested filters for the dashboard according to the data sets;
receiving, at one of the components, a selection of one or more filters for the dashboard, wherein the selected filters and the suggested filters displayed by the guided discovery component comprise data attributes or data attribute values from the data sets;
dynamically filtering a plurality of the components on the dashboard based on the selected filters; and
dynamically adjusting the suggested filters displayed by the guided discovery component, wherein, based on the selected filters and precedence rules for the data sets, one or more suggested filters are dynamically hidden and one or more suggested filters are dynamically displayed, the precedence rules defining a precedence for displaying suggested filters by the guided discovery component based on the selected filters for the dashboard and the data attributes of the data sets.

2. The method of claim 1, wherein at least one of the components comprises a graph or chart component that is dynamically filtered according to the selected filters.

3. The method of claim 1, wherein one or more of the components are declaratively configured using a plurality of input forms that correspond to declarative SQL commands.

4. The method of claim 3, wherein the input forms correspond to at least SELECT, FROM, WHERE, GROUP BY, and HAVING SQL commands.

5. The method of claim 2, wherein the graph or chart component is dynamically filtered when the selected filters corresponds to a data attribute or data attribute value for a data set used to configure the graph or chart component.

6. The method of claim 2, wherein the selected filters comprise a selection of a portion of the graph or chart component that corresponds to a data attribute value and the graph or chart component is filtered according to that selected data attribute value.

7. The method of claim 6, further comprising:
dynamically filtering one or more of the components that are configured with a data set that includes the selected data attribute value.

8. The method of claim 7, wherein data displayed on the dashboard is dynamically filtered based on suggested filters from the guided discovery component or selected filters from remining components such that a user selects filters generated by the dashboard and the user does not input text to filter data displayed by the dashboard.

9. A non-transitory computer readable medium having instructions stored thereon that, when executed by a processor, cause the processor to configure a dashboard with a plurality of components, the configuring comprising:
receiving one or more multi-dimensional data sets populated by a plurality of data attributes and associated data attribute values, the data attributes comprising a numerical attribute type or a categorical attribute type, wherein the dashboard is configured to display data from the data sets;
providing a plurality of components on the dashboard including a guided discovery component that displays suggested filters for the dashboard according to the data sets;
receiving, at one of the components, a selection of one or more filters for the dashboard, wherein the selected filters and suggested filters comprise data attributes or data attribute values from the data sets;
dynamically filtering a plurality of the components on the dashboard based on the selected filters; and
dynamically adjusting the suggested filters displayed by the guided discovery component, wherein, based on the selected filters and precedence rules for the data sets, one or more suggested filters are dynamically hidden and one or more suggested filters are dynamically displayed, the precedence rules defining a precedence for displaying suggested filters by the guided discovery component based on the selected filters for the dashboard and the data attributes of the data sets.

10. The computer readable medium of claim 9, wherein at least one of the components comprises a graph or chart component that is dynamically filtered according to the selected filters.

11. The computer readable medium of claim 9, wherein one or more of the components are declaratively configured using a plurality of input forms that correspond to declarative SQL commands, and the input forms correspond to at least SELECT, FROM, WHERE, GROUP BY, and HAVING SQL commands.

12. The computer readable medium of claim 9, wherein the graph or chart component is dynamically filtered when the selected filters corresponds to a data attribute or data attribute value for a data set used to configure the graph or chart component.

13. The computer readable medium of claim 10, wherein the selected filters comprise a selection of a portion of the graph or chart component that corresponds to a data attribute value and the graph or chart component is filtered according to that selected data attribute value.

14. The computer readable medium of claim 13, wherein the configuring further comprises:

dynamically filtering one or more of the components that are configured with a data set that includes the selected data attribute value.

15. A system for configuring a dashboard with a plurality of components, the system comprising:
   a memory; and
   a processor, coupled to the memory, configured to:
   receive one or more multi-dimensional data sets populated by a plurality of data attributes and associated data attribute values, the data attributes comprising a numerical attribute type or a categorical attribute type, wherein the dashboard is configured to display data from the data sets;
   provide a plurality of components on the dashboard including a guided discovery component that displays suggested filters for the dashboard according to the data sets;
   receive, at one of the components, a selection of one or more filters for the dashboard, wherein the selected filters and suggested filters comprise data attributes or data attribute values from the data sets;
   dynamically filter a plurality of the components on the dashboard based on the selected filters; and
   dynamically adjust the suggested filters displayed by the guided discovery component, wherein, based on the selected filters and precedence rules for the data sets, one or more suggested filters are dynamically hidden and one or more suggested filters are dynamically displayed, the precedence rules defining a precedence for displaying suggested filters by the guided discovery component based on the selected filters for the dashboard and the data attributes of the data sets.

16. The method of claim 1, wherein the one or more data sets comprise hierarchical data and the received filter comprises a parent data attribute of one or more child data attributes within at least a portion of the data sets.

17. The method of claim 16, wherein at least one precedence rule defines that, when a particular parent data attribute is selected as a filter for the dashboard, a particular child data attribute of the parent data attribute is to be displayed as a suggested filter by the guided discovery component.

18. The method of claim 1, wherein a definition for at least one precedence rule comprises a trigger data attribute, a trigger data value, and a target data attribute.

19. The method of claim 18, wherein the trigger data attribute comprises a data attribute of at least a portion of the data sets, the trigger data value comprises a defined value for the trigger data attribute, and the target data attribute comprises a data attribute of at least a portion of the data sets that is to be displayed as a suggested filter by the guided discovery component when the trigger data attribute and the trigger data value are selected as filters for the dashboard.

20. The method of claim 1, further comprising:
   ingesting the received data sets to populate data attributes and data attribute values based on data load rules for the data sets.

* * * * *

UNITED STATES PATENT AND TRADEMARK OFFICE
CERTIFICATE OF CORRECTION

PATENT NO. : 11,216,451 B2  Page 1 of 1
APPLICATION NO. : 15/991119
DATED : January 4, 2022
INVENTOR(S) : Obeidat et al.

It is certified that error appears in the above-identified patent and that said Letters Patent is hereby corrected as shown below:

In the Specification

In Column 2, Line 65, delete "GROUPY" and insert -- GROUP --, therefor.

In Column 4, Line 39, delete "("HFDS")," and insert -- ("HDFS"), --, therefor.

In Column 9, Line 22, delete "in in" and insert -- in --, therefor.

In Column 27, Line 46, delete ""SELECT_TPE_CODE"" and insert -- "SELECT_TYPE_CODE" --, therefor.

In Column 29, Line 3, delete "vales." and insert -- values. --, therefor.

In Column 30, Line 57, delete "and or" and insert -- and/or --, therefor.

In Column 33, Line 59, delete "is can be" and insert -- can be --, therefor.

In Column 40, Line 54, delete "bee" and insert -- be --, therefor.

In Column 42, Line 24, delete "sytem" and insert -- system --, therefor.

In Column 42, Line 52, delete "GROUPY" and insert -- GROUP --, therefor.

In Column 42, Line 59, delete "groupby" and insert -- group by --, therefor.

In the Claims

In Column 48, Line 14, in Claim 8, delete "remining" and insert -- remaining --, therefor.

In Column 48, Line 56, in Claim 12, delete "9," and insert -- 10, --, therefor.

Signed and Sealed this
Thirty-first Day of May, 2022

Katherine Kelly Vidal
*Director of the United States Patent and Trademark Office*